US011137987B2

(12) United States Patent
Namarvar et al.

(10) Patent No.: US 11,137,987 B2
(45) Date of Patent: Oct. 5, 2021

(54) SYSTEM AND METHOD FOR AUTOMATED MAPPING OF DATA TYPES FOR USE WITH DATAFLOW ENVIRONMENTS

(71) Applicant: ORACLE INTERNATIONAL CORPORATION, Redwood Shores, CA (US)

(72) Inventors: Hassan Heidari Namarvar, Mountan View, CA (US); Alexander Sasha Stojanovic, Los Gatos, CA (US); David Allan, Novato, CA (US); Ganesh Seetharaman, Redwood Shores, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 308 days.

(21) Appl. No.: 15/683,551

(22) Filed: Aug. 22, 2017

(65) Prior Publication Data
US 2018/0052897 A1 Feb. 22, 2018

Related U.S. Application Data

(60) Provisional application No. 62/378,152, filed on Aug. 22, 2016, provisional application No. 62/378,146, (Continued)

(51) Int. Cl.
*G06F 16/00* (2019.01)
*G06F 8/41* (2018.01)
(Continued)

(52) U.S. Cl.
CPC ............ *G06F 8/433* (2013.01); *G06F 3/0428* (2013.01); *G06F 3/0482* (2013.01);
(Continued)

(58) Field of Classification Search
CPC .... G06F 8/433; G06F 16/254; G06F 17/2785; G06F 8/4452; G06F 40/30; G06N 20/00; G06N 5/022
See application file for complete search history.

(56) References Cited

U.S. PATENT DOCUMENTS 5,291,500 A 3/1994 Patel et al.
5,996,072 A 11/1999 Noll et al.
(Continued)

FOREIGN PATENT DOCUMENTS

CN 101083656 12/2007
CN 101094173 12/2007
(Continued)

OTHER PUBLICATIONS

Baars, et al., "Management Support with Structured and Unstructured Data—An Integrated Business Intelligence Framework" Information Systems Management, vol. 25, Issue 2, Apr. 2008, pp. 132-148, 17 pages.
(Continued)

*Primary Examiner* — Leslie Wong
(74) *Attorney, Agent, or Firm* — Tucker Ellis LLP

(57) ABSTRACT

In accordance with various embodiments, described herein is a system (Data Artificial Intelligence system, Data AI system), for use with a data integration or other computing environment, that leverages machine learning (ML, DataFlow Machine Learning, DFML), for use in managing a flow of data (dataflow, DF), and building complex dataflow software applications (dataflow applications, pipelines). In accordance with an embodiment, the system can provide support for auto-mapping of complex data structures, datasets or entities, between one or more sources or targets of data, referred to herein in some embodiments as HUBs. The auto-mapping can be driven by a metadata, schema, and statistical profiling of a dataset; and used to map a source
(Continued)

dataset or entity associated with an input HUB, to a target dataset or entity or vice versa, to produce an output data prepared in a format or organization (projection) for use with one or more output HUBs.

20 Claims, 52 Drawing Sheets

Related U.S. Application Data filed on Aug. 22, 2016, provisional application No. 62/378,151, filed on Aug. 22, 2016, provisional application No. 62/378,143, filed on Aug. 22, 2016, provisional application No. 62/378,150, filed on Aug. 22, 2016, provisional application No. 62/378,147, filed on Aug. 22, 2016.

(51) Int. Cl.

| | | |
|---|---|---|
| *G06N 20/00* | (2019.01) | |
| *G06F 16/14* | (2019.01) | |
| *G06F 16/21* | (2019.01) | |
| *G06F 16/25* | (2019.01) | |
| *G06F 16/435* | (2019.01) | |
| *G06F 16/23* | (2019.01) | |
| *G06N 5/04* | (2006.01) | |
| *G06Q 10/06* | (2012.01) | |
| *G06F 40/30* | (2020.01) | |
| *G06F 3/0482* | (2013.01) | |
| *G06F 17/18* | (2006.01) | |
| *G06N 5/02* | (2006.01) | |
| *G06F 8/10* | (2018.01) | |
| *G06F 8/34* | (2018.01) | |
| *G06F 3/042* | (2006.01) | |
| *G06F 3/06* | (2006.01) | |
| *G06F 9/50* | (2006.01) | |

(52) U.S. Cl.
CPC .............. *G06F 3/0649* (2013.01); *G06F 8/10* (2013.01); *G06F 8/34* (2013.01); *G06F 8/4452* (2013.01); *G06F 16/144* (2019.01); *G06F 16/211* (2019.01); *G06F 16/2322* (2019.01); *G06F 16/2358* (2019.01); *G06F 16/254* (2019.01); *G06F 16/435* (2019.01); *G06F 17/18* (2013.01); *G06F 40/30* (2020.01); *G06N 5/022* (2013.01); *G06N 5/04* (2013.01); *G06N 5/046* (2013.01); *G06N 20/00* (2019.01); *G06Q 10/0637* (2013.01); *G06F 9/5061* (2013.01)

(56) References Cited

U.S. PATENT DOCUMENTS

| | | | |
|---|---|---|---|
| 6,237,021 B1 | 5/2001 | Drummond | |
| 6,370,573 B1 | 4/2002 | Bowman-Amuah | |
| 6,973,459 B1 | 12/2005 | Yarmus | |
| 7,814,142 B2 | 10/2010 | Mamou et al. | |
| 7,849,049 B2 * | 12/2010 | Langseth | G06F 16/254 |
| | | | 707/602 |
| 8,060,553 B2 | 11/2011 | Mamou et al. | |
| 8,856,313 B2 | 10/2014 | Amini et al. | |
| 8,954,375 B2 | 2/2015 | Kehoe et al. | |
| 9,430,552 B2 | 8/2016 | Adya et al. | |
| 9,507,838 B2 | 11/2016 | Leigh et al. | |
| 9,594,849 B1 * | 3/2017 | Todd | G06F 16/254 |
| 9,633,052 B2 | 4/2017 | Seetharaman et al. | |
| 9,659,042 B2 | 5/2017 | Puri et al. | |
| 10,073,867 B2 | 9/2018 | Lau et al. | |
| 10,210,246 B2 | 2/2019 | Stojanovic et al. | |
| 10,216,814 B2 | 2/2019 | Allan et al. | |
| 10,296,192 B2 | 5/2019 | Stojanovic et al. | |
| 2003/0172368 A1 | 9/2003 | Alumbaugh et al. | |
| 2005/0234969 A1 | 10/2005 | Mamou et al. | |
| 2005/0262189 A1 | 11/2005 | Mamou et al. | |
| 2005/0262192 A1 | 11/2005 | Mamou et al. | |
| 2006/0069717 A1 * | 3/2006 | Mamou | G06Q 10/00 |
| | | | 709/203 |
| 2006/0206507 A1 | 9/2006 | Dahbour | |
| 2008/0059773 A1 | 3/2008 | Fant | |
| 2008/0288889 A1 | 11/2008 | Hunt et al. | |
| 2009/0089078 A1 * | 4/2009 | Bursey | H04W 4/70 |
| | | | 705/300 |
| 2009/0319544 A1 | 12/2009 | Griffin et al. | |
| 2010/0199257 A1 | 8/2010 | Biggerstaff | |
| 2012/0079175 A1 | 3/2012 | Flynn et al. | |
| 2012/0090035 A1 | 4/2012 | Mehta et al. | |
| 2012/0095973 A1 | 4/2012 | Kehoe et al. | |
| 2012/0239753 A1 | 9/2012 | Beartusk et al. | |
| 2013/0325789 A1 * | 12/2013 | Krishnan | G06F 16/254 |
| | | | 707/602 |
| 2013/0332423 A1 | 12/2013 | Puri et al. | |
| 2014/0032617 A1 | 1/2014 | Stanfill | |
| 2014/0279622 A1 | 9/2014 | Lamoureux et al. | |
| 2014/0344210 A1 | 11/2014 | Leigh et al. | |
| 2014/0344211 A1 * | 11/2014 | Allan | G06F 8/433 |
| | | | 707/602 |
| 2014/0344310 A1 | 11/2014 | Seetharaman et al. | |
| 2014/0344778 A1 | 11/2014 | Lau et al. | |
| 2015/0106125 A1 * | 4/2015 | Farooq | G16H 10/60 |
| | | | 705/3 |
| 2015/0254330 A1 | 9/2015 | Chan et al. | |
| 2015/0278334 A1 * | 10/2015 | Gerweck | G06F 16/283 |
| | | | 707/706 |
| 2016/0092090 A1 | 3/2016 | Stojanovic et al. | |
| 2016/0092474 A1 | 3/2016 | Stojanovic et al. | |
| 2016/0092475 A1 | 3/2016 | Stojanovic et al. | |
| 2016/0092476 A1 | 3/2016 | Stojanovic et al. | |
| 2016/0092557 A1 | 3/2016 | Stojanovic et al. | |
| 2016/0188701 A1 * | 6/2016 | Fapohunda | G06F 16/254 |
| | | | 707/749 |
| 2017/0006135 A1 * | 1/2017 | Siebel | H04L 67/02 |
| 2017/0102678 A1 | 4/2017 | Nixon et al. | |
| 2017/0195253 A1 | 7/2017 | Annaluru et al. | |
| 2017/0229149 A1 | 8/2017 | Rothschild et al. | |
| 2017/0235824 A1 * | 8/2017 | Liu | G06F 17/2785 |
| | | | 707/723 |
| 2017/0277800 A1 | 9/2017 | Lucas et al. | |
| 2017/0286456 A1 | 10/2017 | Wenzel et al. | |
| 2017/0300540 A1 | 10/2017 | Karpistsenko et al. | |
| 2017/0364694 A1 | 12/2017 | Jacob et al. | |
| 2017/0371881 A1 | 12/2017 | Reynolds et al. | |
| 2018/0052861 A1 | 2/2018 | Seetharaman et al. | |
| 2018/0052870 A1 | 2/2018 | Stojanovic et al. | |
| 2018/0052878 A1 | 2/2018 | Seetharaman et al. | |
| 2018/0052898 A1 | 2/2018 | Allan et al. | |
| 2018/0067732 A1 | 3/2018 | Seetharaman et al. | |
| 2019/0138538 A1 | 5/2019 | Stojanovic et al. | |
| 2019/0265971 A1 * | 8/2019 | Behzadi | G06N 20/00 |
| 2019/0312979 A1 | 10/2019 | Sharma | |
| 2020/0241853 A1 | 7/2020 | Allan et al. | |
| 2020/0241854 A1 | 7/2020 | Stojanovic et al. | |
| 2020/0334020 A1 | 10/2020 | Seetharaman et al. | |
| 2020/0401385 A1 | 12/2020 | Seetharaman et al. | |

FOREIGN PATENT DOCUMENTS

| | | |
|---|---|---|
| CN | 101517533 | 8/2009 |
| CN | 102135905 | 7/2011 |
| JP | 2005063332 | 3/2005 |
| JP | 2011108085 | 6/2011 |
| WO | 2004021186 | 3/2004 |
| WO | 2006026636 | 3/2006 |
| WO | 2006089092 | 8/2006 |
| WO | 2013059694 | 4/2013 |
| WO | 2014186057 | 11/2014 |
| WO | 2014186058 | 11/2014 |
| WO | 2016049437 | 3/2016 |

(56) References Cited

FOREIGN PATENT DOCUMENTS

| WO | 2016049460 | 3/2016 |
|---|---|---|
| WO | 2018039241 | 3/2018 |
| WO | 2018039245 | 3/2018 |
| WO | 2018039251 | 3/2018 |
| WO | 2018039257 | 3/2018 |
| WO | 2018039264 | 3/2018 |
| WO | 2018039266 | 3/2018 |

OTHER PUBLICATIONS

Dayal, et al., "Data Integration Flows for Business Intelligence", EDBT 2009, Mar. 24-26, 2009, pp. 1-11, 11 pages.

Deufemia, et al., "A visual language-based system for extraction-transformation-loading development", Software—Practice and Experience, vol. 44, May 20, 2013, pp. 1417-1440, 24 pages.

Kurz, et al., "A UML Profile for Modeling Schema Mappings", ER Workshops 2006, LNCS 4231, pp. 53-62, 10 pages.

United States Patent and Tradmark, Notice of Allowance dated Apr. 18, 2019 for U.S. Appl. No. 15/683,554, 10 Pages.

United States Patent and Tradmark, Notice of Allowance dated Apr. 18, 2019 for U.S. Appl. No. 15/683,559, 9 Pages.

United States Patent and Trademark Office, Office Action dated Sep. 18, 2018 for U.S. Appl. No. 15/683,556, 18 Pages.

Notification of Transmittal of the International Search Report and the Written Opinion of the International Searching Authority for Application No. PCT/2017/048033, dated Nov. 2, 2017, 14 pages.

Malak, Michael, "Extending Word2Vec for Performance and Semi Supervised Learning", Spark Summit 2015, San Francisco, Jun. 15-17, 2015; published on YouTube on Jun. 24, 2015 at http://www.youtube.com/watch?v=A2XNInXGeSY.

Anonymous, "Apache Spark 2.0 Preview: Machine Learning Model Persistence—The Databricks Blog", May 31, 2016, 6 pages.

Anonymous, "ML Pipelines: A New High-Level API for MLlib—The Databricks Blog", Jan. 7, 2015, 8 pages.

Notification of Transmittal of the International Search Report and the Written Opinion of the International Searching Authority for Application No. PCT/US2017/048037, dated Nov. 27, 2017, 13 pages.

Notification of Transmittal of the International Search Report and the Written Opinion of the International Searching Authority for Application No. PCT/US2017/048044, dated Nov. 7, 2017, 14 pages.

Notification of Transmittal of the International Search Report and the Written Opinion of the International Searching Authority for Application No. PCT/US2017/048051, dated Nov. 28, 2017, 13 pages.

Notification of Transmittal of the International Search Report and the Written Opinion of the International Searching Authority for Application No. PCT/US2017/048061, dated Nov. 16, 2017, 13 pages.

Notification of Transmittal of the International Search Report and the Written Opinion of the International Searching Authority for Application No. PCT/US2017/048065, dated Nov. 27, 2017, 11 pages.

United States Patent and Trademark Office, Office Action dated Mar. 28, 2019 for U.S. Appl. No. 15/683,556, 15 Pages.

Do, et al., "Toward a Statistical Data Integration Environment—The Role of Semantic Metadata", Semantics '15, Sep. 15-17, 2015, pp. 25-32, 8 pages.

Li, et al., "A Methodology for Semantic Integration of Metadata in Bioinformatics Data Sources", 43rd ACM Southeast Conference, Mar. 18-20, 2005, pp. 131-136, 6 pages.

United States Patent and Trademark Office, Notice of Allowance dated Aug. 13, 2019 for U.S. Appl. No. 15/683,554, 8 Pages.

United States Patent and Trademark Office, Office Action dated Oct. 1, 2019 for U.S. Appl. No. 15/683,563, 8 Pages.

United States Patent and Trademark Office, Notice of Allowance dated Nov. 5, 2019 for U.S. Appl. No. 15/683,556, 22 Pages.

United States Patent and Trademark Office, Office Action dated Nov. 18, 2019 for U.S. Appl. No. 15/683,567, 19 Pages.

Dohzen, et al., "Data Integration through Transform Reuse in the Morpheus Project", SIGMOD 2006, Jun. 27-29, 2006, pp. 736-738, 3 pages.

United States Patent and Trademark Office, Notice of Allowance dated Dec. 12, 2019 for U.S. Appl. No. 15/683,554, 8 pages.

United States Patent and Trademark Office, Notice of Allowance dated Dec. 13, 2019 for U.S. Appl. No. 15/683,559, 8 pages.

United States Patent and Trademark Office, Notice of Allowance dated Feb. 20, 2020 for U.S. Appl. No. 15/683,556, 10 pages.

"Amazon Kinesis", Amazon Web Services, retrieved from: https://aws.amazon.com/kinesis/ on Dec. 11, 2020, 11 pages.

"Amazon s3", Amazon Web Services, retrieved from: https://aws.amazon.com/s3/ on Dec. 11, 2020, 14 pages.

"Apache Hadoop", Apache Software Foundation, retrieved from: https://hadoop.apache.org/on Dec. 11, 2020, 3 pages.

"Azure Machine Learning", Microsoft, retrieved from: https://azure.microsoft.com/en-us/services/machine-learning/ on Dec. 11, 2020, 13 pages.

"AWS Data Pipeline", Amazon Web Services, retrieved from: https://aws.amazon.com/datapipeline/ on Dec. 11, 2020, 5 pages.

"Compute Engine", Google, retrieved from: https://cloud.google.com/compute on Dec. 11, 2020, 19 pages.

"Data Factory", Microsoft, retrieved from: https://azure.microsoft.com/en-us/services/data-factory/ on Dec. 11, 2020, 10 pages.

"Dataflow", Google, retrieved from: https://cloud.google.com/dataflow on Dec. 11, 2020, 15 pages.

"HDInsight", Microsoft, retrieved from: https://azure.microsoft.com/en-us/services/hdinsight/ on Dec. 11, 2020, 8 pages.

"Introduction to AI Platform", Google, retrieved from: https://cloud.google.com/ai-platform/docs/technical-overview on Dec. 11, 2020, 5 pages.

"Machine Learning on AWS", Amazon Web Services, retrieved from: https://aws.amazon.com/machine-learning/ on Dec. 11, 2020, 24 pages.

"Prediction overview", Google, retrieved from: https://cloud.google.com/ai-platform/prediction/docs/overview on Dec. 11, 2020, 15 pages.

"Sneak peek: Google Cloud Dataflow, a Cloud-native data processing service", Google Cloud Platform Blog, Jun. 26, 2014; retrieved from: https://cloudplatform.googleblog.com/2014/06/sneak-peek-google-cloud-dataflow-a-cloud-native-data-processing-service.html on Dec. 11, 2020, 3 pages.

"What is Amazon Machine Learning?", Amazon Web Services, retrieved from: https://docs.aws.amazon.com/machine-learning/latest/dg/what-is-amazon-machine-learning.html on Dec. 11, 2020, 1 page.

"What is AWS Data Pipeline?", Amazon Web Services, retrieved from: https://docs.aws.amazon.com/datapipeline/latest/DeveloperGuide/what-is-datapipeline.html on Dec. 11, 2020, 2 pages.

"What is Azure Data Factory?", Microsoft, Sep. 30, 2019; retrieved from: https://docs.microsoft.com/en-us/azure/data-factory/introduction on Dec. 11, 2020, 7 pages.

"What is Azure HDInsight?", Microsoft, Aug. 21, 2020; retrieved from: https://docs.microsoft.com/en-us/azure/hdinsight/hdinsight-overview on Dec. 11, 2020, 8 pages.

"What is Azure Machine Learning?", Microsoft, Nov. 4, 2019; retrieved from: https://docs.microsoft.com/en-us/azure/machine-learning/overview-what-is-azure-ml on Dec. 11, 2020, 6 pages.

United States Patent and Trademark Office, Notice of Allowance dated May 8, 2020 for U.S. Appl. No. 15/683,563, 9 pages.

Indian Patent Office, First Examination Report dated Oct. 12, 2020 for Indian Patent Application No. 201847022905,6 pages.

Indian Patent Office, First Examination Report dated Oct. 17, 2020 for Indian Patent Application No. 201847023010, 9 pages.

Indian Patent Office, First Examination Report dated Oct. 30, 2020 for Indian Patent Application No. 201847022738, 7 pages.

Indian Patent Office, First Examination Report dated Nov. 26, 2020 for Indian Patent Application No. 201847023400, 7 pages.

Indian Patent Office, First Examination Report dated Dec. 23, 2020 for Indian Patent Application No. 201847023196, 8 pages.

United States Patent and Trademark Office, Notice of Allowance dated Dec. 28, 2020 for U.S. Appl. No. 15/683,567, 12 pages.

(56) References Cited

OTHER PUBLICATIONS

Indian Patent Office, First Examination Report dated Jan. 12, 2021 for Indian Patent Application No. 201847023631, 9 pages.
Japanese Patent Office, Office Action dated May 11, 2021 for Japanese Patent Application No. 2018-543103, 7 pages.
Chinese Patent Office, Office Action dated Apr. 6, 2021 for Chinese Patent Application No. 201780012429.4, 11 pages.
Amazon Web Services, "AWS Lambda—Serverless Compute", retrieved from https://aws.amazon.com/lambda/ on Mar. 29, 2021, 14 pages.
Amazon Web Services, "Big Data Analytics Options on AWS", Jan. 2016, 50 pages.
Amazon Web Services, "Big Data Analytics Options on AWS", Dec. 2018, 56 pages.
Amazon Web Services, "Lambda Architecture for Batch and Real-Time Processing on AWS with Spark Streaming and Spark SQL", May 2015, 12 pages.
Amazon Web Services, "Lambda Architecture for Batch and Stream Processing", Oct. 2018, 12 pages.
Amazon Web Services, "Practicing Continuous Integration and Continuous Delivery on AWS", AWS Whitepaper, Jun. 2017, 33 pages.
Amazon Web Services, "Serverless Architectures with AWS Lambda", Overview and Best Practices, Nov. 2017, 50 pages.
Amazon Web Services, "Serverless Architectures with AWS Lambda", AWS Whitepaper, Nov. 2017, 37 pages.
Swensson, Eric; "Big Data Analytics Options on AWS: Updated White Paper", published Feb. 12, 2016, retrieved from AWS Big Data Blog, https://aws.amazon.com/blogs/big-data/big-data-analytics-options-on-aw/, 9 pages.
Japanese Patent Office, Office Action dated May 11, 2021 for Japanese Patent Application No. 2018-543165, 5 pages.
Japanese Patent Office, Office Action dated May 11, 2021 for Japanese Patent Application No. 2018-543176, 6 pages.
United States Patent and Trademark Office, Notice of Allowance dated May 14, 2021 for U.S. Appl. No. 15/683,567, 10 pages.
Japanese Patent Office, Office Action dated May 18, 2021 for Japanese Patent Application No. 2018-543097, 3 pages.
European Patent Office, Communication pursuant to Article 94(3) EPC dated Apr. 20, 2021 for EP Application No. 17761679.4, 5 pages.

\* cited by examiner

SYSTEM AND METHOD FOR AUTOMATED MAPPING OF DATA TYPES FOR USE WITH DATAFLOW ENVIRONMENTS

CLAIM OF PRIORITY

This application claims the benefit of priority to U.S. Provisional Patent Applications titled "SYSTEM AND METHOD FOR AUTOMATED MAPPING OF DATA TYPES BETWEEN CLOUD AND DATABASE SERVICES", Application No. 62/378,143, filed Aug. 22, 2016; "SYSTEM AND METHOD FOR DYNAMIC, INCREMENTAL RECOMMENDATIONS WITHIN REAL-TIME VISUAL SIMULATION", Application No. 62/378,146, filed Aug. 22, 2016; "SYSTEM AND METHOD FOR INFERENCING OF DATA TRANSFORMATIONS THROUGH PATTERN DECOMPOSITION", Application No. 62/378,147, filed Aug. 22, 2016; "SYSTEM AND METHOD FOR ONTOLOGY INDUCTION THROUGH STATISTICAL PROFILING AND REFERENCE SCHEMA MATCHING", Application No. 62/378,150, filed Aug. 22, 2016; "SYSTEM AND METHOD FOR METADATA-DRIVEN EXTERNAL INTERFACE GENERATION OF APPLICATION PROGRAMMING INTERFACES", Application No. 62/378,151, filed Aug. 22, 2016; and "SYSTEM AND METHOD FOR DYNAMIC LINEAGE TRACKING AND RECONSTRUCTION OF COMPLEX BUSINESS ENTITIES WITH HIGH-LEVEL POLICIES", Application No. 62/378,152, filed Aug. 22, 2016; each of which above applications are herein incorporated by reference.

CROSS-REFERENCE TO RELATED APPLICATIONS

This application is related to U.S. Patent Applications titled "SYSTEM AND METHOD FOR DYNAMIC, INCREMENTAL RECOMMENDATIONS WITHIN REAL-TIME VISUAL SIMULATION", application Ser. No. 15/683,554, filed Aug. 22, 2017; "SYSTEM AND METHOD FOR INFERENCING OF DATA TRANSFORMATIONS THROUGH PATTERN DECOMPOSITION", application Ser. No. 15/683,556, filed Aug. 22, 2017; "SYSTEM AND METHOD FOR ONTOLOGY INDUCTION THROUGH STATISTICAL PROFILING AND REFERENCE SCHEMA MATCHING", application Ser. No. 15/683,559, filed Aug. 22, 2017; "SYSTEM AND METHOD FOR METADATA-DRIVEN EXTERNAL INTERFACE GENERATION OF APPLICATION PROGRAMMING INTERFACES", Application Ser. No. 15/683,563, filed Aug. 22, 2017; and "SYSTEM AND METHOD FOR DYNAMIC LINEAGE TRACKING, RECONSTRUCTION, AND LIFECYCLE MANAGEMENT", application Ser. No. 15/683,567, filed Aug. 22, 2017; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to methods of integrating data obtained from various sources, and are particularly related to automated mapping of data types for use with dataflow environments.

BACKGROUND

Many of today's computing environments require an ability to share large amounts of data among different types of software applications. However, distributed applications may be markedly different in their configurations due to, for example, differences in their types of data supported; or their execution environments. An application's configuration may depend, for example, on its application programming interfaces, runtime environment, deployment scheme, lifecycle management, or security management.

Software design tools intended for use in developing such distributed applications tend to be resource-intensive, often requiring the services of a human domain model expert to curate application and data integrations. Consequently, application developers who are faced with the task of building complex, scalable, distributed applications, that will be used to integrate different types of data among different types of execution environments, must generally expend a substantial amount of manual effort to design, build, and configure those applications.

SUMMARY

In accordance with various embodiments, described herein is a system (Data Artificial Intelligence system, Data AI system), for use with a data integration or other computing environment, that leverages machine learning (ML, DataFlow Machine Learning, DFML), for use in managing a flow of data (dataflow, DF), and building complex dataflow software applications (dataflow applications, pipelines). In accordance with an embodiment, the system can provide support for auto-mapping of complex data structures, datasets or entities, between one or more sources or targets of data, referred to herein in some embodiments as HUBs. The auto-mapping can be driven by a metadata, schema, and statistical profiling of a dataset; and used to map a source dataset or entity associated with an input HUB, to a target dataset or entity or vice versa, to produce an output data prepared in a format or organization (projection) for use with one or more output HUBs.

DETAILED DESCRIPTION

Figure 1:
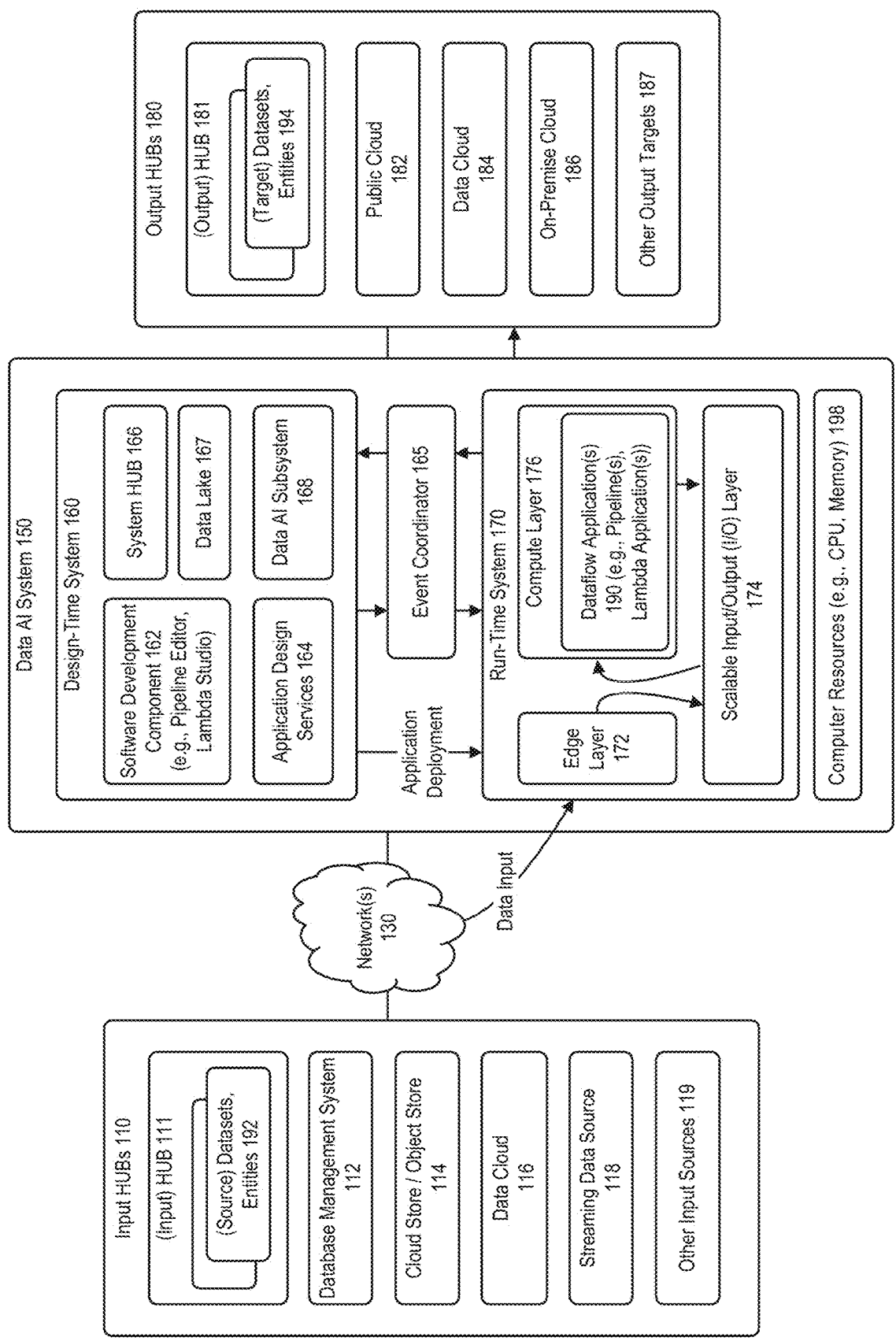
FIG. 1 illustrates a system for providing data flow artificial intelligence, in accordance with an embodiment.

The foregoing, together with additional embodiments and features thereof will become apparent upon referring to the following description including specification, claims, and accompanying drawings. In the following description, for purposes of explanation, specific details are set forth in order to provide a thorough understanding of various embodiments of the invention. However, it will be apparent that various embodiments can be practiced without these specific details. The following description including specification, claims, and accompanying drawings are not intended to be restrictive.

INTRODUCTION

In accordance with various embodiments, described herein is a system (Data Artificial Intelligence system, Data AI system), for use with a data integration or other computing environment, that leverages machine learning (ML, DataFlow Machine Learning, DFML), for use in managing a flow of data (dataflow, DF), and building complex dataflow software applications (dataflow applications, pipelines).

In accordance with an embodiment, the system can provide support for auto-mapping of complex data structures, datasets or entities, between one or more sources or targets of data, referred to herein in some embodiments as HUBs. The auto-mapping can be driven by a metadata, schema, and statistical profiling of a dataset; and used to map a source dataset or entity associated with an input HUB, to a target dataset or entity or vice versa, to produce an output data prepared in a format or organization (projection) for use with one or more output HUBs.

In accordance with an embodiment, the system can include a software development component and graphical user interface, referred to herein in some embodiments as a pipeline editor, or Lambda Studio IDE, that provides a visual environment for use with the system, including providing real-time recommendations for performing semantic actions on data accessed from an input HUB, based on an understanding of the meaning or semantics associated with the data.

In accordance with an embodiment, the system can provide a service to recommend actions and transformations, on an input data, based on patterns identified from the functional decomposition of a data flow for a software application, including determining possible transformations of the data flow in subsequent applications. Data flows can be decomposed into a model describing transformations of data, predicates, and business rules applied to the data, and attributes used in the data flows.

In accordance with an embodiment, the system can perform an ontology analysis of a schema definition, to determine the types of data, and datasets or entities, associated with that schema; and generate, or update, a model from a reference schema that includes an ontology defined based on relationships between datasets or entities, and their attributes. A reference HUB including one or more schemas can be used to analyze data flows, and further classify or make recommendations such as, for example, transformations enrichments, filtering, or cross-entity data fusion of an input data.

In accordance with an embodiment, the system provides a programmatic interface, referred to herein in some embodiments as a foreign function interface, by which a user or third-party can define a service, functional and business types, semantic actions, and patterns or predefined complex data flows based on functional and business types, in a declarative manner, to extend the functionality of the system.

In accordance with an embodiment, the system can provide data governance functionality such as, for example, provenance (where a particular data came from), lineage (how the data was acquired/processed), security (who was responsible for the data), classification (what is the data about), impact (how impactful is the data to a business), retention (how long should the data live), and validity (whether the data should be excluded/included for analysis/processing), for each slice of data pertinent to a particular snapshot in time; which can then be used in making lifecycle decisions and dataflow recommendations.

In accordance with an embodiment, the system can be implemented as a service, for example as a cloud service provided within a cloud-based computing environment; and can serve as a single point of control for the design, simulation, deployment, development, operation, and analysis of data for use with software applications; including enabling data input from one or more sources of data (for example, in an embodiment, an input HUB); providing a graphical user interface that enables a user to specify an application for the data; and, scaling the data depending on an intended destination, use, or target for the data (for example, in an embodiment, an output HUB).

In accordance with an embodiment, as used herein, the terms "input" and "output" when used with reference to a particular HUB are provided merely as labels to reflect the apparent flow of data in particular use cases or examples, and are not intended to be restrictive as to the type or function of the particular HUB.

For example, in accordance with an embodiment, an input HUB that operates as a source of data can also, at the same or at another time, operate as an output HUB or target to receive the same, or another data, and vice versa.

Additionally, while for purposes of illustration, several of the examples described herein illustrate the use of an input HUB and an output HUB; in accordance with an embodiment, in practical implementations, a data integration or other computing environment can include a plurality of such HUBs, at least some of which are acting both as input HUBs and/or output HUBs.

In accordance with an embodiment, the system enables rapid development of software applications in large, e.g., cloud-based, computing environments, where data models may evolve rapidly, and where features such as, for example, search, recommendations, or suggestions are valuable business requirements. In such environments, the combination of artificial intelligence (AI) and semantic search empowers users to accomplish more with their existing systems. For example, integration interactions, such as attribute-level mappings, can be recommended based on an understanding of metadata, data, and a user's interactions with the system.

In accordance with an embodiment, the system can also be used to suggest complex cases, for example interesting dimensional edges, which can be used to analyze information, and which enable users to discover hitherto unknown facts within their data.

In some embodiments, the system provides a graphical user interface that enables the automation of manual tasks (e.g., recommendations or suggestions), and leverages machine learning and probabilistic knowledge federation, to provide a useful context for users, and allow for discovery and semantics-driven solutions, for example, the creation of a data warehouse, scaling of services, data preparation and enrichment, and design and monitoring of software applications.

In accordance with various embodiments, the system can include or utilize some or all of the following features:

Design-Time System: In accordance with an embodiment, a computational environment that enables the design, creation, monitoring, and management of software applications (for example, a dataflow application, pipeline, or Lambda application), including the use of an, e.g., data AI subsystem, that provides machine learning capabilities.

Run-Time System: In accordance with an embodiment, a computational environment that enables the execution of software applications (for example, a dataflow application, pipeline, or Lambda application), and that receives input from, and provides recommendations to, a design-time system.

Pipeline: In accordance with an embodiment, a declarative means of defining a processing pipeline, having a plurality of stages or semantic actions, each of which corresponds to a function such as, for example, one or more of filtering, joining, enriching, transforming, or fusion of an input data, for preparation as an output data. A dataflow software application, or dataflow application, representing a data flow in, e.g., DFML. In accordance with an embodiment, the system supports a declarative pipeline design that can use a same code base (e.g., with a Spark runtime platform) for both batch (historical) and real time (streaming) data processing; and also supports the building of pipelines or applications that can operate on real time date streams, for real time data analytics. Data reprocessing due to pipeline design changes can be handled through rolling upgrades of deployed pipelines. In accordance with an embodiment, a pipeline can be provided as a Lambda application that can accommodate the processing of real time data and batch data within distinct batch and real time layers.

HUB: In accordance with an embodiment, a data source or target (cloud or on-premise) comprising datasets or entities. A data source, that can be introspected, from which data can be consumed or published to, and which comprises datasets or entities, that have attributes, semantics or relationships with other datasets or entities. Examples of HUBs include streaming data, telemetric, batch-based, structured or unstructured, or other types of data sources. Data can be received from one HUB, associated with a source dataset or entity, and mapped to a target dataset or entity at the same or another HUB.

System HUB: In accordance with an embodiment, a system HUB can operate as a knowledge source to store profile information and other metadata that can be associated with other HUBs, and datasets or entities, in those HUBs, and can also operate in the manner of a regular HUB as a source or recipient of data to be processed. A central repository in, e.g., DFML where metadata and state of the system is managed.

Dataset (Entity): In accordance with an embodiment, a data structure comprising attributes (e.g., columns), that can be owned by or otherwise associated with one or more HUBs, for example a database table, view, file or API. In accordance with an embodiment, one or more business entities, for example customer records, that can function as a semantic business type, and are stored as data components, such as, for example, tables, within a HUB. Datasets or entities can have relationships to other datasets or entities; together with attributes, such as, for example, a column in a table; and a data type, such as, for example, string or integer. In accordance with an embodiment, the system supports a schema agnostic processing of all types of data (including for example, structured, semi-structured, or unstructured data) during, for example, enrichment, preparation, transformation, model training, or scoring operations.

Data AI Subsystem: In accordance with an embodiment, a component of a system, such as, for example, a Data AI system, responsible for machine-learning and semantic related functions, including one or more of search, profiling, providing a recommendation engine, or support for automapping. The data AI subsystem can support, through an event coordinator, the operations of design-time systems, for example a software development component, e.g., Lambda Studio, and can provide recommendations based on the continued processing of data by dataflow applications (e.g., pipelines, Lambda applications), for example to recommend the modification of an existing, e.g., pipeline, to take better advantage of the data being processed. A data AI subsystem can analyze amounts of input data, and continuously update a domain-knowledge model. During the processing of a dataflow application (e.g., pipeline), each stage of the, e.g., pipeline, can proceed, based on recommended alternatives or options provided by the data AI subsystem, the updated domain model, and inputs from users, e.g., to accept or reject a recommended semantic action.

Event Coordinator: In accordance with an embodiment, an event-driven architecture (EDA) component that operates between the design-time and run-time systems, to coordinate events related to the design, creation, monitoring, and management of dataflow applications (e.g., pipelines, Lambda applications). For example, the event coordinator can receive a published notification of data from a HUB (e.g., new data conforming to a known data type), normalize the data from that HUB, and provide the normalized data to a set of subscribers, for use by, e.g., pipelines, or other downstream consumers. The event coordinator can also receive notification of state transactions within the system, for use in logging, or lineage tracking, including the creation of temporal slices; and schema evolution.

Profiling: In accordance with an embodiment, the operation of extracting a sample of data from a HUB, in order to profile the data provided by that HUB, and the datasets or entities, and attributes within that HUB; together with determining metrics associated with sampling the HUB, and updating the metadata associated with a HUB to reflect a profile of the data in that HUB.

Software Development Component (Lambda Studio): In accordance with an embodiment, a design-time system tool that provides a graphical user interface to enable a user to create, monitor, and manage the lifecycle of a pipeline or Lambda application as a pipeline of semantic actions. A graphical user interface (UI, GUI) or studio that allows users to design, e.g., pipelines, Lambda applications.

Semantic Action: In accordance with an embodiment, a data transformation function, for example a relational algebraic operation. An action that can be performed by dataflow applications (e.g., pipelines, Lambda applications) on a dataset or entity within a HUB, for projection onto another entity. A semantic action operates as a higher-order function that can be used across different models, or HUBs, that can receive a dataset input, and produce a dataset output. Semantic actions can include mappings, and can be continuously updated by, e.g., the data AI subsystem, in response to processing data as part of an e.g., pipeline, or Lambda application.

Mapping: In accordance with an embodiment, a recommended mapping of a semantic action between a first (e.g., source) dataset or entity, and another (e.g., target) dataset or entity, provided by, e.g., the data AI subsystem, and made accessible through the design-time system, e.g., via the software development component, Lambda Studio. For example, a data AI subsystem can provide auto-mapping as a service, wherein the auto-mapping can be driven by a metadata, schema, and statistical profiling of a dataset, based on a machine learning analysis of a metadata associated with a HUB or data input, and a profiling of the data itself.

Pattern: In accordance with an embodiment, a pattern of semantic actions that can be performed by a dataflow application (e.g., a pipeline, Lambda application). A template can be used to provide a definition of a pattern that can be reused by other applications. A data flow representing a logical flow of data and associated transformations usually associated with business semantics and processes.

Policies: In accordance with an embodiment, a set of policies that control how dataflow applications (e.g., pipelines, Lambda applications are scheduled, which users or components can access which HUBs and semantic actions, and how data should be aged, or other considerations. A configuration setting that defines how an, e.g., pipeline, is, for example, scheduled, executed, or accessed.

Application Design Services: In accordance with an embodiment, provides data flow, e.g., pipeline, Lambda application specific services such as, for example, validation, compiling, packaging, deployment, to other, e.g., DFML services (e.g., UI, system façade). A design-time system component that validates the pipeline of an, e.g., pipeline, or Lambda application in the software development component, e.g., Lambda Studio (e.g., its inputs and outputs), persists the pipeline, and controls the deployment of the pipeline, Lambda application, to the system (e.g., to a Spark cluster) for execution, and thereafter can be used in managing the lifecycle or state of the application.

Edge Layer: In accordance with an embodiment, a layer that collects and forwards data to the scalable I/O layer, e.g., as a store and forward layer. A run-time system component that includes one or more nodes that can receive data, e.g., via a gateway that is accessible to the Internet, and that includes security and other features that support secured access to the, e.g., Data AI system.

Compute Layer: In accordance with an embodiment, an application execution and data processing layer (e.g., Spark). A run-time system component operating as a distributed processing component, for example, a Spark cloud service, cluster of compute nodes, collection of virtual machines, or other components or nodes, for use in the execution of, e.g., pipelines, Lambda applications. In a multitenant environment, nodes within the compute layer can be allocated to tenants for use in executing pipelines or Lambda applications by those tenants.

Scalable Input/Output (I/O) Layer: In accordance with an embodiment, provides scalable data persistence and access layer structured as topics and partitions (e.g., Kafka). A run-time system component providing a queue or other logical storage that allows data to be moved within the system, and shared between the various components of the system, for example, a Kafka environment. In a multitenant environment, the scalable I/O layer can be shared among multiple tenants.

Data Lake: In accordance with an embodiment, a repository for the persistence of information from the system HUB, or other components. A repository of data in, e.g., DFML, usually normalized or processed by, e.g., pipelines, Lambda applications, and consumed by other pipelines, Lambda applications or a publish layer.

Registries: In accordance with an embodiment, one or more repositories of information, e.g., for storage of functional and business types, that are used in the decomposition of, e.g., pipelines, Lambda applications into their functional components.

DataFlow Machine Learning (DFML): In accordance with an embodiment, a data integration, data flow management system that leverages machine learning (ML) to assist in the building of complex dataflow applications.

Metadata: In accordance with an embodiment, an underlying definition, description of the datasets or entities, and attributes and their relationships. It can also be descriptive data about an artifact in, e.g., DFML.

Data: In accordance with an embodiment, an application data represented by the datasets or entities. They can be batch or stream. For example, customers, orders, or products.

System Façade: In accordance with an embodiment, a unified API Layer to access the functional capabilities of an e.g., DFML event-driven architecture.

Data AI subsystem: In accordance with an embodiment, provides artificial intelligence (AI) services including but not limited to, for example, search, auto-map, recommendation, or profiling.

Streaming Entity: In accordance with an embodiment, continuous input of data and near real time processing and output requirements, which may support an emphasis on velocity of data.

Batch Entity: In accordance with an embodiment, scheduled or on-request ingestion of data, which can be characterized by an emphasis on volume.

Data Slice: In accordance with an embodiment, a partition of data usually marked by time.

Rule: In accordance with an embodiment, represents a directive governing artifacts in, e.g., DFML, for example data rules, relationship rules, metadata rules and complex or hybrid rules.

Recommendation (Data AI): In accordance with an embodiment, a proposed course of action usually represented by one or more semantic actions or fine grained directives to assist in the design of, e.g., pipelines, Lambda applications.

Search (Data AI): In accordance with an embodiment, a semantic search in, e.g., DFML, characterized by the context and the intent of the user to return relevant artifacts.

Auto-map (Data AI): In accordance with an embodiment, a type of recommendation that shortlists the candidate source or target datasets or entities, to be used in a data flow.

Data Profiling (Data AI): In accordance with an embodiment, a collection of several metrics, for example, min value, max value, inter-quartile range, or sparsity, that characterize data in an attribute belonging to a dataset or entity.

Action Parameter: In accordance with an embodiment, a reference to datasets on which the semantic actions are performed. For example, the parameters to an equi-join in an, e.g., pipeline, Lambda application.

Foreign Function Interface: In accordance with an embodiment, a mechanism to register and invoke services (and semantic actions) as part of the, e.g., DFML Lambda application Framework. It can be used to extend the capabilities or transformation vocabulary in, e.g., DFML.

Service: In accordance with an embodiment, an owning artifact in, e.g., DFML, of a collection of semantic actions that can be characterized by a data integration stage (for example, preparation, discovery, transformation, or visualization).

Service Registry: In accordance with an embodiment, a repository of services, their semantic actions and other instance information.

Data Lifecycle: In accordance with an embodiment, the stages in the use of data within, e.g., DFML, starting from ingestion and ending at publication.

Metadata Harvesting: In accordance with an embodiment, the collection of metadata and sample data for profiling, usually after the registration of a HUB.

Normalize Pipelines: In accordance with an embodiment, the standardization of data in a certain format to facilitate consumption by, e.g., pipelines, Lambda applications.

Monitoring: In accordance with an embodiment, identifying, measuring and evaluating the performance of an, e.g., pipeline, Lambda application.

Ingest: In accordance with an embodiment, the intake of data through the edge layer in, e.g., DFML.

Publish: In accordance with an embodiment, the writing data to a target end point from, e.g., DFML.

Data AI System

FIG. 1 illustrates a system for providing data flow artificial intelligence, in accordance with an embodiment.

As illustrated in FIG. 1, in accordance with an embodiment, a system, e.g., data AI system 150, can provide one or more services for processing and transforming data such as, for example, business data, consumer data, and enterprise data, including the use of machine learning processing, for use with a variety of computational assets such as, for example, databases, cloud data warehouses, storage systems, or storage services.

In accordance with an embodiment, computational assets can be cloud-based, enterprise-based, or on-premise or agent-based. Various elements of the system can be connected by one or more networks 130.

In accordance with an embodiment, the system can include one or more input HUBs 110 (e.g., sources of data, data sources), and output HUBs 180 (e.g., targets of data, data targets).

In accordance with an embodiment, each input HUB, e.g., HUB 111, can include a plurality of (source) datasets or entities 192.

In accordance with an embodiment, examples of input HUBs can include a database management system (DB, DBMS) 112 (e.g., an on-line transaction processing system (OLTP), business intelligence system, or an on-line analytical processing system (OLAP)). In such examples, the data provided by a source such as, for example, a database management system can be structured or semi-structured.

In accordance with an embodiment, other examples of input HUBs can include a cloud store/object store 114 (e.g., AWS S3, or another object store), which can be a clickstream source or an object bucket with unstructured data; data clouds 116 (e.g., a third-party cloud); a streaming data source 118 (e.g., AWS Kinesis, or another streaming data source), or other input sources 119.

In accordance with an embodiment, input HUBs can include a data source into which data is received from, e.g., an Oracle Big Data Prep (BDP) service.

In accordance with an embodiment, the system can include one or more output HUBs 180 (e.g., output destinations). Each output HUB, e.g., HUB 181, can include a plurality of (target) datasets or entities 194.

In accordance with an embodiment, examples of output HUBs can include a public cloud 182, a data cloud 184 (e.g., AWS and Azure), an on-premise cloud 186, or other output targets 187. Data output provided by the system can be produced for dataflow applications (e.g., pipelines, Lambda applications) accessible at an output HUB.

In accordance with an embodiment, examples of public cloud can be, for example, an Oracle Public Cloud, including services such as, for example, Big Data Prep Cloud Service, Exadata Cloud Service, Big Data Discovery Cloud Service, and Business Intelligence Cloud Service.

In accordance with an embodiment, the system can be implemented as a unified platform for streaming and on-demand (batch) data processing delivered as a service (e.g., as a software-as-a-service) to users, providing scalable, multi-tenant data processing for multiple input HUBs. Data is analyzed in real-time, using machine learning techniques and visual insights and monitoring provided by a graphical user interface as part of the service. Data sets can be fused from multiple input HUBs for output to an output HUB. For example, through data processing services provided by the system, data can be generated for a data warehouse and population in one or more output HUBs.

In accordance with an embodiment, the system provides declarative and programming topologies for transformation, enrichment, routing, classification, and blending of data; and can include a design-time system 160 and a run-time system 170. Users can create applications, such as, for example, dataflow applications (e.g., pipelines, Lambda applications) 190, designed to perform data processing.

In accordance with an embodiment, the design-time system can enable users to design dataflow applications, define data flows, and define data for data flow processing. For example, design-time system can provide a software development component 162 (referred to herein in an embodiment as Lambda Studio) that provides a graphical user interface for creation of dataflow applications.

For example, in accordance with an embodiment, using the software development component, a user can specify input HUBs and output HUBs for creating a data flow for an application. The graphical user interface can present interfaces for services for data integration, which enables a user to create, manipulate, and manage data flow for an application, including the ability to monitor and manage a data flow pipeline dynamically, such as, for example, viewing data lineage and performing forensic analysis.

In accordance with an embodiment, the design-time system can also include application design services 164 for deploying dataflow applications into run-time system.

In accordance with an embodiment, the design-time system can also include one or more system HUBs 166 (e.g., a metadata repository) for storing metadata for processing data flows. The one or more system HUBs can store samples of data, such as, for example, data types including functional and business data types. The information in the system HUB can be used to perform one or more of the techniques disclosed herein. A data lake 167 component, can operate as a repository for the persistence of information from the system HUB.

In accordance with an embodiment, the design-time system can also include a data artificial intelligence (AI) subsystem 168 to perform operations for data artificial intelligence processing. The operations can include the use of ML techniques, for example search and retrieval. The data AI subsystem can sample data for generating metadata for the system HUB.

In accordance with an embodiment, for each input HUB, the data AI subsystem can perform schema object analysis, metadata analysis, sample data, correlation analysis, and classification analysis. The data AI subsystem can provide rich data to dataflow applications by running continuously on data that is input; and can provide recommendations, insights, and type inductions to, for example, pipelines, Lambda applications.

In accordance with an embodiment, the design-time system enables a user to create policies, artifacts and flows that define the functional needs of the use case.

For example, in accordance with an embodiment, the design-time system can provide a graphical user interface to create a HUB to ingest data and define the ingest policy which can be time based or as needed by the related data flows. Upon selecting an input HUB, data can be sampled from the input HUB to profile the sources, such as, for example, performing metadata query, obtaining samples, and obtaining user defined input. The profile can be stored in system HUB. The graphical user interface enables multiple sources to be joined for defining a dataflow pipeline. This can be done by creating a script or by using the guided editor by which data can be visualized at each step. The graphical user interface can provide access to a recommendation service that suggests how the data could be, e.g., corrected, enriched, or joined.

In accordance with an embodiment, during design time, application design services can suggest a suitable structure to analyze the resulting content. The application design services can use a knowledge service (functional type classification) to suggest measures and related dimension hierarchies. Once that is completed, the design-time system can recommend the data flows needed to take the blended data from earlier pipelines and populate a dimensional target structure. Based on the dependency analysis it can also derive and generate the orchestration flow to load/refresh the target schema. For forward-engineering use cases, the design-time system can also generate a HUB to host a target structure and create the target schema.

In accordance with an embodiment, the run-time system can perform processing during run-time of a service for data processing.

In accordance with an embodiment, in the run-time, or operation mode, the policy and flow definitions created by the user are applied and/or executed. For example, such processing can include invoking ingest, transform, model and publish services, to process data in the pipeline.

In accordance with an embodiment, the run-time system can include an edge layer 172, a scalable input/output (I/O) layer 174, and a distributed processing system or compute layer 176. During run-time (e.g., when data is ingested from one or more input HUBs 110), data can be received by edge layer for events that cause the data to be generated.

In accordance with an embodiment, an event coordinator 165 operates between the design-time and run-time systems, to coordinate events related to the design, creation, monitoring, and management of the dataflow applications (e.g., pipelines, Lambda applications).

In accordance with an embodiment, an edge layer sends the data to the scalable I/O layer for routing the data to distributed processing system or compute layer.

In accordance with an embodiment, a distributed processing system or compute layer can implement a pipeline process (on a per-tenant basis) to process data for output.

The distributed processing system can be implemented using, for example, Apache Spark and Alluxio; and can sample data into a data lake before outputting the data to an output HUB. The distributed processing system can communicate with the scalable I/O layer for activation of data for processing.

In accordance with an embodiment, the data AI system, including some or all of the above components, can be provided at, or executed by, one or more computers including, for example, one or more processors (CPU), memory, and persistent storage devices (198).

Event-Driven Architecture

As described previously, in accordance with an embodiment, the system can include an event-driven architecture (EDA) component or event coordinator that operates between the design-time and run-time systems, to coordinate events related to the design, creation, monitoring, and management of dataflow applications (e.g., pipelines, Lambda applications).

Figure 2:
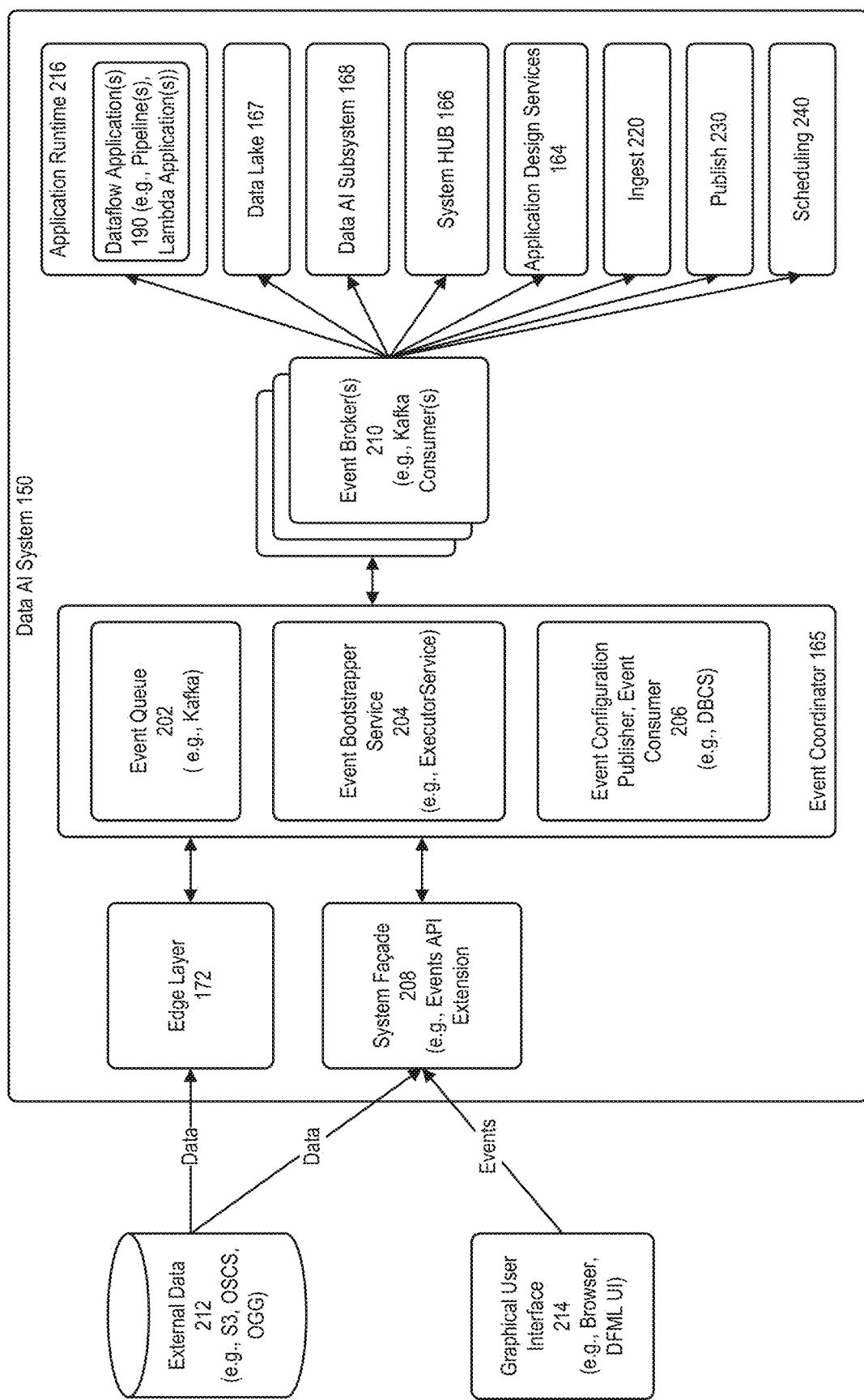
FIG. 2 illustrates an event-driven architecture including an event coordinator for use with a system, in accordance with an embodiment.

FIG. 2 illustrates an event-driven architecture including an event coordinator for use with a system, in accordance with an embodiment.

As illustrated in FIG. 2, in accordance with an embodiment, the event coordinator can include an event queue 202 (e.g., Kafka), event bootstrapper service 204 (e.g., ExecutorService), and event configuration publisher/event consumer 206 (e.g., DBCS).

In accordance with an embodiment, events received at a system façade 208 (e.g., an Events API Extension) can be communicated by one or more event broker(s) 210, e.g., Kafka consumer(s), to various components of the system. For example, data and/or events such as, for example, external data 212 (e.g., S3, OSCS, or OGG data), or inputs from a graphical user interface 214 (e.g., a browser, or DFML UI) can be communicated via the event coordinator, to other components such as, for example, an application runtime 216, data lake, system HUB, data AI subsystem, application design services, as described previously; and/or to ingest 220, publish 230, scheduling 240, or other components.

In accordance with an embodiment, event brokers can be configured as consumers of stream events. The event bootstrapper can start a number of configured event brokers to process events on behalf of registered subscribers; wherein each event broker delegates the processing of the event to the registered callback endpoint for processing a given event. The event coordinator enables registering event types; registering eventing entities; registering events; and registering subscribers. Table 1 provides an example of various event objects, including a publish event, and a subscribe event.

TABLE 1

| | |
|---|---|
| Publish Event | A 2-tuple (event Type, eventing Entity) object that registers the publication of an event by an eventing entity. |
| Subscribe Event | A 2-tuple (event, eventing Entity) object that registers the subscription to an event published by another eventing entity (publisher). |

Event Types

In accordance with an embodiment, event types define a state change of an event that has significance for the system, such as, for example, the creation of a HUB, modification of a dataflow application, e.g., pipeline, Lambda application, ingesting data for a dataset or entity, or publishing data to a target HUB. An example data format, and examples of various event types are described below and in Table 2:

```
{
    "Id":"" ,   // generated at the time of creation
    "Name": "Hub - Creation"
    "Type":"User Event"
}
```

TABLE 2

| | |
|---|---|
| POST/eventTypes | Creating a new eventType. |
| PUT/eventType/{eventide} | Modify an eventType with the given Id. |
| GET/eventTypes | Retrieve all eventTypes in the system. |
| GET/eventTypes/{eventTypeId} | Retrieve the representation of the eventType with the given Id. |
| GET/eventTypes/{eventide}/publishers | Retrieve all the publishers for this eventType. There can be more than one eventing entity registered to publish events of this type, in which case all distinct eventing entities publishing event of this type will be returned. |
| GET/eventTypes/{eventide}/subscribers | Retrieve all the subscribers for this eventType. There can be more than one eventing entity registered as subscribers to events of this type, in which case all distinct eventing entities subscribing to the event of this type will be returned. |
| DELETE/eventTypes/{eventide} | Delete an event with a given Id. |

Eventing Entities

In accordance with an embodiment, an eventing entity can be a publisher and/or subscriber of events. For example, an eventing entity can register to publish one or more events and/or be consumers of one or more events, including registering an endpoint or callback URL that will be used for notifying or sending acknowledgement on publish and delegating processing for subscribed events. Examples of eventing entities can include the metadata service, ingest service, system HUB artifacts, and pipelines, Lambda applications. An example data format, and examples of various eventing entities are described below and in Table 3:

```
{
    "Id":"" ,   // generated at the time of creation
    "Name": "Metadata Service",
    "endPointURL":"localhost:9010/processEvent",
    "entityType":"DFMLService"
}
```

TABLE 3

| | |
|---|---|
| POST/eventingEntities | Creates a new eventing Entity. |
| PUT/eventingEntities/{entityId} | Modify an existing eventing Entity identified by Id. |
| GET/eventingEntities | Retrieve all registered eventing Entities. |
| GET/eventingEntities/{entityId} | Retrieve the representation of the eventing entity with the given Id. |
| GET/eventingEntities/{entityId}/eventsPublished | Retrieve all events registered for publication by this eventing Entity. |
| GET/eventingEntities/{entityId}/eventsSubscribed | Retrieve all events registered for subscription by this eventing Entity. |
| DELETE/eventingEntities/{entityId} | Delete this evening entity from the system. |

Events

In accordance with an embodiment, an event is an instance of an event type that is associated with an eventing entity registered as a publisher; and can have subscribers (eventing entities). For example, a metadata service can register a HUB creating event for publication; and can publish one or more of event instances (once each for HUBs created) for this event. Examples of various events are described in Table 4:

TABLE 4

| | |
|---|---|
| POST/events | Creates a new event to be published by an eventing Entity.<br><br>{<br>  "Id":"" ,<br>  "acknowledgeURL":<br>  "localhost:9010/eventAcknowledge",<br>  "onProcessingOf":"/eventType/{eventId}<br>",<br>  "eventType":"/eventType/{eventId}",<br>  "eventing Entity":"/eventingEntity/{entitId}<br>"<br>} |
| PUT/events/{eventid} | Modifies an existing event registered for publication by an eventing entity. |
| POST/events/{eventid}/publish | Publishes an event instance enqueuing the event for consumption.<br><br>{<br>  "event_type": "data",<br>  "subtype": "publication",<br>  "state": "ready",<br>  "context":<br>{"eventContextId":"{eventId}","accessToken":""}<br>  "message": {<br>    _actual event data goes here_<br>  }<br>} |
| GET/events | Retrieve all events registered in the system. |
| GET/events/{eventide} | Retrieve the event with the given Id. |
| GET/events/{eventide}/publisher | Retrieve the publisher of this event. |
| GET/events/{eventide}/subscribers | Retrieve the subscribers for this event. |
| POST/events/{eventid}/subscribers | Registering a subscriber for an event.<br><br>{<br>  "Id":"" ,   // generated at the time of creation<br>  "processingURL":<br>  "localhost:9010/eventProcess",<br>  "subscribingEvent":"/events/{eventId}",<br>  "callbackMethod":"REST",<br>  "subscriberentity":"/eventingEntity/{entitId}"<br>} |
| PUT /events/{eventid}/subscribers/{subscriberId} | Modify the properties of the subscriber for this event. |
| DELETE /events/{eventid}/subscribers/{subscriberId} | Delete the subscriber for this event. |
| DELETE/events/{eventide} | Delete the event. |

EXAMPLES

In accordance with an embodiment, the following examples illustrate creating an event type; registering a publish event; registering subscribers; publishing an event; getting event types; getting publishers for an event type; and getting subscribers for an event type.

```
POST  http://den00tnk:9021/dfml/service/eventType
{"name":"DATA_INGESTED",
 "type":"SystemEvent"
}
```

Which returns a universally unique ID (UUID), for example "8e87039b-a8b7-4512-862c-fdb05b968888". Eventing objects can publish or subscribe to events in the system. Service endpoints such as, for example, ingest service, metadata service, and application design service can be publish and subscribe events with static endpoints for acknowledge, notification, error, or processing. DFML artifacts (e.g., DFMLEntity, DFMLLambdaApp, DFMLHub) can also be registered as eventing objects; instances of these types can publish and subscribe to events without registering as eventing objects.

```
POST http://den00tnk:9021/dfml/service/eventEntity
{
  "name": "DFMLEntity",
  "endPointURL":"localhost:9010/<publisherURL>",
  "notificationEndPointURL":"http://den00tnk:9021/<publisherURL>/notification",
  "exceptionEndPointURL":"http://den00tnk:9021/<publisherURL>/exception",
  "errorEndPointURL":"http://den00tnk:9021/<publisherURL>/error",
  "entityType":"DFMLEntity"
}
```

The following example registers the DFMLLambdaApps (type) as an eventing Object.

```
{
  "name": "DFMLLambdaApps",
  "endPointURL":"localhost:9010/<publisherURL>",
  "notificationEndPointURL":"http://den00tnk:9021/<publisherURL>/notification",
  "exceptionEndPointURL":"http://den00tnk:9021/<publisherURL>/exception",
  "errorEndPointURL":"http://den00tnk:9021/<publisherURL>/error",
  "entityType":"DFMLLambdaApps"
}
```

For eventing entities that are of type HUB, Entity and LambdaApp, the <publisherURL> can be annotated in REST endpoint URL's, and the event-driven architecture will derive the actual URL by replacing the DFML artifact instance URL. For example, if a notificationEndpointURL is registered as http://den00tnk:9021/<publisherURL>/notification and the publisher URL specified as part of the message is hubs/1234/entities/3456, then the URL invoked for notification will be http://den00tnk:9021/hubs/1234/entities/3456/notification. The POST returns a UUID; for example "185cb819-7599-475b-99a7-65e0bd2ab947".

Registering a Publish Event

In accordance with an embodiment, a publish event can be registered as:

```
POST http://den00tnk:9021/dfml/service/event
{
  "acknowledgeURL":"http://den00tnk:9021/<publisherURL>/acknowledge",
  "onProcessingOf":"/eventType/{eventId}",
  "eventType":"7ea92c868e87039b-a8b7-4512-862c-fdb05b968888",
  "publishingEntity":"185cb819-7599-475b-99a7-65e0bd2ab947"
}
```

The eventType refers to the UUID returned for registering the event type DATA_INGESTED and the publishingEntity refers to the DFMLEntity type registered as eventing Object. The registration returns a UUID, for example "2c7a4b6f-73ba-4247-a07a-806ef659def5".

Registering Subscribers

In accordance with an embodiment, a subscriber can be registered as:

```
POST http://den00tnk:9021/dfml/service/event/2c7a4b6f-73ba-4247-a07a-806ef659def5/subscribers
```

The UUID returned from the publish event registration is used in the path segment for registering a subscriber.

```
{
  "processingURL": "http://den00tnk:9021/dfml/service/eventType/process3",
  "callbackMethod":"SYNC_POST",
  "subscriberEntity":"7599916b-baab-409c-bfe0-5334f111ef41",
  "publisherURL":"/hubs/1234/entities/3456",
  "publishingObjectType":"DFMLEntity",
  "subscribingObjectType":"DFMLLambdaApps",
  "subscriberURL":"/lambdaApps/123456"
}
```

The publisherURL and publishingObjectType refers to the instance and type of the publisher object. Here the dataflow (e.g., Lambda) application, in specifying a URI/lambdaApps/123456 is interested in subscribing to the DATA_INGESTED event from the entity/hubs/1234/entities/3456. The registration returns a UUID, for example "1d542da1-e18e-4590-82c0-7fe1c55c5bc8".

Publishing an Event

In accordance with an embodiment, an event can be published as:

```
POST http://den00tnk:9021/dfml/service/event/publish
{
  "event_type":"DATA_AVAILABLE",
  "subtype":"publication",
  "state":"ready",
  "eventTypeId":"2c7a4b6f-73ba-4247-a07a-806ef659def5",
  "publisherURL":"dfml/service/eventType",
  "message": {"id":"1234",
      "descr":"something happened here testing this and this again"
  }
}
```

The publisherURL is used if the publishing object is one of DFMLEntity, DFMLHub or DFMLLambdaApps, and is used to check the instance of the eventing object publishing a message for which the subscriber is enlisted. The publisher URL is also used to derive the notification URL when a subscriber successfully processes the message. The publication returns a message body that was part of the published event.

Getting Event Types

In accordance with an embodiment, event types can be determined as:

```
GET  http://den00tnk:9021/dfml/service/eventType
{
  "eventTypes": [
    {
       "Id": "8e87039b-a8b7-4512-862c-fdb05b9b8888",
```

```
            "name": "DATA_INGESTED",
            "type": "SystemEvent",
            "createdBy": " ",
            "updatedBy": " ",
            "description": " ",
            "typeQualifier": " ",
            "resourceType": " ",
            "verb": " ",
            "operationType": " ",
            "status": " ",
            "annotation": " "
        },
        {
            "Id": "7ea92c86-8db5-42d6-992a-2578a6d025ce",
            "name": "DATA_AVAILABLE",
            "type": "SystemEvent",
            "createdBy": " ",
            "updatedBy": " ",
            "description": " ",
            "typeQualifier": " ",
            "resourceType": " ",
            "verb": " ",
            "operationType": " ",
            "status": " ",
            "annotation": " "
        }
    ]
}
```

Getting Publishers for an Event Type

```
GET  http://den00tnk:9021/dfml/service/eventType/7ea92c86-8db5-42d6-
992a-2578a6d025ce/publishers
{
    "eventingObjects": [
        {
            "Id": "185cb819-7599-475b-99a7-65e0bd2ab947",
            "name": "DFMLEntity",
            "entityType": "DFMLEntity",
            "endPointURL": "localhost:9010/<publisherURL>",
            "notificationEndpointURL":
"http://den00tnk:9021/<publisherURL>/notification",
            "exceptionEndpointURL":
"http://den00tnk:9021/<publisherURL>/exception",
            "errorEndpointURL": "http://den00tnk:9021/<publisherURL>/
                error",
            "acknowledgeEndpointURL": " ",
            "description": " ",
            "entityQualifier": " ",
            "status": " ",
            "annotation": " "
        }
    ]
}
```

Getting Subscribers for an Event Type

In accordance with an embodiment, subscribers for an event type can be determined as:

```
GET  http://den00tnk:9021/dfml/service/eventType/7ea92c86-8db5-42d6-
992a-2578a6d025ce/subscribers
{
    "eventingObjects": [
        {
            "Id": "7599916b-baab-409c-bfe0-5334f111ef41",
            "name": "DFMLLambdaApps",
            "entityType": "DFMLLambdaApps",
            "endPointURL": "localhost:9010/<publisherURL>",
            "notificationEndpointURL":
"http://den00tnk:9021/<publisherURL>/notification",
            "exceptionEndpointURL":
"http://den00tnk:9021/<publisherURL>/exception",
            "errorEndpointURL": "http://den00tnk:9021/<publisherURL>/
                error",
            "acknowledgeEndpointURL": " ",
            "description": " ",
            "entityQualifier": " ",
            "status": " ",
            "annotation": " "
        }
    ]
}
```

The illustrations described above are provided by way of example, to illustrate a particular embodiment of an event coordinator, event types, eventing entities, and events. In accordance with other embodiments, other types of EDAs can be used to provide communication within the system operating between the design-time and run-time systems, to coordinate events related to the design, creation, monitoring, and management of dataflow applications, and other types of event types, eventing entities, and events can be supported.

DataFlow Machine Learning (DFML) Flow

As described previously, in accordance with various embodiments, the system can be used with a data integration or other computing environment, that leverages machine learning (ML, DataFlow Machine Learning, DFML), for use in managing a flow of data (dataflow, DF), and building complex dataflow software applications (e.g., dataflow applications, pipelines, Lambda applications).

Figure 3:
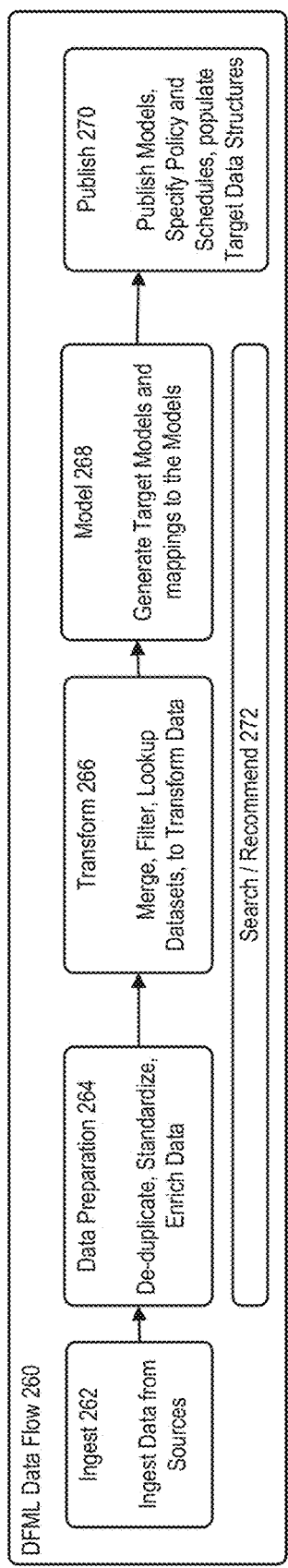
FIG. 3 illustrates the steps in a data flow, in accordance with an embodiment.

FIG. 3 illustrates the steps in a data flow, in accordance with an embodiment.

As illustrated in FIG. 3, in accordance with an embodiment, the processing of a DFML data flow 260 can include a plurality of steps, including an ingest step 262, during which data is ingested from various sources, for example, Salesforce (SFDC), S3, or DBaaS.

During a data preparation step 264, the ingested data can be prepared, for example by being de-duplicated, standardized, or enriched.

During a transform step 266, the system can perform one or more merges, filters, or lookups at datasets, to transform the data.

During a model step 268, one or more models are generated, together with mappings to the models.

During a publish step 270, the system can publish models, specify policies and schedules, and populate target data structures.

In accordance with an embodiment, the system supports the use of a search/recommend functionality 272 throughout each of its data preparation, transform, and model steps. A user can interact with the system through a set of well-defined services that encapsulates the breadth of functional capabilities in data integration frameworks. This set of services define a logical view of the system. For example, in a design mode, the user can create policies, artifacts, and flows that define the functional needs of a particular use case.

Figure 4:
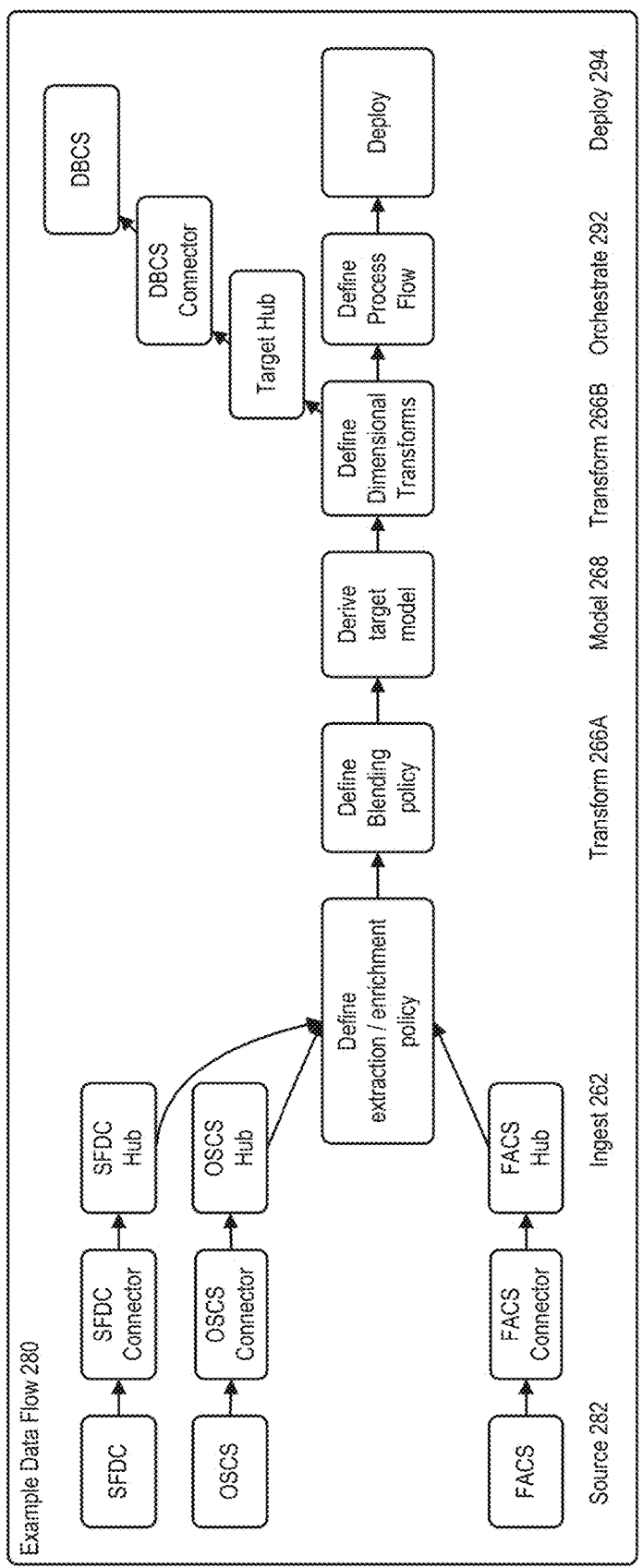
FIG. 4 illustrates an example of a data flow that includes multiple sources, in accordance with an embodiment.

FIG. 4 illustrates an example of a data flow that includes multiple sources, in accordance with an embodiment.

As illustrated in the example data flow 280 shown in FIG. 4, in accordance with an embodiment, the requirement is to take content from a plurality of sources 282, here indicated as SFDC, and FACS (Fusion Apps Cloud Service), together with some files in OSCS (Oracle Storage Cloud Service); blend that information together in a manner that can be used to analyze the desired content; derive a target cube and dimensions; map the blended content to the target structures; and make this content available along with the dimensional model to an Oracle Business Intelligence Cloud Service (BICS) environment; including the use of ingest, transform 266A/266B, model, orchestrate 292, and deploy 294 steps.

The illustrated example is provided to illustrate the techniques described herein; the functionality described herein is not limited to use with these particular data sources.

In accordance with an embodiment, during the ingest step, in order to access and ingest the SFDC content, a HUB is created in the data lake to receive this content. This can be performed, for example, by selecting an SFDC adapter for the relevant access mode (JDBC, REST, SOAP), creating the HUB, providing a name, and defining an ingest policy which could be time based or as needed by the related data flows.

In accordance with an embodiment, a similar process can be performed for the other two sources, the difference being that for the OSCS source, the schema may not be known at the outset, so that can instead be obtained by some means (for example, metadata query, sampling, or user defined).

In accordance with an embodiment, the sources of data can optionally be profiled to investigate the sources further, which may help in deriving recommendations later in the integration flow.

In accordance with an embodiment, the next step is to define how the separate sources can be joined together around a central item, which is typically the basis (fact) for the analysis, and which can be accomplished by defining a dataflow pipeline. This can be done directly by creating a pipeline domain-specific language (DSL) script, or by using the guided editor where the user can see the effect on the data at each step and can take advantage of the recommendation service that suggests how the data could be, e.g., corrected, enriched, joined.

At this point, the user can request that the system suggest a suitable structure to analyze the resulting content. For example, in accordance with an embodiment, the system can use the knowledge service (functional type classification) to suggest measures and related dimension hierarchies. Once that is completed, the system can recommend the data flows needed to take the blended data from the earlier pipeline and populate the dimensional target structure. Based on the dependency analysis it will also derive and generate the orchestration flow to load/refresh the target schema.

In accordance with an embodiment, the system can now generate a HUB to host the target structure and associate it via an adapter to a DBCS generating the data definition language (DDL) needed to create the target schema and, for example, deploy the XDML or whatever form BIOS can use to generate the models needed to access the newly created schema. This can be populated by executing the orchestration flow and triggering the exhaust service.

Figure 5:
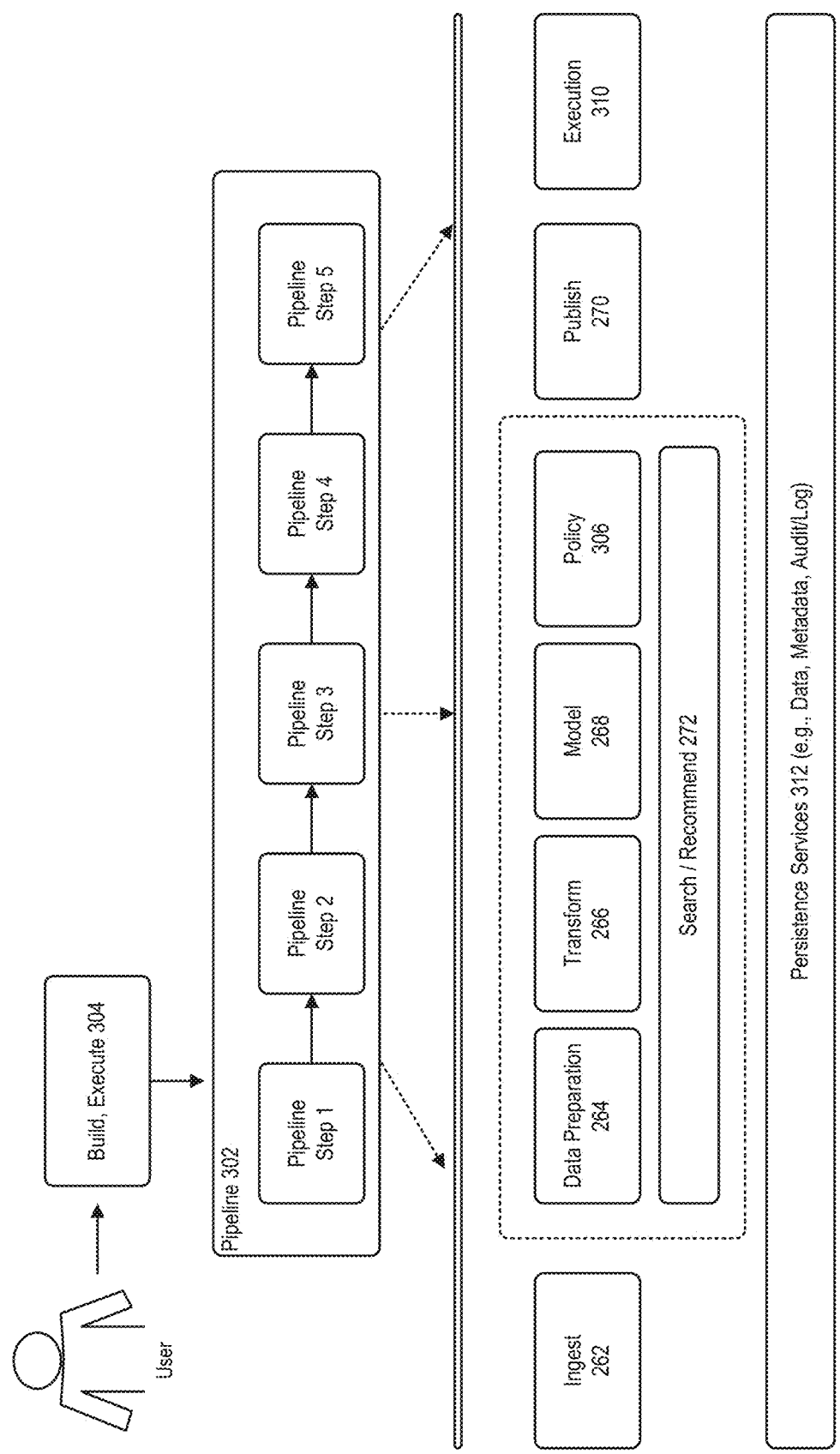
FIG. 5 illustrates an example use of a data flow with a pipeline, in accordance with an embodiment.

FIG. 5 illustrates an example use of a data flow with a pipeline, in accordance with an embodiment.

As illustrated in FIG. 5, in accordance with an embodiment, the system allows users to define pipelines 302 representative of a data flow, in this example including pipeline steps S1 through S5, to describe the processing of data when built/executed 304 as applications.

For example, in accordance with an embodiment, users can invoke ingest, transform, model and publish services, or other services such as, for example, policy 306, execution 310, or persistence services 312, to process data in the pipeline. Users can also define solutions (i.e., a control flow) to specify a unified flow which can integrate related pipelines together. Typically, solutions model a complete use case, for example the loading of a sales cube and associated dimensions.

Data AI System Components

In accordance with an embodiment, adapters enable connection to, and ingest data from, various end points and are specific to application or source type.

In accordance with an embodiment, the system can include a predefined set of adapters, some of which can leverage other SOA adapters, and allow additional adapters to be registered to the framework. There can be more than one adapter for a given connection type; in which cases, the ingest engine will choose the adapter most suited based on the connection type configuration of the HUB.

Figure 6:
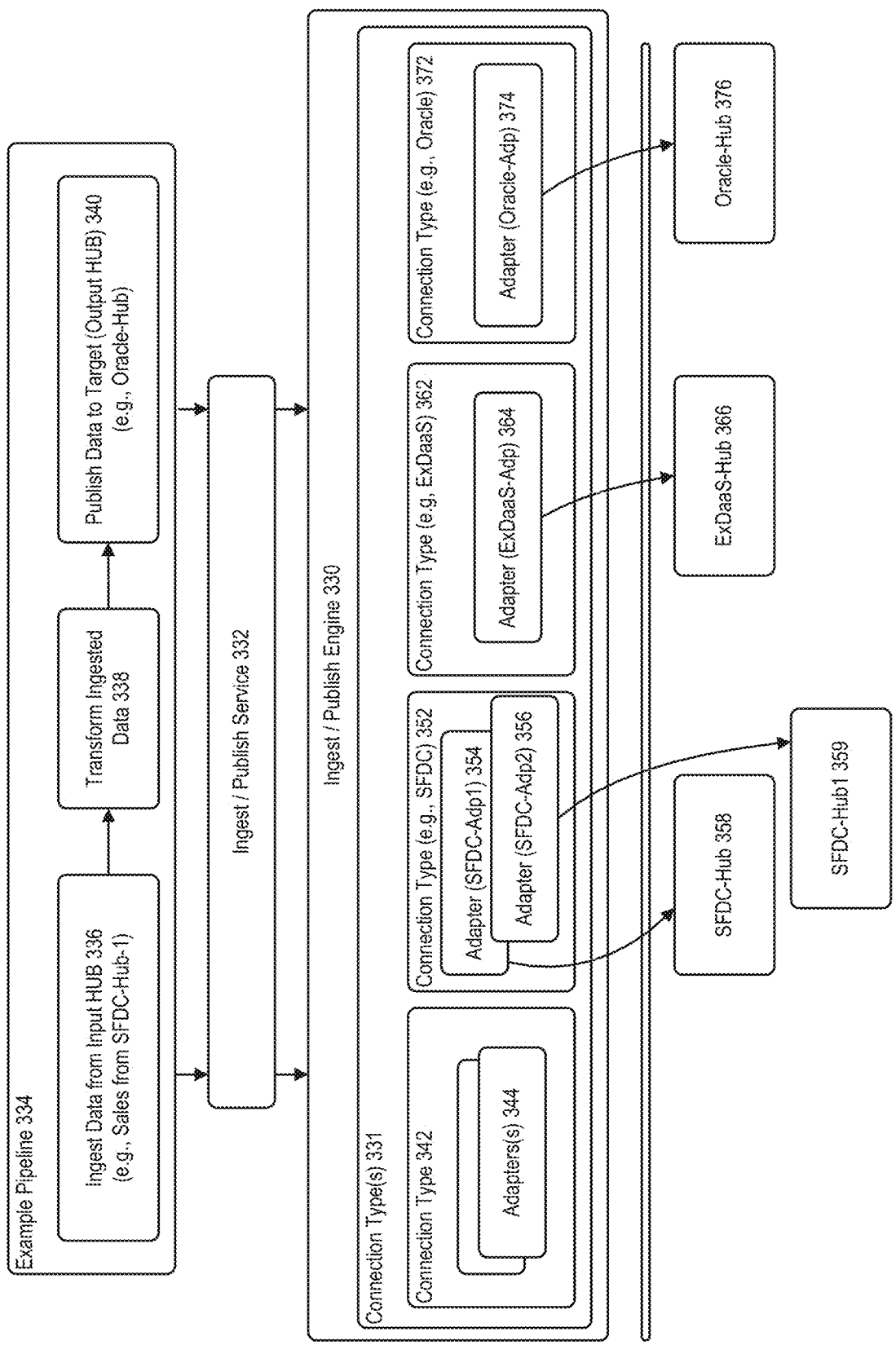
FIG. 6 illustrates an example use of an ingest/publish engine and ingest/publish service with a pipeline, in accordance with an embodiment.

FIG. 6 illustrates an example use of an ingest/publish engine and ingest/publish service with a pipeline, in accordance with an embodiment.

As illustrated in FIG. 6, in accordance with an embodiment, an ingest/publish engine 330 can be accessed via an ingest/publish service 332 by a pipeline 334, which in this example is designed to ingest data 336 (e.g., sales data) from an input HUB (e.g., SFDC HUB1), transform the ingested data 338, and publish the data to an output HUB 340 (e.g., Oracle HUB).

In accordance with an embodiment, the ingest/publish engine supports a plurality of connection types 331, each of which connection type 342 is associated with one or more adapter(s) 344 that provides access to a HUB.

For example, as illustrated in the example of FIG. 6, in accordance with an embodiment, an SFDC connection type 352 can be associated with an SFDC-Adp1 adapter 354, and an SFDC-Adp2 adapter 356, that provide access to SFDC HUBs 358, 359; while an ExDaaS connection type 362 can be associated with an ExDaaS-Adp adapter 364 that provides access to an ExDaas HUB 366; and an Oracle Connection type 372 can be associated with an Oracle Adp adapter 374 that provides access to an Oracle HUB 376.

Recommendation Engine

In accordance with an embodiment, the system can include a recommendation engine or knowledge service that operates as an expert filtering system that predicts/suggests the most relevant from among the several possible actions that can be performed on the data.

In accordance with an embodiment, recommendations can be chained to facilitate the user to step through them, to achieve the prescribed end goal. For example, the recommendation engine can guide the user through a set of steps in transforming a data set into a data cube to be published to the target BI system.

In accordance with an embodiment, the recommendation engine utilizes three aspects: (A) business type classification, (B) functional type classification, and (C) a knowledge base. Ontology management and Query/Search functionality on datasets or entities can be provided by, for example, a YAGO3-seeded federated ontology with Query API, MRS and Audit Repository. Business entity classification can be provided by, for example, a ML pipeline based classification to identify the business type. Functional type classification can be provided by, for example, deductive and rule-based functional type classification. Action recommendation can be provided by, for example, inductive and rule-based data prep, transform, model, dependencies and related recommendations.

Classification Service

In accordance with an embodiment, the system provides a classification service, which can be categorized into business type classification and functional type classification, each of which are further described below.

Business Type Classification

In accordance with an embodiment, the business type of an entity is its phenotype. The observable characteristics of the individual attributes in the entity are as important as the definition, in identifying the business type of an entity. While the classification algorithm uses the schematic definition of a dataset or entity, it can also utilize the models built using data, to classify the datasets or entities business type.

For example, in accordance with an embodiment, a dataset ingested from a HUB can be classified as one of existing business types (seeded from the main HUB) that are known to the system, or can be added as a new type if it cannot be classified into an existing one.

In accordance with an embodiment, business type classification is utilized in making recommendations, either based on inductive reasoning (from transforms defined on similar business type in pipelines), or simple propositions derived from the classification root entity.

Generally described, in accordance with an embodiment, the following set of steps describes the classification process: ingest and seeding from a main (training) hub; building models and compute col stats and register them for use in classification; classifying datasets or entities, from newly added hubs, including creating a profile/compute col stats; and classifying datasets or entities, to provide a short list of entity models to use based on structure and col stats; and classifying datasets or entities, including multiclass classification to compute/predict using the models.

Figure 7:
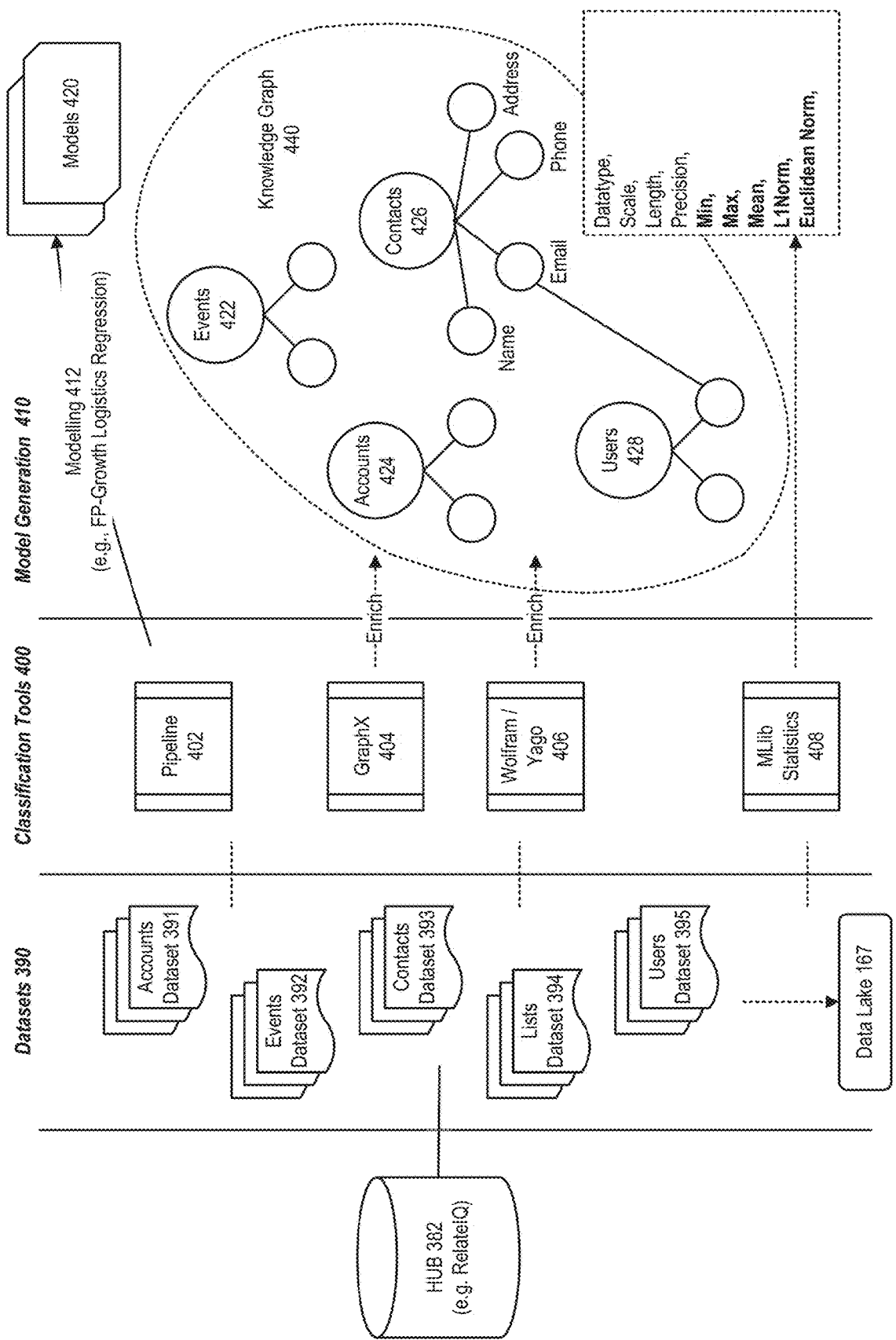
FIG. 7 illustrates the process of ingest and training from a HUB, in accordance with an embodiment.

FIG. 7 illustrates the process of ingest and training from a HUB, in accordance with an embodiment.

As illustrated in FIG. 7, in accordance with an embodiment, the data from a HUB 382 (e.g., in this example, a RelatedIQ source) can be read by the recommendation engine 380, as datasets 390 (e.g., as Resilient Distributed Datasets, RDDs), including in this example an accounts dataset 391, events dataset 392, contacts dataset 393, lists dataset 394, users dataset 395.

In accordance with an embodiment, a plurality of type classification tools 400 can be used with an ML pipeline 402, for example GraphX 404, Wolfram/Yago 406, and/or MLlib Statistics 408, are used in seeding the knowledge graph 440 with entity metadata (training or seeding data) when a HUB is first registered.

In accordance with an embodiment, the dataset or entity metadata and data are ingested from the source HUB and stored in the data lake. During model generation 410, the entity metadata (attributes and relationship with other entities) is used, for example through FP-growth logistics regression 412, in generating the models 420 and knowledge graph representing all the datasets or entities, in this example representing events 422, accounts 424, contacts 426, and users 428. As part of the seeding, regression models are built using dataset or entity data and attribute statistics (min value, max value, mean, or probability density) are computed.

Figure 8:
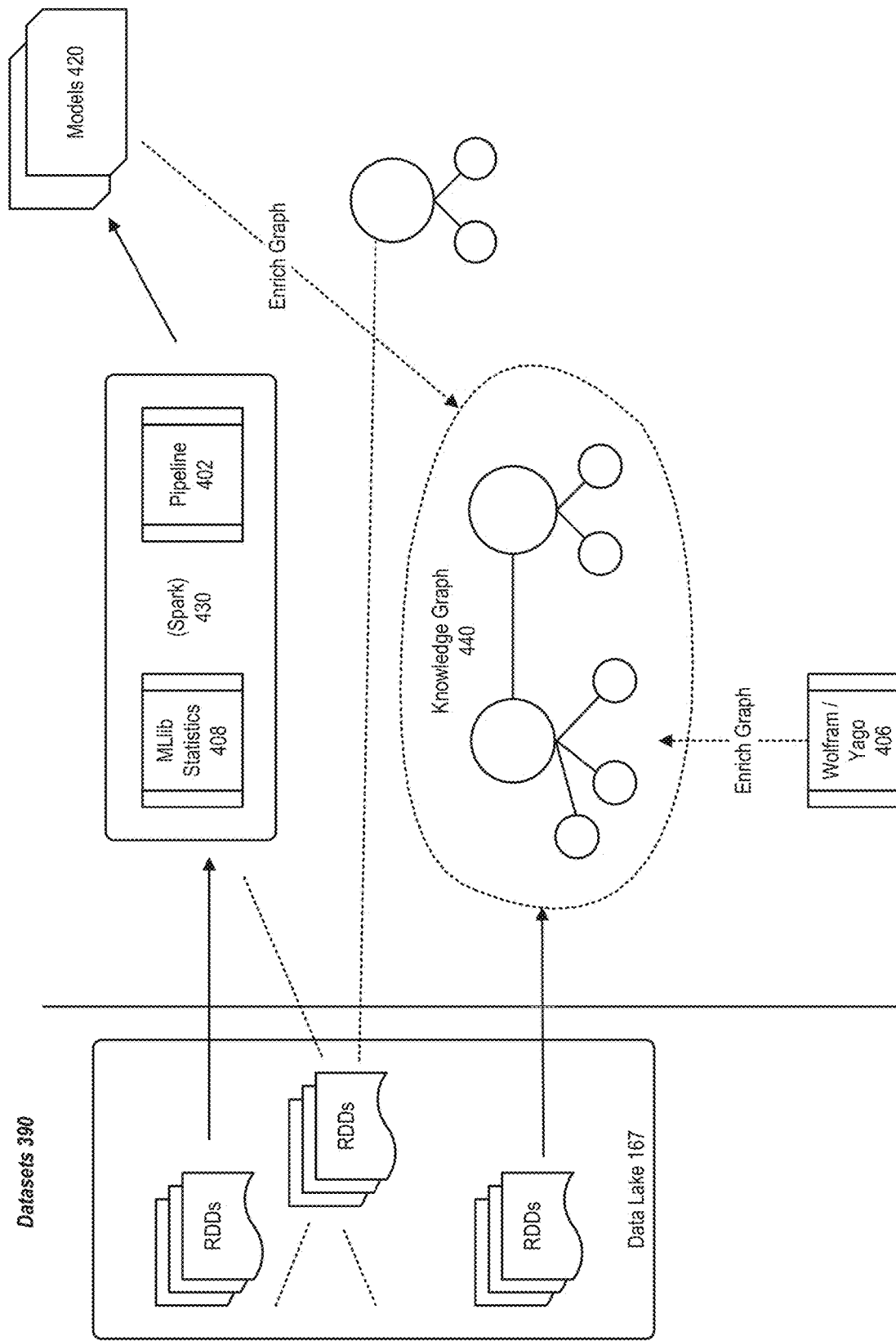
FIG. 8 illustrates the process of building models, in accordance with an embodiment.

FIG. 8 illustrates the process of building models, in accordance with an embodiment.

As illustrated in FIG. 8, in accordance with an embodiment, when run in, for example, a Spark environment 430, Spark MLlib statistics can be used to compute column stats that are added as attribute properties in the knowledge graph. The computed column stats, along with other dataset or entity metadata, can be used to shortlist the entities whose regression models will be used in testing the new entities for classification.

Figure 9:
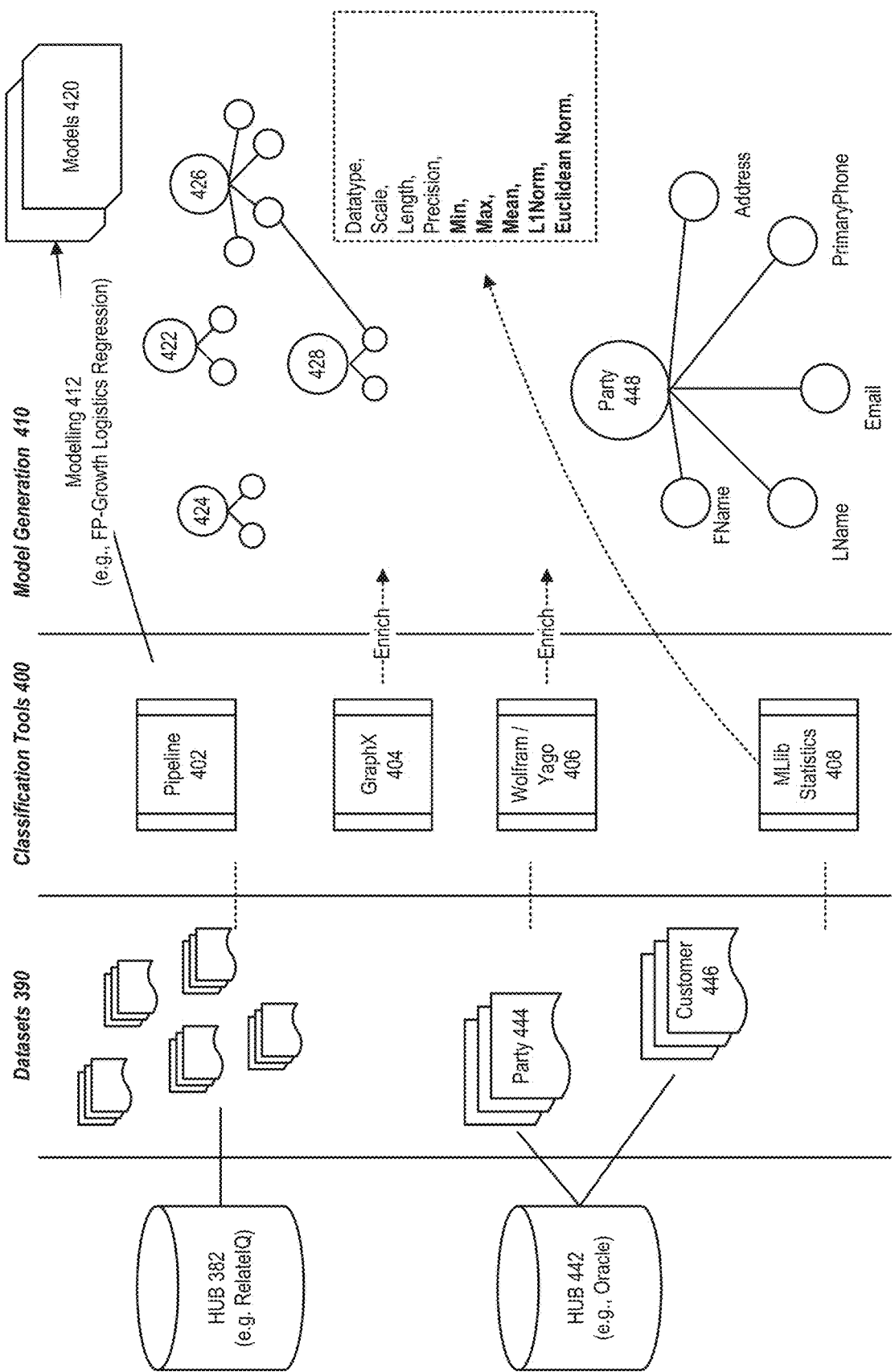
FIG. 9 illustrates the process of classifying datasets or entities from newly added HUBs, in accordance with an embodiment.

FIG. 9 illustrates the process of classifying datasets or entities, from newly added HUBs, in accordance with an embodiment.

As illustrated in FIG. 9, in accordance with an embodiment, when a new HUB is added, in this example, an Oracle HUB 442, the datasets or entities provided by that HUB, e.g., party information 444, and customer information 446, are classified by the model as a party 448 based on the training or seeded data created previously.

For example, in accordance with an embodiment, the column statistics are computed from the data of the new datasets or entities, and a set of predicates representing the entity's sub graph is created using this information along with other metadata available as part of the ingest.

In accordance with an embodiment, the column statistics computation is useful in maximum likelihood estimation (MLE) methods, while sub graphs as well as in regression models for the dataset. The set of graph predicates generated for the new entity will be used to short list candidate entity models for testing and classifying the new entity.

Figure 10:
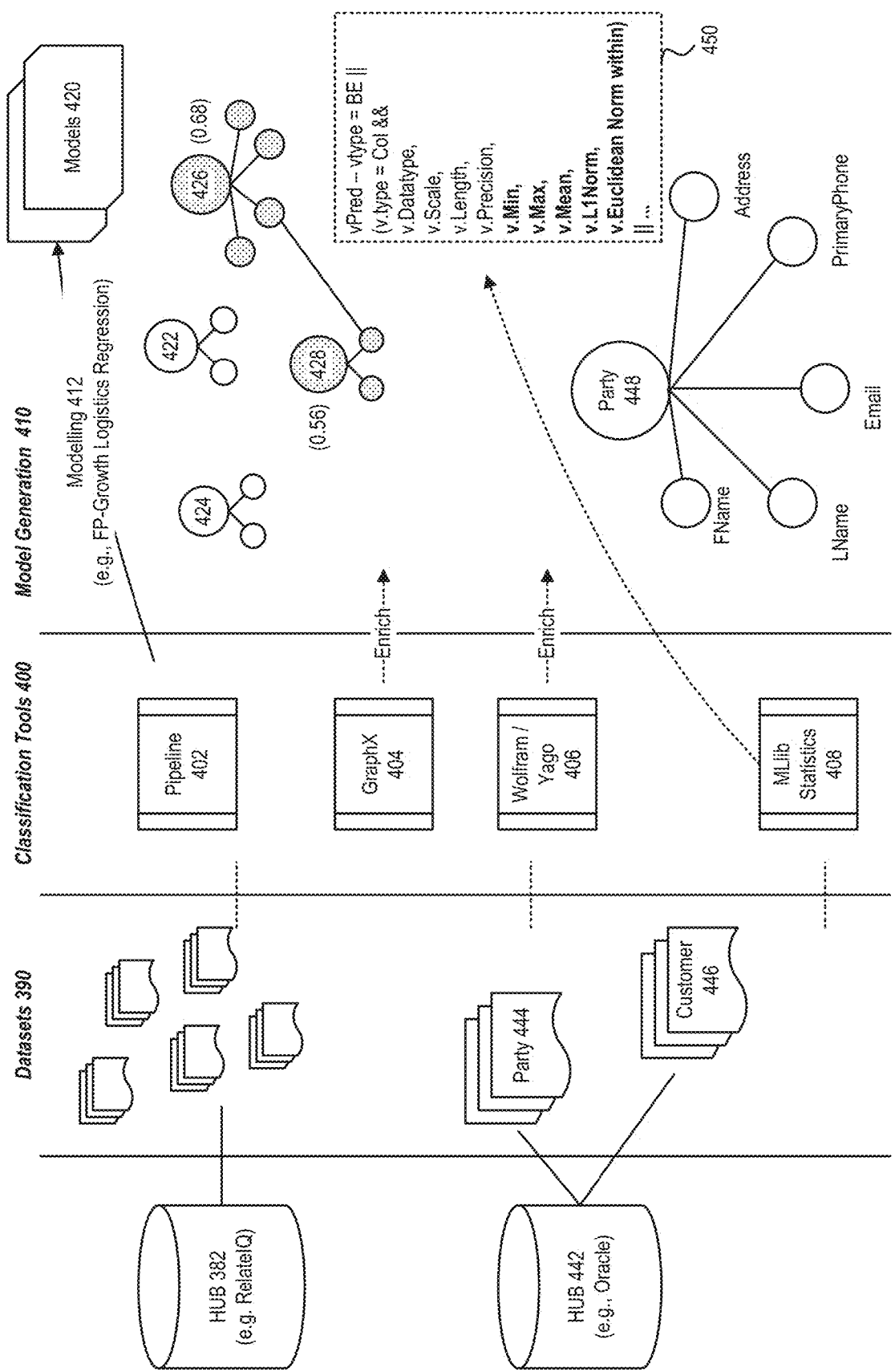
FIG. 10 further illustrates the process of classifying datasets or entities, from newly added HUBs, in accordance with an embodiment.

FIG. 10 further illustrates the process of classifying datasets or entities, from newly added HUBs, in accordance with an embodiment.

As illustrated in FIG. 10, in accordance with an embodiment, predicates representing a sub graph of new datasets or entities, to be classified, are compared 450 with similar sub graphs representing datasets or entities that are already part of the knowledge graph. A ranking of the matching entities, based on the probability of a match, is used in short-listing the entity models used in testing for classifying new entities.

Figure 11:
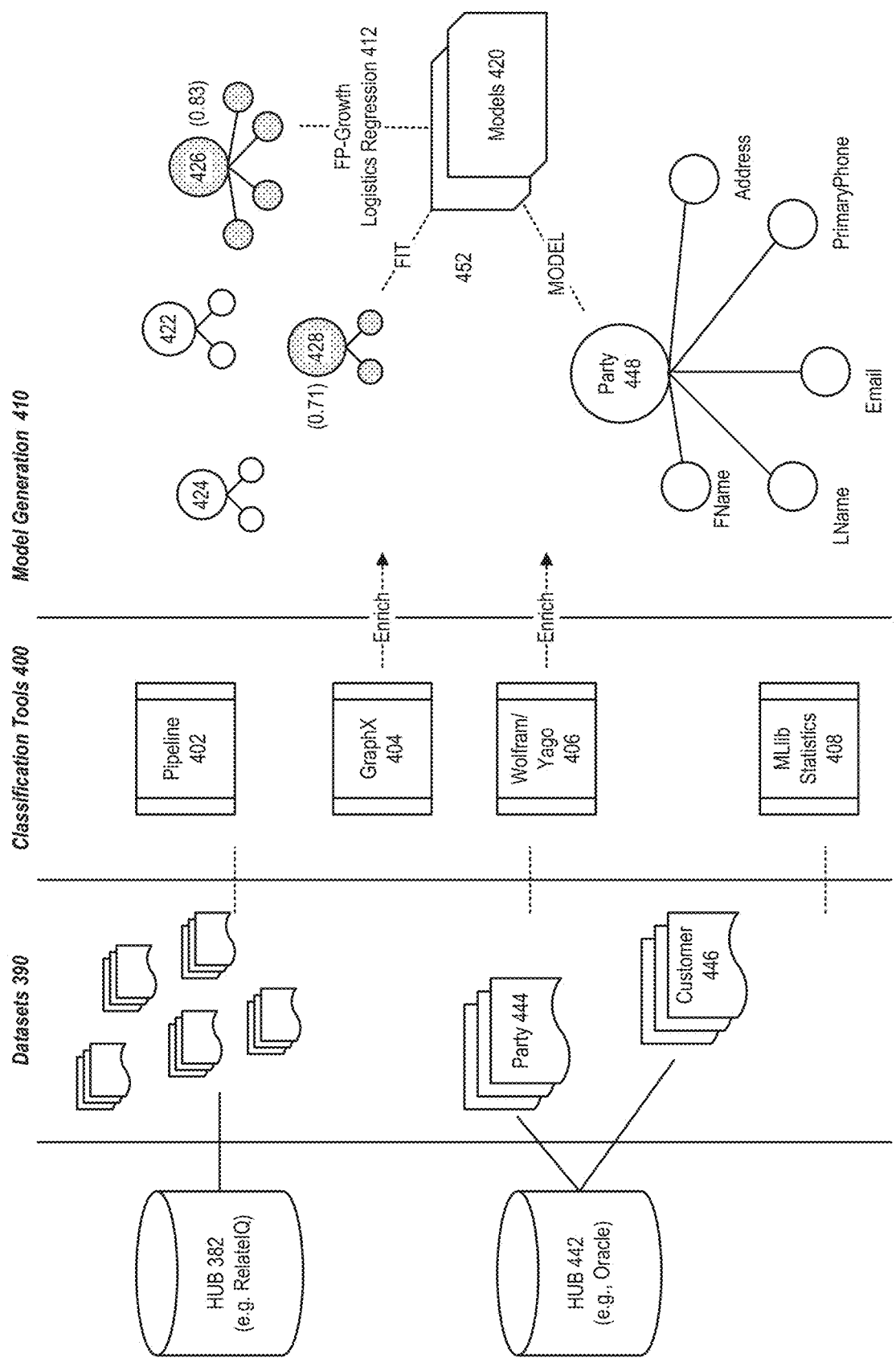
FIG. 11 further illustrates the process of classifying datasets or entities, from newly added HUBs, in accordance with an embodiment.

FIG. 11 further illustrates the process of classifying datasets or entities, from newly added HUBs, in accordance with an embodiment.

As illustrated in FIG. 11, in accordance with an embodiment, the regression models of the short listed matching datasets or entities are used in testing the data from the new datasets or entities. The ML pipeline can be extended to include additional classification methods/models to improve the accuracy of the process. The classification service will classify 452 the new entity if there exists a match within the acceptable threshold, for example, in this illustration, a probability greater than 0.8. If not, the dataset or entity can be added to the knowledge graph as a new business type. A user can also validate the classification, by accepting or rejecting the result.

Functional Type Classification

In accordance with an embodiment, the functional type of an entity is its genotype. The functional type can also be described as the interface through which transform actions are defined. For example, a join transform or filter is defined on a functional type, such as a relational entity in this case. In summary, all transforms are defined in terms of functional types as parameters.

Figure 12:
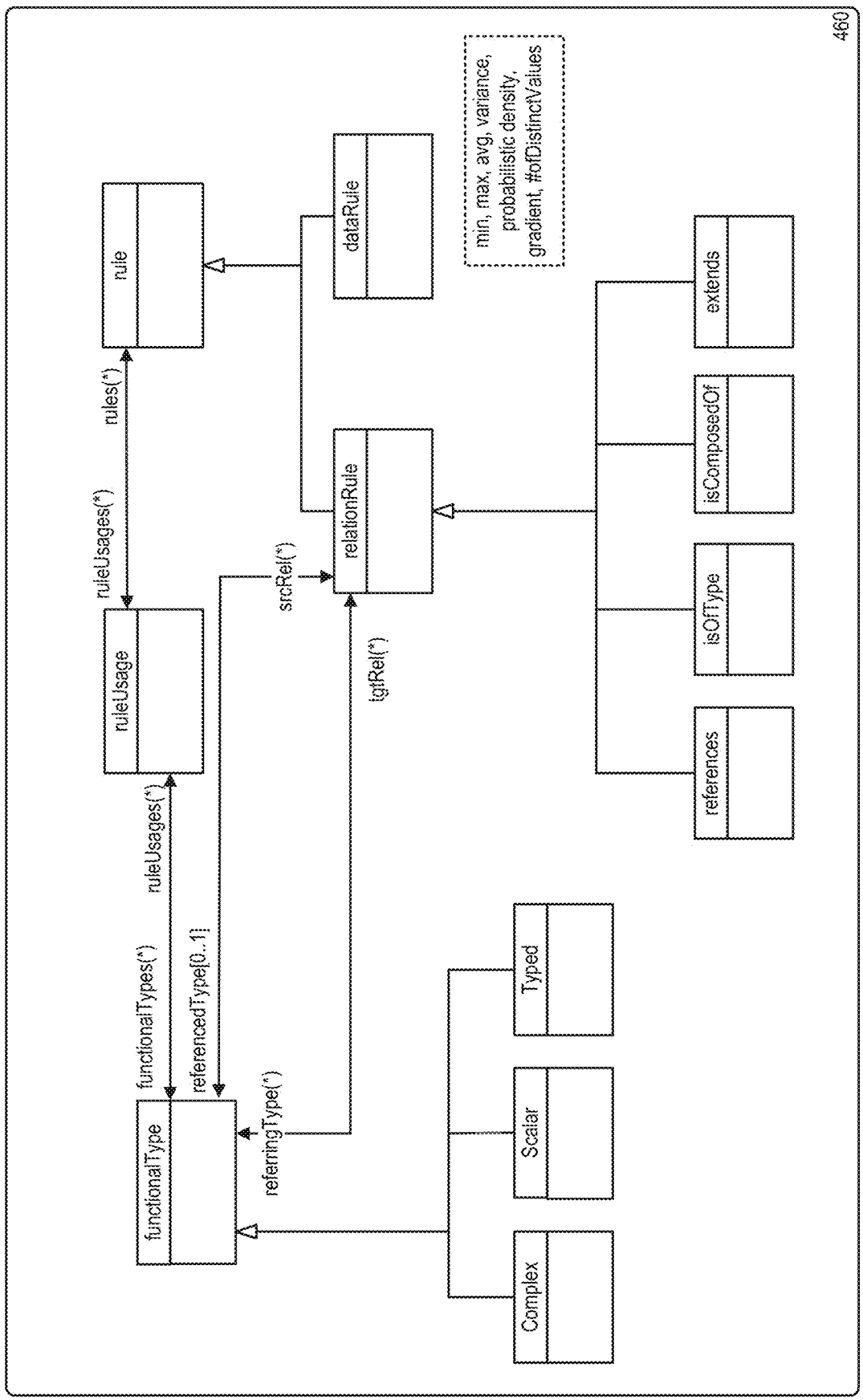
FIG. 12 illustrates an object diagram for use in functional type classification, in accordance with an embodiment.

FIG. 12 illustrates an object diagram for use in functional type classification, in accordance with an embodiment.

As illustrated in FIG. 12 by way of object diagram 460, in accordance with an embodiment, the system can describe the general case (in this example, dimension, level, or cube) through a set of rules against which a dataset or entity is evaluated to identify its functional type.

For example, in accordance with an embodiment, a multidimensional cube can be described in terms of its measure attributes and dimensionality, each of which can themselves be defined in terms of their types and other characteristics. The rules engine will evaluate a business type entity and annotate its functional type based on the evaluation.

Figure 13:
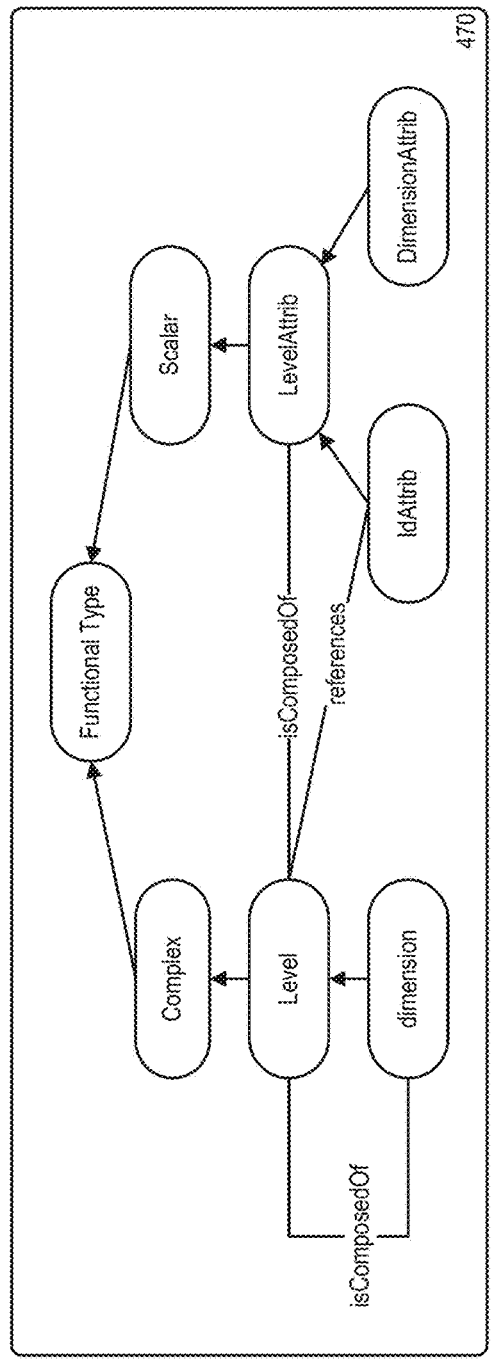
FIG. 13 illustrates an example of a dimension functional type classification, in accordance with an embodiment.

FIG. 13 illustrates an example of a dimension functional type classification, in accordance with an embodiment.

As illustrated in the example functional type classification 470 hierarchy shown in FIG. 13, in accordance with an embodiment, a level can be defined, for example in terms of its dimensions, and level attributes.

Figure 14:
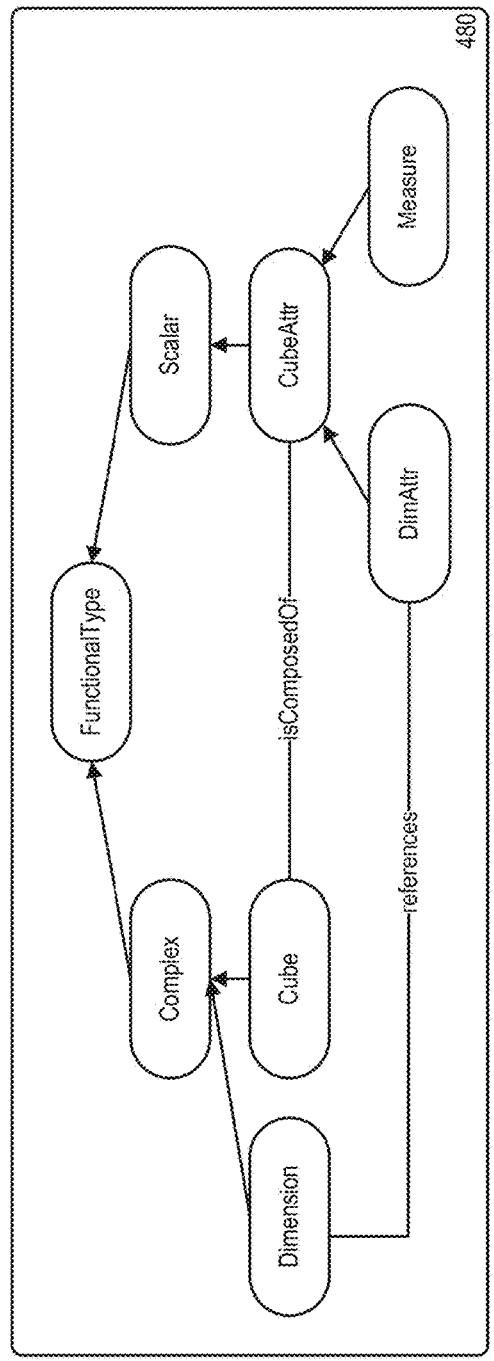
FIG. 14 illustrates an example of a cube functional type classification, in accordance with an embodiment.

FIG. 14 illustrates an example of a cube functional type classification, in accordance with an embodiment.

As illustrated in the example functional type classification 480 hierarchy shown in FIG. 14, in accordance with an embodiment, a cube can be defined, for example, in terms of its measure attributes and dimensionality.

Figure 15:
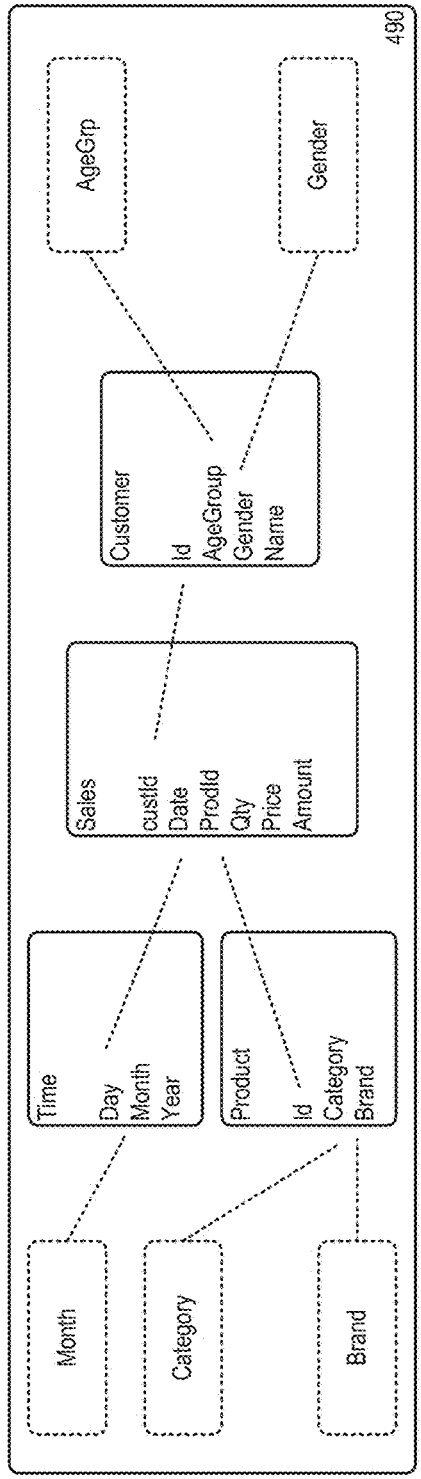
FIG. 15 illustrates an example usage of functional type classification to evaluate a business entity's functional type, in accordance with an embodiment.

FIG. 15 illustrates an example usage of functional type classification to evaluate a business entity's functional type, in accordance with an embodiment.

As illustrated in FIG. 15, in this example 490, in accordance with an embodiment, a sales dataset should be evaluated as a cube functional type by the rules engine. Similarly the product, customer, and time should be evaluated as dimensions and levels (for example by age group, gender).

In accordance with an embodiment, the rules that identify the entity's functional types and the dataset or entity elements for this particular example are provided below, including several rules that can be specified to evaluate the same functional type. For example, a column of type "Date" can be considered a dimension regardless of whether there is a reference to a parent level entity. Similarly zip code, gender and age may only require data rules to identify them as dimensions:

Customer
Id, Name→(Dimension isComposedOf DimensionAttrib)
AgeGroup, Gender→(Dimension isComposedOf IdAttrib, IdAttrib references Level)
Time
Day→(Dimension/Level isComposedOf DimensionAttrib/LevelAttrib)
Month→(Dimension isComposedOf IdAttrib, IdAttrib references Level)
Sales
Qty, Price, Amount→(Cube isComposedOf CubeAttr and Data rule on this columns, for example numeric min/max values, probability density)
Custid→(DimAttr references Dimension, Cube isComposedOf CubeAttr)
Date→(references Dimension, Cube isComposedOf CubeAttr)

Figure 16:
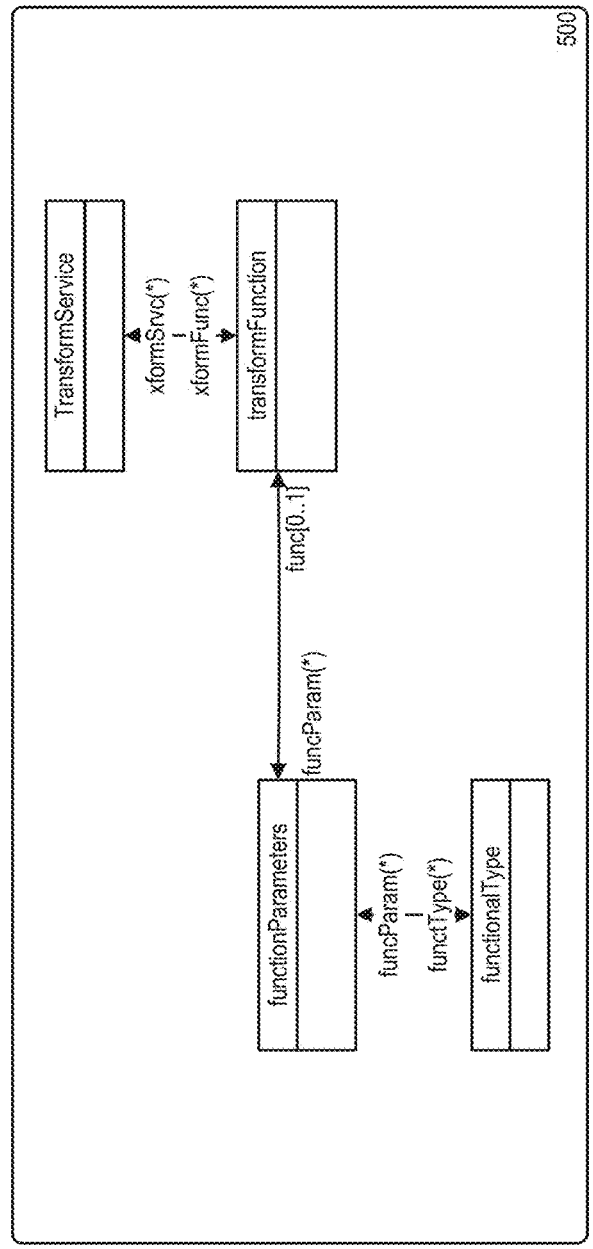
FIG. 16 illustrates an object diagram for use in functional transformation, in accordance with an embodiment.

FIG. 16 illustrates an object diagram for use in functional transformation, in accordance with an embodiment.

As illustrated in FIG. 15, in accordance with this example 500, in accordance with an embodiment, transform functions can be defined on functional types. Business entities (business types) are annotated as a functional type; including by default that complex business types are of functional type "entity".

Figure 17:
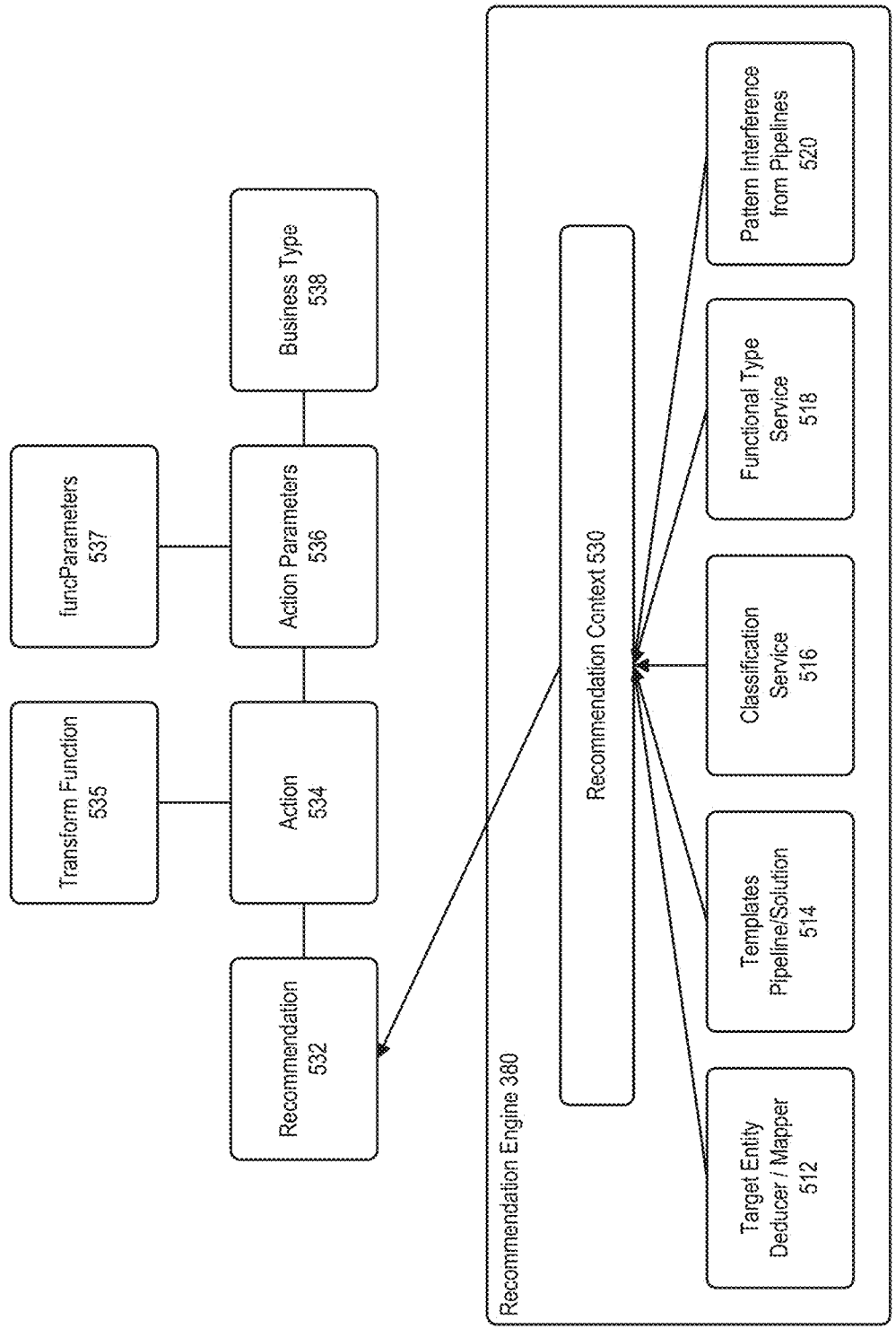
FIG. 17 illustrates the operation of a recommendation engine, in accordance with an embodiment.

FIG. 17 illustrates the operation of a recommendation engine, in accordance with an embodiment.

As illustrated in FIG. 17, in accordance with an embodiment, the recommendation engine generates recommendations which are a set of actions defined on a business type. Each action is a directive to apply a transform on a dataset(s).

In accordance with an embodiment, a recommendation context 530 abstracts the sources of the recommendation, and contains metadata to identify the set of propositions that generated the recommendation. The context allows the recommendation engine to learn and prioritize recommendations based on user's response.

In accordance with an embodiment, a target entity deducer/mapper 512 uses the definition of the target (and classification service that annotates dataset or entity and attribute business types) to make transform recommendations that facilitate the current dataset to map into the target. This is common when the user starts with a known target object (say sales cube) and builds a pipeline to instantiate the cube.

In accordance with an embodiment, templates (pipeline/solution) 514 define a reusable set of pipeline steps and transforms to achieve a desired end result. For example, a template might contain steps to enrich, transform, and publish to a data mart. The set of recommendations in this case will reflect the template design.

In accordance with an embodiment, a classification service 516 identifies the business type of a dataset or entity ingested from a HUB into the data lake. Recommendations on the entity can be made based on transforms applied on similar entities (business type) or in conjunction with the target entity deducer/mapper.

In accordance with an embodiment, a functional type service 518 annotates the functional type(s) that a dataset or entity can assume based on rules defined. For example, to generate a cube from a given dataset or join it with dimensional tables, it is important to evaluate if the dataset meets the rules that define the cube functional type.

In accordance with an embodiment, a pattern inference from pipelines component 520 allows the recommendation engine to summarize transforms performed on a given business type in existing pipeline definitions in similar contexts and suggest similar transform as recommendation in the current context.

In accordance with an embodiment, the recommendation context can be used to process a recommendation 532, including actions 534, transform function 535, action parameters 536, function parameters 537, and business type 538.

Data Lake/Data Management Strategies

As described previously, in accordance with an embodiment, a data lake provides a repository for the persistence of information from the system HUB, or other components.

Figure 18:
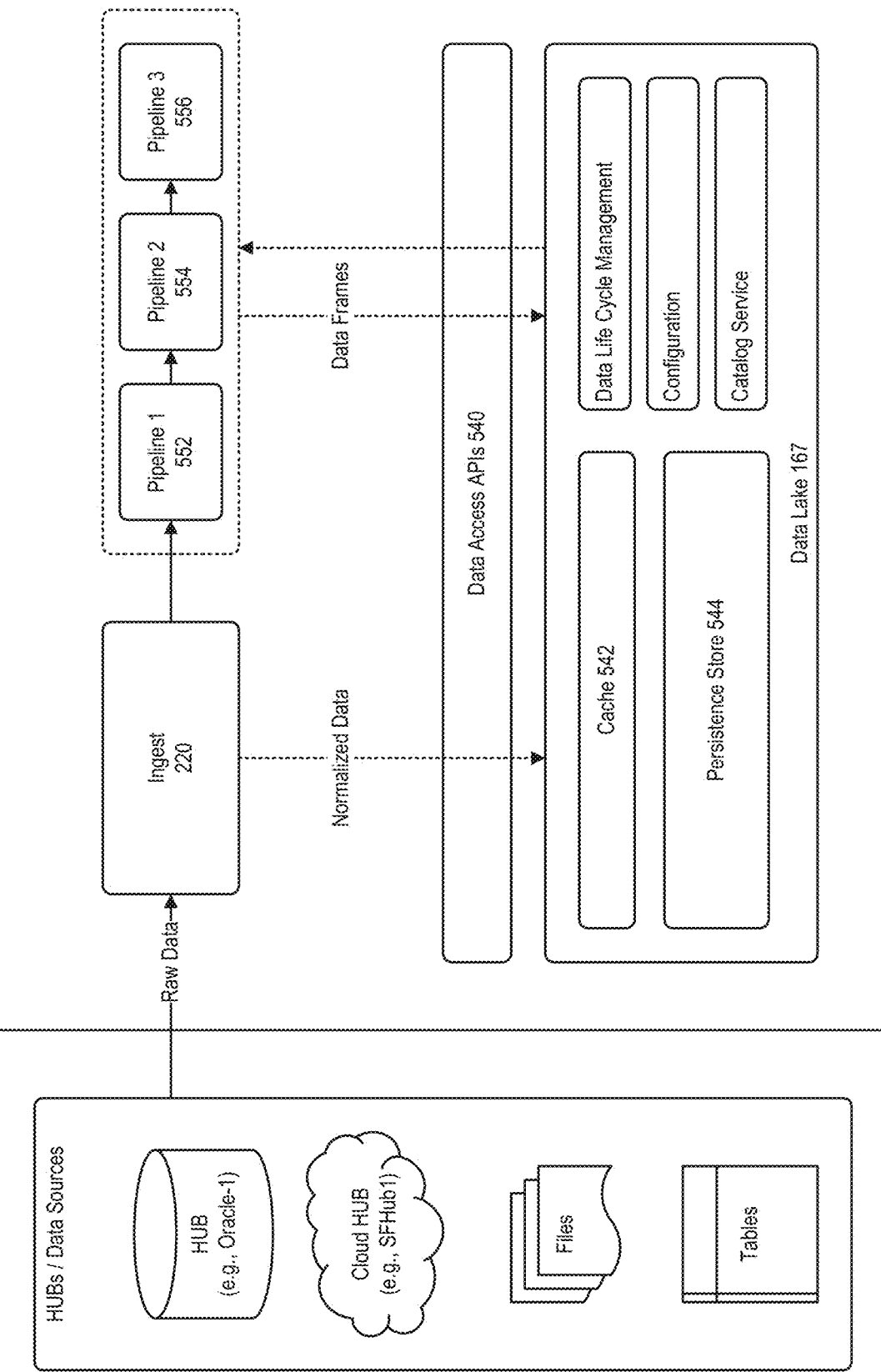
FIG. 18 illustrates the use of a data lake, in accordance with an embodiment.

FIG. 18 illustrates the use of a data lake, in accordance with an embodiment.

As illustrated in FIG. 18, in accordance with an embodiment, a data lake can be associated with one or more data access APIs 540, a cache 542, and persistence store 544, that operate together to receive ingested data that has been normalized, for use with a plurality of pipelines 552, 554, 556.

In accordance with an embodiment, a variety of different data management strategies can be used to manage data (performance, scalability) and its life cycle in the data lake, which can be broadly classified as data-driven or process-driven.

Figure 19:
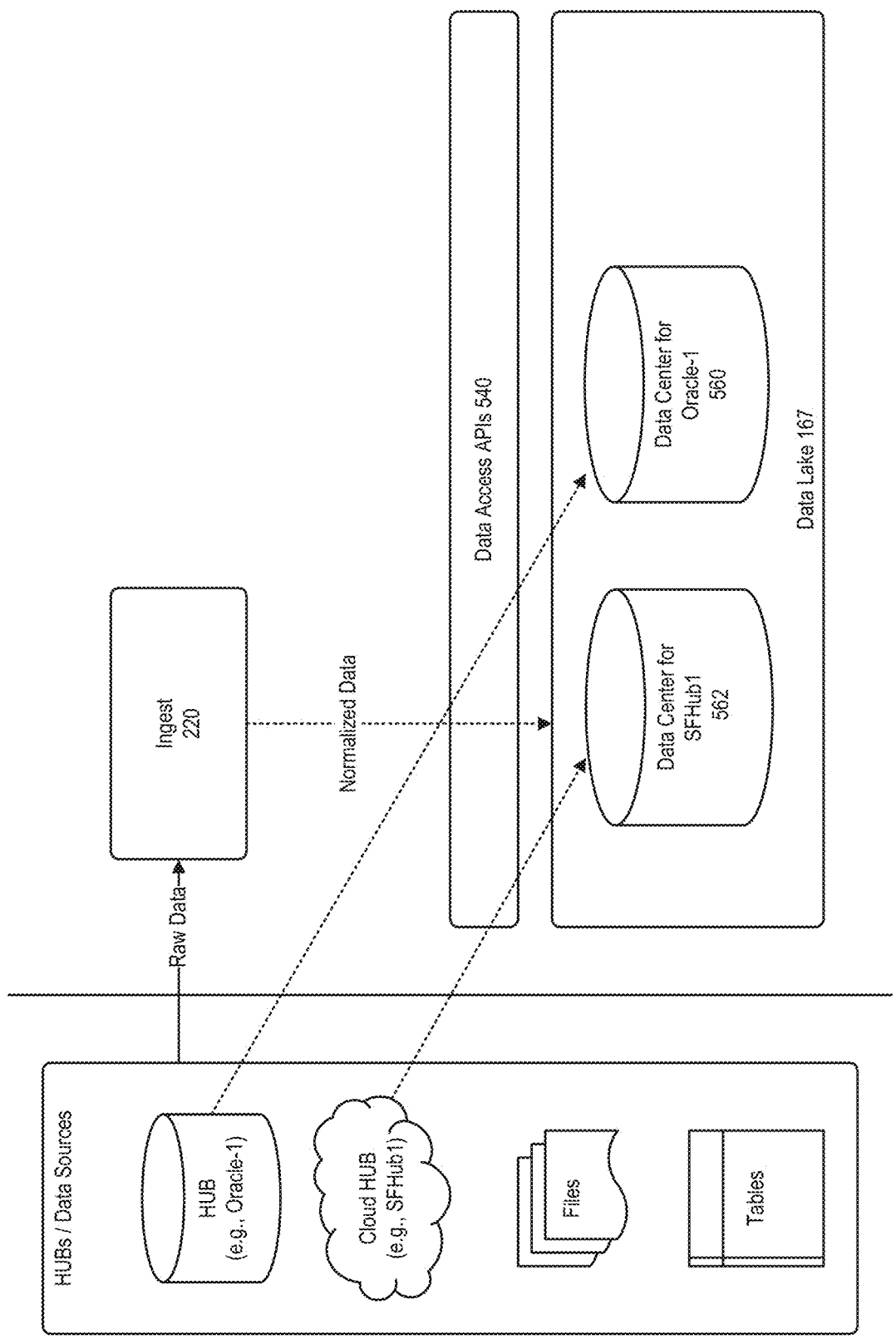
FIG. 19 illustrates the use of a data-driven strategy to manage a data lake, in accordance with an embodiment.

FIG. 19 illustrates the use of a data-driven strategy to manage a data lake, in accordance with an embodiment.

As illustrated in FIG. 19, in accordance with an embodiment, in a data-driven approach, the unit of management is derived based on the HUB or data server definitions. For example, in this approach the data from an Oracle 1 HUB can be stored in a first data center 560 associated with that HUB, while the data from SFHUB1 can be stored in a second data center 562 associated with that HUB.

Figure 20:
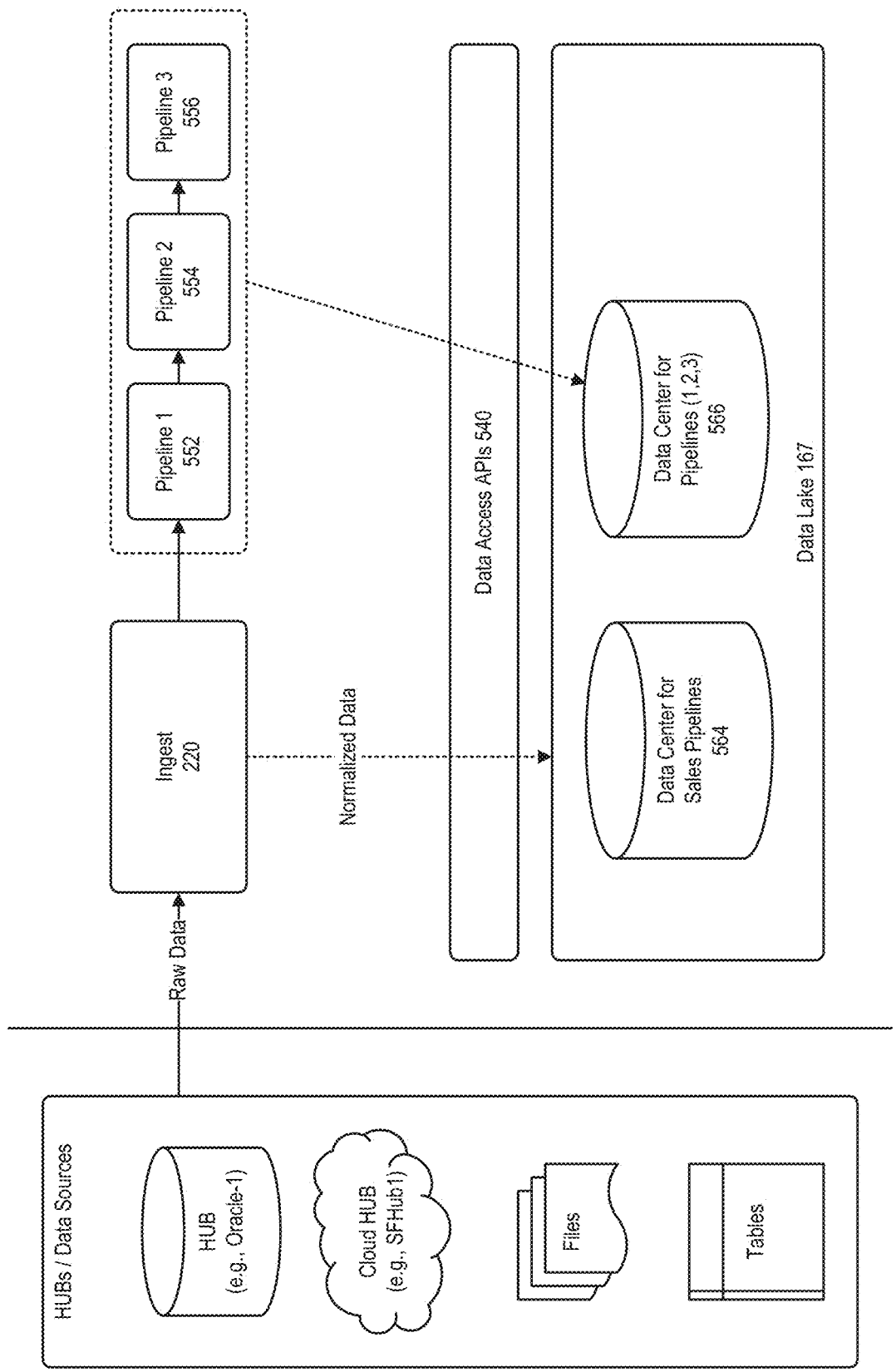
FIG. 20 illustrates the use of a process-driven strategy to manage a data lake, in accordance with an embodiment.

FIG. 20 illustrates the use of a process-driven strategy to manage a data lake, in accordance with an embodiment.

As illustrated in FIG. 20, in accordance with an embodiment, in a process-driven approach, the unit of management is derived based on the related pipelines accessing the data.

For example, in this approach the data associated with a Sales pipeline can be stored in a first data center 564 associated with that pipeline, while the data from other pipelines (e.g., pipelines 1, 2, 3) can be stored in a second data center 566 associated with those other pipelines.

Pipelines

In accordance with an embodiment, a pipeline defines the transformation or processing that is to be performed on the ingested data. The processed data can be stored in the data lake or can be published to another end point, such as, for example, DBCS.

Figure 21:
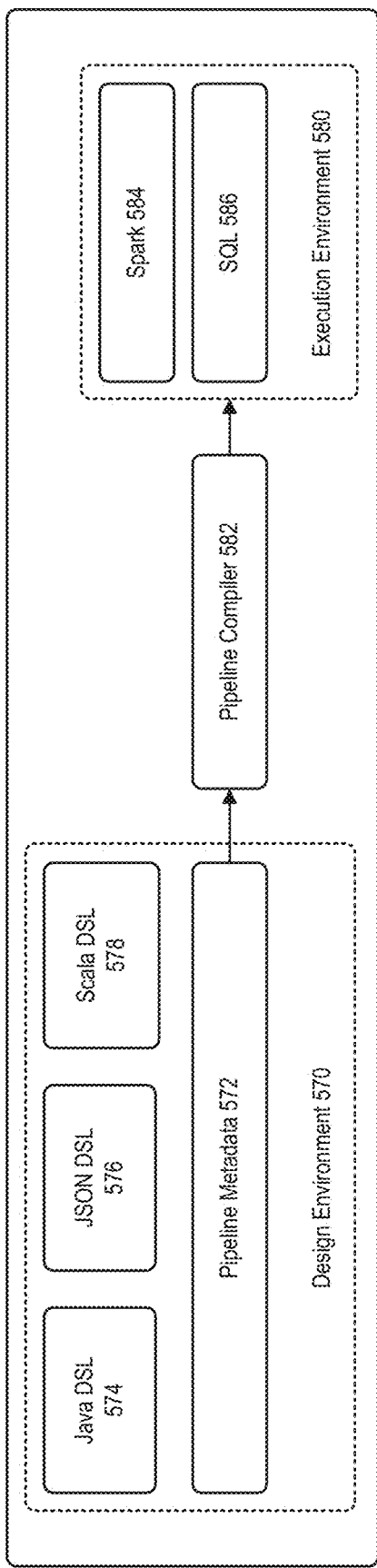
FIG. 21 illustrates the use of a pipeline compiler, in accordance with an embodiment.

FIG. 21 illustrates the use of a pipeline compiler, in accordance with an embodiment.

As illustrated in FIG. 21, in accordance with an embodiment, a pipeline compiler 582 operates between design 570 and execution 580 environments, including accepting one or more pipeline metadata 572, and a DSL, e.g., Java DSL 574, JSON DSL 576, Scala DSL 578, and providing an output for use with the execution environment e.g., as a Spark application 584 and/or SQL statements 586.

Figure 22:
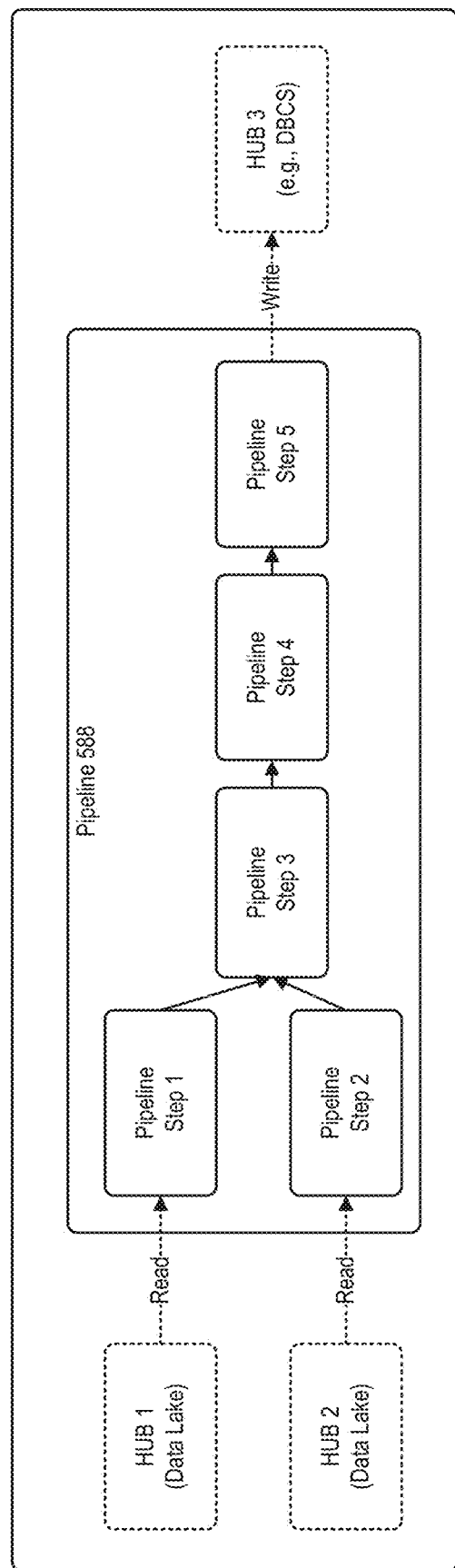
FIG. 22 illustrates an example pipeline graph, in accordance with an embodiment.

FIG. 22 illustrates an example pipeline graph, in accordance with an embodiment.

As illustrated in FIG. 22, in accordance with an embodiment, a pipeline 588 comprises a list of pipeline steps. Different types of pipeline steps represent different kinds of operations that can be performed in the pipeline. Each pipeline step can have a number of input data sets and a number of output data sets, generally described by pipeline step parameters. The processing order of operations in the pipeline is defined by binding the output pipeline step parameters from a preceding pipeline step to a subsequent pipeline step. In this manner, pipeline steps and the relationships between pipeline step parameters form a directed acyclic graph (DAG).

In accordance with an embodiment, a pipeline can be reused in another pipeline, if the pipeline contains one or more special pipeline steps (signature pipelines) that represent the input and output pipeline step parameters of the pipeline. The enclosing pipeline refers to the pipeline to be reused through a (pipeline usage) pipeline step.

Figure 23:
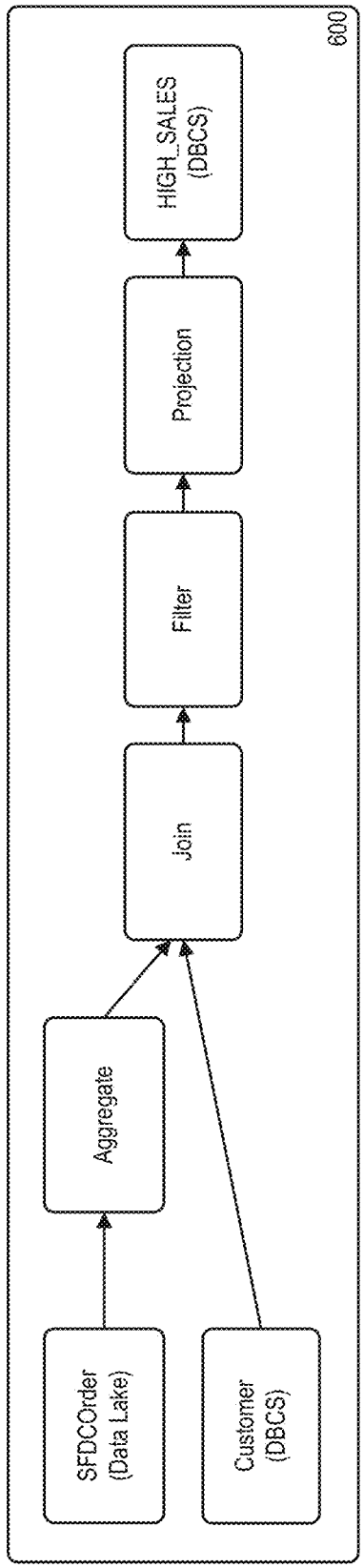
FIG. 23 illustrates an example of a data pipeline, in accordance with an embodiment.

FIG. 23 illustrates an example of a data pipeline, in accordance with an embodiment.

As illustrated in the example data pipeline 600 shown in FIG. 23, in accordance with an embodiment, data pipelines perform data transformations. The data flow in the pipeline is represented as a binding of pipeline step parameters. Various types of pipeline steps are supported for different transformation operations, including, for example: Entity (retrieve data from data lake or publish processed data to data lake/other HUBs); and Join (fusion of multiple sources).

Figure 24:
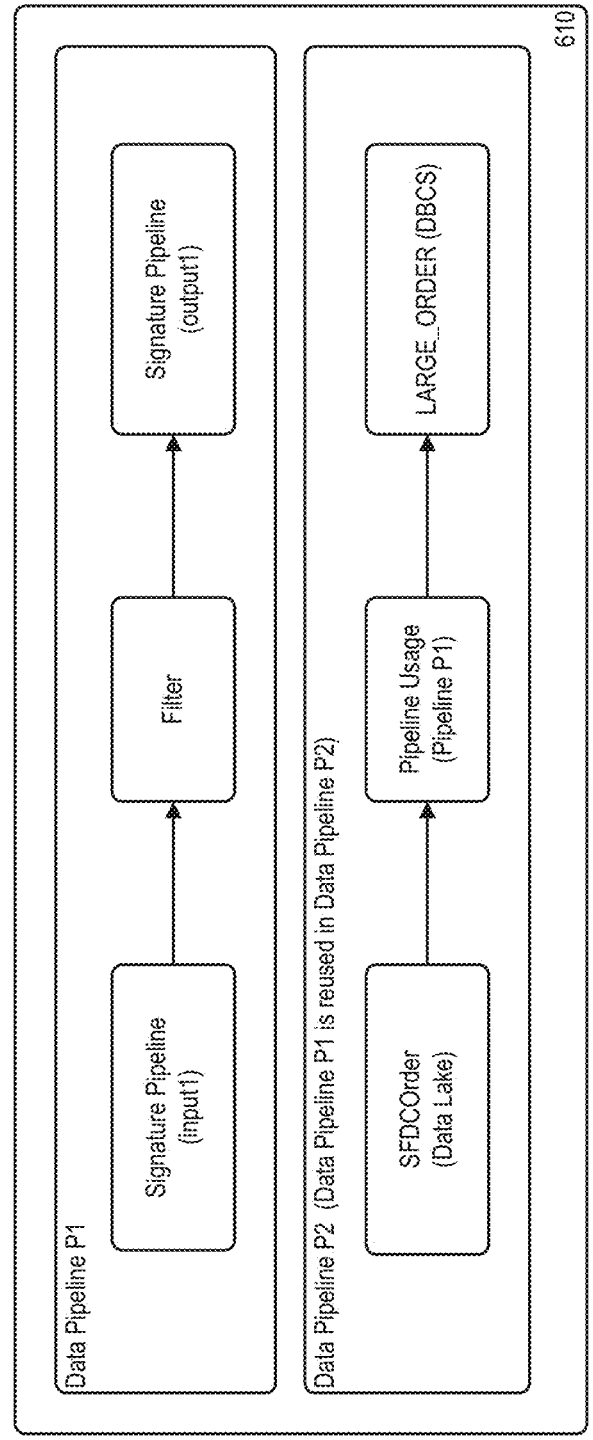
FIG. 24 illustrates another example of a data pipeline, in accordance with an embodiment.

FIG. 24 illustrates another example of a data pipeline, in accordance with an embodiment.

As illustrated in the example data pipeline 610 shown in FIG. 24, in accordance with an embodiment, a data pipeline P1 can be reused in another data pipeline P2.

Figure 25:
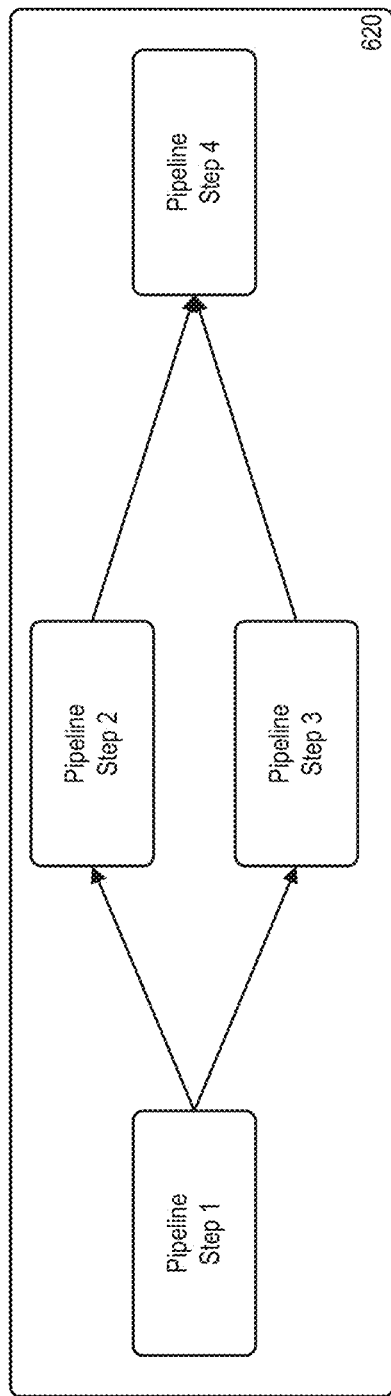
FIG. 25 illustrates an example of an orchestration pipeline, in accordance with an embodiment.

FIG. 25 illustrates an example of an orchestration pipeline, in accordance with an embodiment.

As illustrated in the example orchestration pipeline 620 shown in FIG. 25, in accordance with an embodiment, using an orchestration pipeline, pipeline steps can be used to represent the task or job that needs to be executed in an overall orchestration flow. All of the pipeline steps in an orchestration pipeline are assumed to have one input pipeline step parameter and one output pipeline step parameter. The execution dependency between tasks can be expressed as the binding between pipeline step parameters.

In accordance with an embodiment, parallel execution of tasks can be scheduled if the pipeline steps are dependent on the same preceding pipeline step without conditions (i.e. a fork). If a pipeline step is dependent on multiple preceding paths, then the pipeline step will wait for all the multiple paths to be completed before its own execution (i.e., a join). However, this does not always imply the tasks are executed in parallel. The orchestration engine can decide whether to execute the tasks in serial or in parallel depending on available resources In the example illustrated in FIG. 25, in accordance with an embodiment, a pipeline step 1 is first executed. If a pipeline step 2 and a pipeline step 3 are executed in parallel, then a pipeline step 4 will be executed only when pipeline step 2 and pipeline step 3 are both finished. The orchestration engine can also execute this orchestration pipeline serially as (pipeline step 1, pipeline step 2, pipeline step 3, pipeline step 4), or (pipeline step 1, pipeline step 3, pipeline step 2, pipeline step 4), as long as it satisfies the dependency between pipeline steps.

Figure 26:
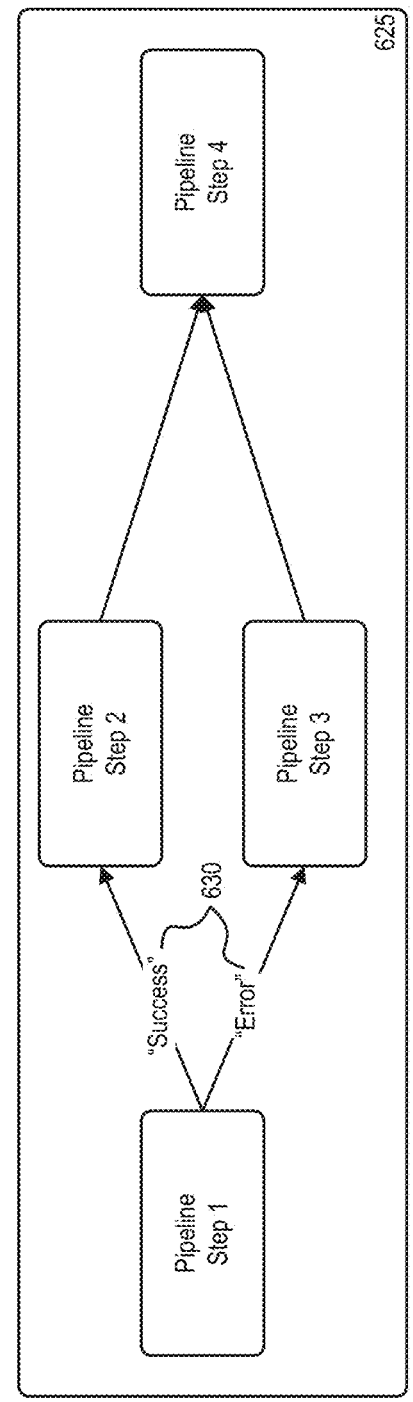
FIG. 26 further illustrates an example of an orchestration pipeline, in accordance with an embodiment.

FIG. 26 further illustrates an example of an orchestration pipeline, in accordance with an embodiment.

As illustrated in the example pipeline 625 shown in FIG. 26, in accordance with an embodiment, each pipeline step can return a status 630, such as, for example, a success or error status depending on its own semantics. The dependency between two pipeline steps can be conditional, based on the return status of the pipeline step. In the example shown, pipeline step 1 is first executed; if it completes successfully, then pipeline step 2 will be executed, otherwise pipeline step 3 will be executed. After either pipeline step 2 or pipeline step 3 is executed, then pipeline step 4 will be executed.

In accordance with an embodiment, orchestration pipelines can be nested, so that one orchestration pipeline can refer to another orchestration pipeline through a pipeline usage. An orchestration pipeline can also refer to a data pipeline as a pipeline usage. The difference between an orchestration pipeline and a data pipeline is that orchestration pipeline refers to a data pipeline that does not contain signature pipeline steps, while a data pipeline can reuse another data pipeline that contains signature pipeline steps.

In accordance with an embodiment, depending on the types of pipeline steps and code optimization, a data pipeline can be generated as a single Spark application for execution in a Spark cluster, as multiple SQL statements for execution in DBCS, or as a mixture of SQL and Spark code. For an orchestration pipeline, it can be generated for execution in the underlying execution engine, or in a workflow schedule component such as, e.g., Oozie.

Coordination Fabric

In accordance with an embodiment, a coordination fabric or fabric controller provides the necessary tools to deploy and manage framework components (service provider) and applications (user designed), manages application execution and resource requirements/allocation, and provides a integration framework (messaging bus) to facilitate communication between the various components.

Figure 27:
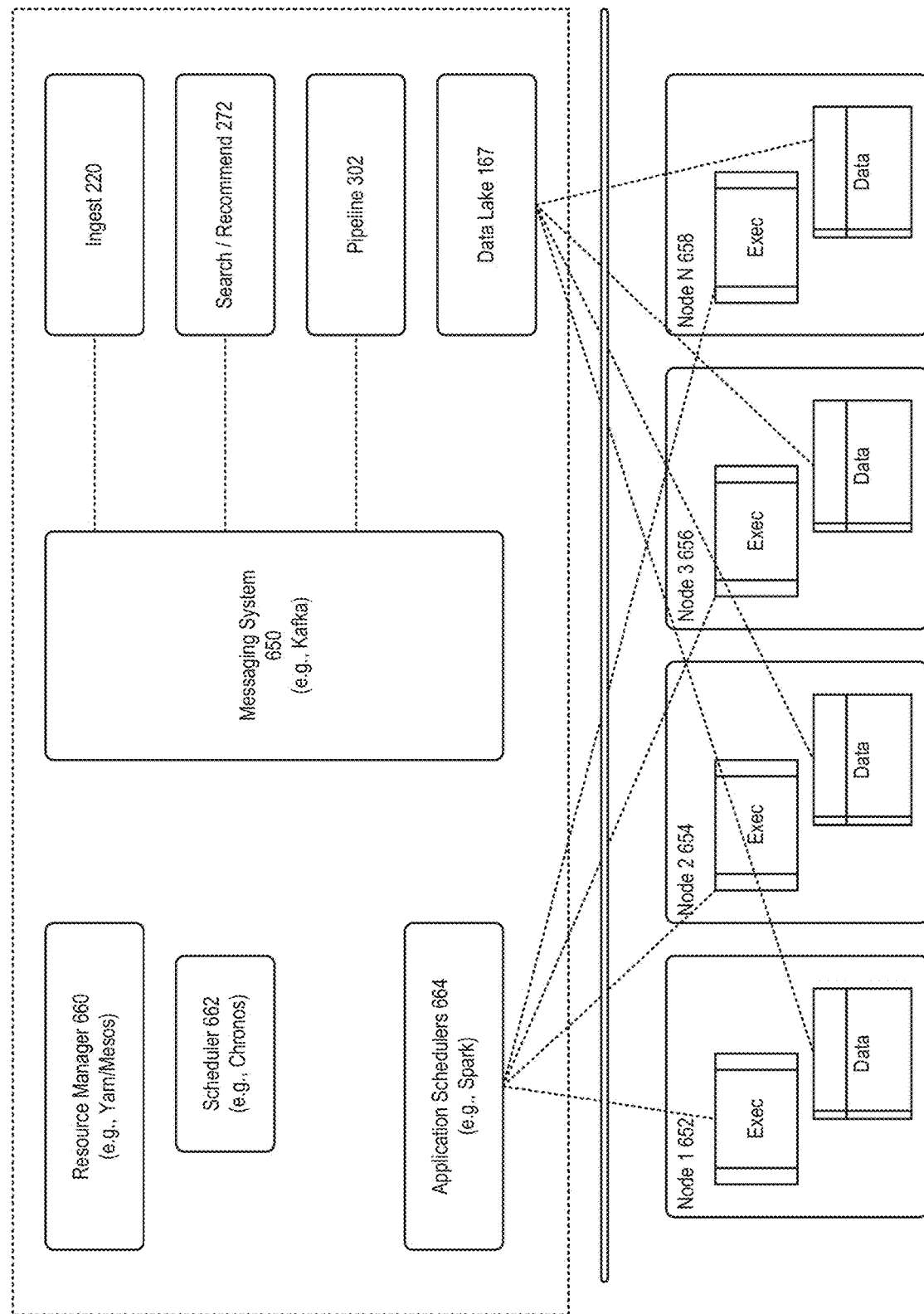
FIG. 27 illustrates the use of a coordination fabric including a messaging system, in accordance with an embodiment.

FIG. 27 illustrates the use of a coordination fabric including a messaging system, in accordance with an embodiment.

As illustrated in FIG. 27, in accordance with an embodiment, a messaging system (e.g., Kafka) 650 coordinated interactions between a resource manager 660 (e.g., Yarn/Mesos), scheduler 662 (e.g., Chronos), application schedulers 664 (e.g., Spark), and a plurality of nodes, here indicated as nodes 652, 654, 656, 658.

In accordance with an embodiment, the resource manager is used to manage the life cycle of data computation tasks/applications including scheduling, monitoring, application execution, resource arbitration and allocation, load balancing; including managing the deployment and configuration of components (that are producers and consumers of messages) in a message-driven component integration framework; upgrade of components (services) without downtime; and upgrade of infrastructure with minimal or no disruption of service.

Figure 28:
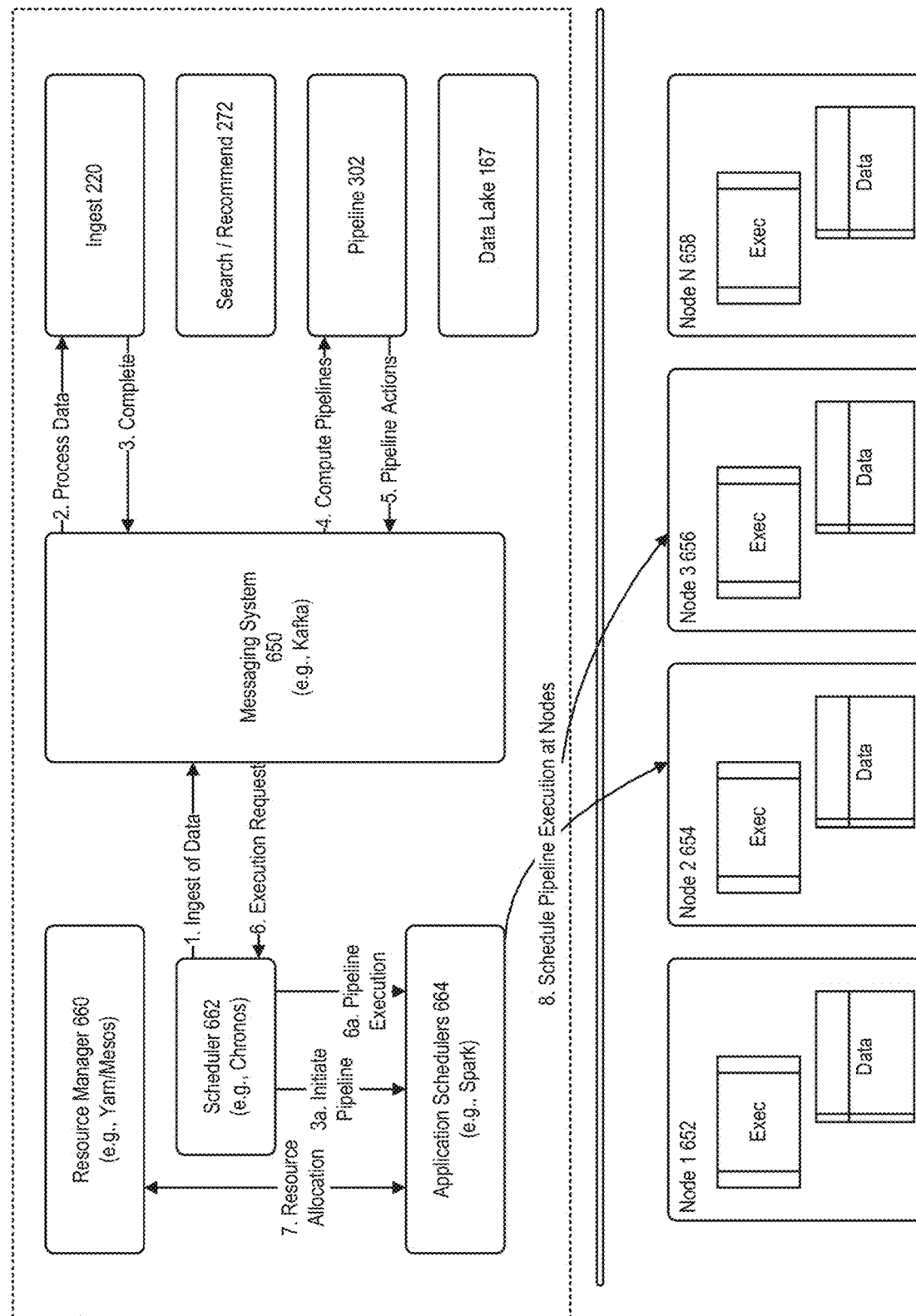
FIG. 28 further illustrates the use of a coordination fabric including a messaging system, in accordance with an embodiment.

FIG. 28 further illustrates the use of a coordination fabric including a messaging system, in accordance with an embodiment.

As illustrated in FIG. 28, in accordance with an embodiment, the dependencies across components in the coordination fabric are illustrated through a simple data-driven pipeline execution use case, where (c) indicates a consumer, and (p) indicates a producer.

In accordance with the embodiment illustrated in FIG. 28, a scheduler (p) starts the process (1) by initiating ingest of data to a HUB. An ingest engine (c) processes the request (2) ingesting data from the HUB into the data lake. After the ingest process is completed, the ingest engine (p) communicates (3) the completion status to initiate pipeline processing. If the scheduler supports data-driven execution, it can automatically initiate (3a) the pipeline process to execute. The pipeline engine (c) computes (4) the pipelines that are waiting on the data for execution. The pipeline engine (p) communicates (5) the list of pipeline applications to schedule for execution. The scheduler gets the execution schedule request (6) for the pipelines; and initiates execution (6a) of the pipelines. The application scheduler (e.g., Spark) arbitrates (7) with the resource manager for resource allocation to execute the pipelines. The application scheduler sends the pipeline (8), for execution to the executor in the allocated nodes.

On-Premise Agent

In accordance with an embodiment, an on-premise agent facilitates access to local data and in a limited fashion, distributed pipeline execution. The on-premise agent is provisioned and configured to communicate with, e.g., a Cloud DI service, to process data access and remote pipeline execution requests.

Figure 29:
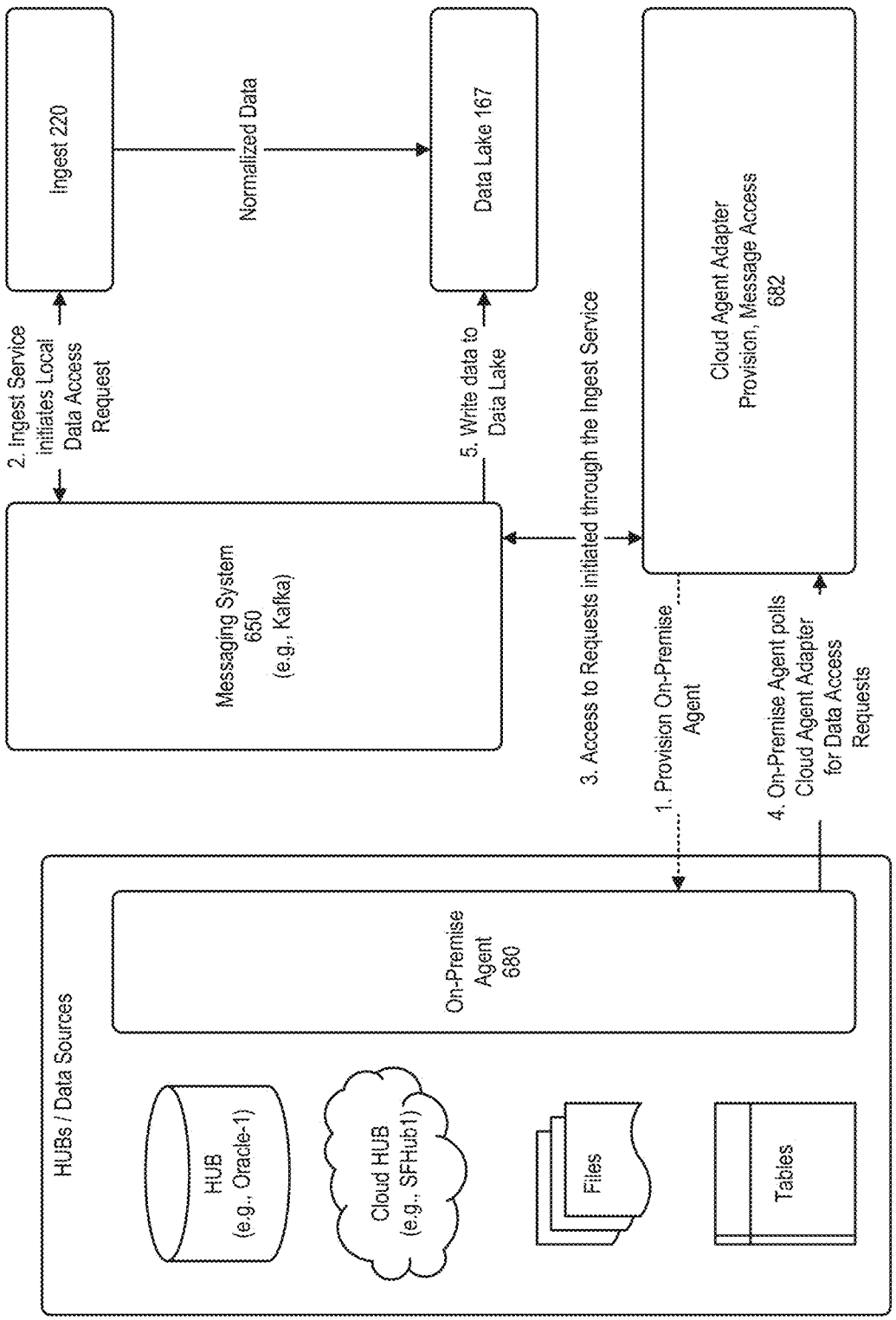
FIG. 29 illustrates an on-premise agent for use with a system, in accordance with an embodiment.

FIG. 29 illustrates an on-premise agent for use with a system, in accordance with an embodiment.

As illustrated in FIG. 29, in accordance with an embodiment, a cloud agent adapter 682 provisions (1) the on-premise agent 680 and configures the agent adapter end point for communication.

An ingest service initiates (2) the local data access request for HUB1 through the messaging system. a cloud agent adapter operates as an intermediary (3) between on-premise agent and the messaging system by providing access to requests initiated through the ingest service as well as writing data from on-premise agent into the data lake and notifying the completion of the task through messaging system.

A premise agent polls (4) the cloud agent adapter for data access requests to process or upload data into the cloud. The cloud agent adapter writes data (5) into the data lake and notifies pipelines through the messaging system.

DFML Flow Process

Figure 30:
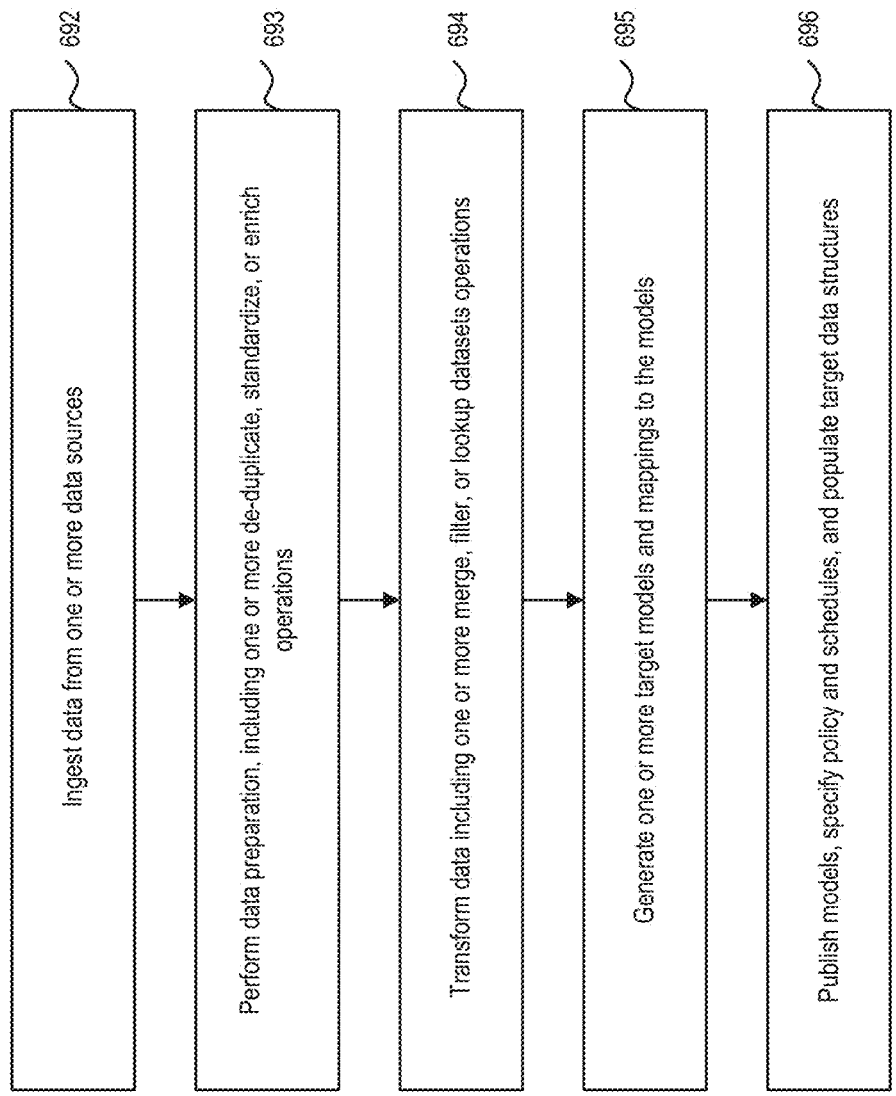
FIG. 30 illustrates a data flow process, in accordance with an embodiment.

FIG. 30 illustrates a data flow process, in accordance with an embodiment.

As illustrate in FIG. 30, in accordance with an embodiment, during an ingest step 692, data is ingested from various sources, for example, SFDC, S3, or DBaaS.

During a data prep step 693, the ingested data is prepared for example by being de-duplicated, standardized, or enriched.

During a transform step 694, the system performs merges, filters, or lookups at datasets, to transform the data.

During a model step 695, one or more models are generated, together with mappings to the models.

During a publish step 696, the system can publish models, specify policies and schedules, and populate target data structures.

Metadata and Data-Driven Auto-Mapping

In accordance with an embodiment, the system can provide support for auto-mapping of complex data structures, datasets or entities, between one or more sources or targets of data (referred to herein in some embodiments as HUBs). The auto-mapping can be driven by a metadata, schema, and statistical profiling of a dataset; and used to map a source dataset or entity associated with an input HUB, to a target dataset or entity, or vice versa, to produce an output data prepared in a format or organization (projection) for use with one or more output HUBs.

For example, in accordance with an embodiment, for a user implementing (e.g., building) a dataflow, pipeline, or Lambda application, the user may desire to choose data to be mapped from a source or input dataset or entity, within an input HUB, to a target or output dataset or entity, within an output HUB.

In accordance with an embodiment, since generating a map of data from an input HUB to an output HUB for very large set of HUBs and dataset or entities by hand can be an extremely time consuming and inefficient task, auto-mapping can enable a user to focus on simplification of a dataflow application, e.g., pipeline, Lambda application, by providing a user with recommendations for mapping data.

In accordance with an embodiment, the data AI subsystem can receive an auto-map request for an auto-map service via a graphical user interface (e.g., a Lambda Studio Integrated Development Environment (IDE)).

In accordance with an embodiment, the request can include a file specified for an application for which the auto-map service is to be performed, together with information identifying an input HUB, a dataset or entity, and one or more attributes. The application file can include information about data for the application. The data AI subsystem can process the application file to extract entity name and other shape characteristics of the entity including attribute names and data type, which the auto-map service can use in searching to find a potential candidate set for mapping.

In accordance with an embodiment, the system can access data for transformation into a HUB, such as, for example, a data warehouse. The accessed data can include various types of data including semi-structured and structured data. The data AI subsystem can perform a metadata analysis on the accessed data, including determining one or more shapes, features, or structure of the data. For example, the metadata analysis can determine the types of the data (e.g., business types and functional types), and a columnar shape of the data.

In accordance with an embodiment, based on the metadata analysis of the data, one or more samples of data can be identified, and a machine learning process applied to the sampled data, to determine a category of data in the accessed data, and update a model. The category of data, for example, may indicate the relevant portions of the data, such as a fact table in the data.

In accordance with an embodiment, the machine learning can be implemented using, for example, a logistic regression model, or other type of machine learning model that can be implemented for machine learning. In accordance with an embodiment, the data AI subsystem can analyze a relationship of one or more data items in the data, based on the category of data, the relationship indicating one or more fields in the data for the category of data.

In accordance with an embodiment, the data AI subsystem can perform a process for feature extraction, including determining one or more metadata, data type, and statistical profiles of randomly sampled data for attributes of the accessed data.

For example, in accordance with an embodiment, the data AI subsystem can generate a profile of the accessed data based on its category of data. The profile can be generated for transformation of the data into an output HUB, and, for example, displayed in a graphical user interface.

In accordance with an embodiment, as a result of creating such profiles, the model can support a recommendation, with a degree of confidence, for how a candidate dataset or entity is similar to an input dataset or entity. The recommendations can be filtered and sorted and then provided to the user via the graphical user interface.

In accordance with an embodiment, an auto-map service can dynamically suggest recommendations based on a stage in which a user is building a dataflow application, e.g., pipeline, Lambda application.

An example of a recommendation at an entity level may include, in accordance with an embodiment, a recommendation for an attribute, for example a column of the entity to be automatically mapped to another attribute, or another entity. The service can continuously provide recommendations and guide the user based on user's previous activities.

In accordance with an embodiment, the recommendations can be mapped from, e.g., a source dataset or entity associated with an input HUB, to a target dataset or entity associated with an output HUB, using an application programming interface (API) (e.g., a REST API) provided by the auto-map service. The recommendation can indicate a projection of data, such as, for example, an attribute, a data type, and an expression, wherein the expression can be a mapping of the attribute for the data type.

In accordance with an embodiment, the system can provide a graphical user interface to select an output HUB for transformation of the accessed data based on the recommendation. For example, the graphical user interface can enable a user to select a recommendation for transformation of data to an output HUB.

Auto-Mapping

In accordance with an embodiment, the auto-mapping functionality can be defined mathematically, in which an entity set E is defined as:

$$E=\{e_1, e_2, \ldots, e_n | \forall e_1 \in S\}$$

$$\text{Shape}:S=\{\text{MetaData} \times \text{DataType} \times \text{StatisticalProfile}\}$$

Where the shape set S includes metadata, data type and statistical profiling dimensions. The goal is to find j such that the probability of similarity between $e_i$ and $e_j$ is the highest.

$$e_j^* = \underset{j}{\operatorname{argmax}} p\{Sim(e_i, e_j) | \text{entity} = e_i\}$$

At dataset or entity level, the problem is a binary problem, i.e., whether the dataset or entity is similar or dissimilar. Let $f_s$, $f_t$, $h(f_s, f_t)$ denote sets of features for source, target, and interactive features between source and target. Therefore the goal is to estimate the probability of similarity:

$$p=g(f_s, f_t, h(f_s, f_t); \beta)$$

$$g(\cdot):[0,1]^Q \rightarrow [0,1]$$

The log-likelihood function is defined as:

$$l(\beta) = \sum_{q=1}^{Q} c_q \log p_q(\beta) + (1 - c_q)\log(1 - p_q(\beta))$$

Therefore, in the logistic regression model the unknown coefficients can be estimated as follows:

$$g(x; \beta) = \frac{1}{1 + e^{-\beta^T x}}$$

$$\beta^* = \underset{\beta}{\operatorname{argmax}} l(\beta)$$

In accordance with an embodiment, the auto-map service can be triggered by, for example, receiving a HTTP POST request from the system facade service. The system facade API passes the dataflow application, e.g., pipelines, Lambda application JSON file from UI to the auto-map REST API, and the parser module processes the application JSON file and extracts entity name and shape of dataset or entity including attribute names and data type.

In accordance with an embodiment, the auto-map service uses a search to find quickly a potential candidate set for mapping. The candidate set needs to be a highly relevant set, and therefore a special index and query can be used to achieve this. This special index incorporates a special search field where all attributes of an entity are stored and tokenized with all N-gram combinations. At query time, the search query builder module leverages a fuzzy search feature based, for example, on Levenshtein distance, to construct a special query using both entity name and attribute names of the given entity and leverage the search boost function to sort results by their relevance in sense of string similarity.

In accordance with an embodiment, the recommendation engine shows a number of relevant results to users, for example a selection of top N results in most cases.

In accordance with an embodiment, in order to achieve a high precision, a machine learning model compares pairs of source and targets and score similarity of entities based on extracted features. The feature extraction includes metadata, data type and statistical profiles of randomly sampled data for each attributes.

Although the descriptions provided here, in accordance with an embodiment, generally describes the use of a logistic regression model to learn auto-mapping examples taken from an Oracle Business Intelligence (OBI) lineage mapping data, other supervised machine learning models can be used instead.

In accordance with an embodiment, the output of the logistic regression model represents an overall confidence of how a candidate dataset or entity is similar to an input dataset or entity in a statistical sense. In order to find an exact mapping one or more other models can be used to calculate similarity of source attribute with target attribute using similar features.

Finally, in accordance with an embodiment, the recommendations are filtered and sorted and sent back to the system facade and passed to the user interface. The auto-map service dynamically suggests recommendations based on at what stage the user is during the dataflow application, e.g., pipeline or Lambda application design. The service can continuously provide recommendations and guide the user, based on the user's previous activities. The auto-mapping can be performed in either forward engineering or reverse engineering senses.

Figure 31:
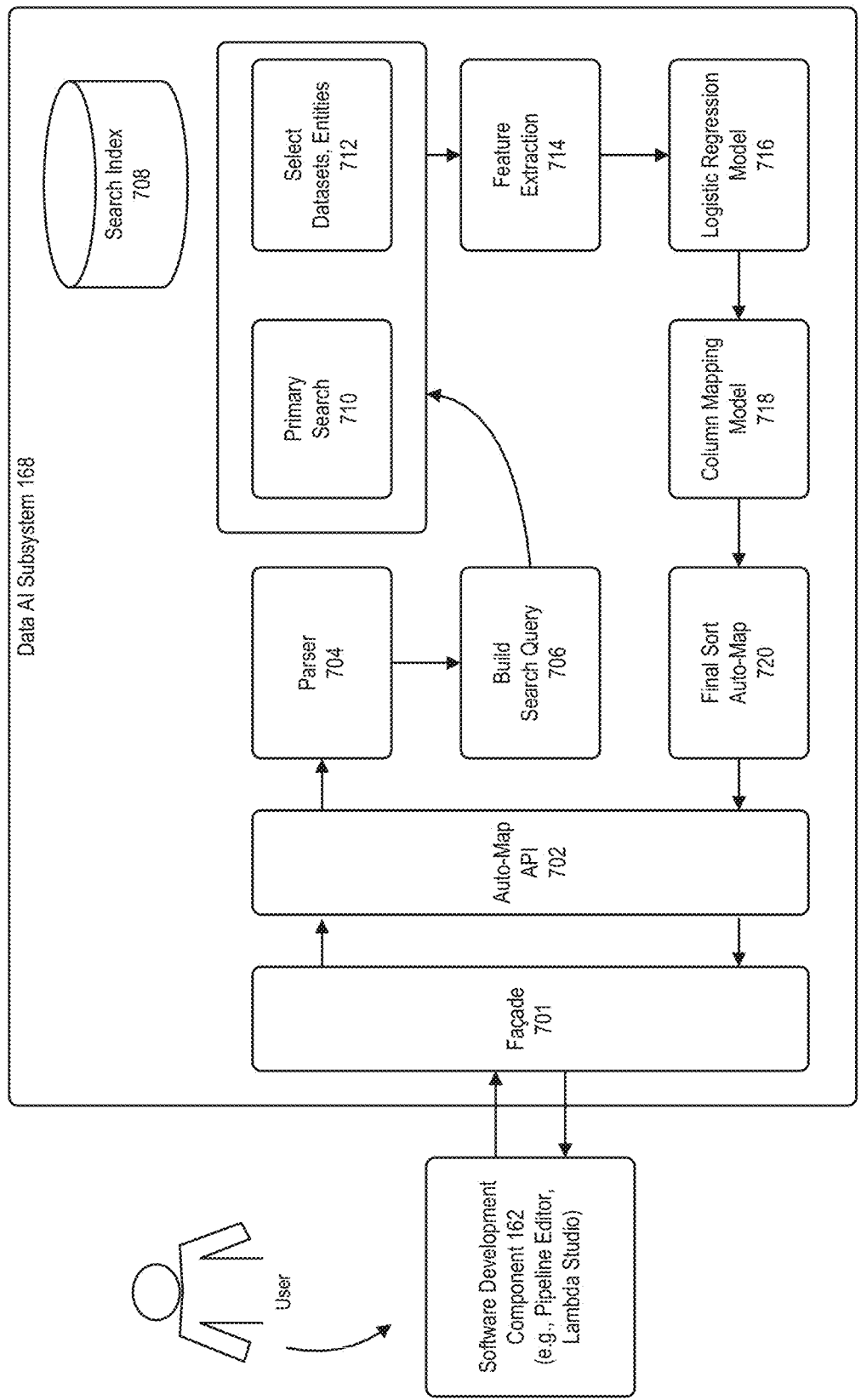
FIG. 31 illustrates an automated mapping of data types, in accordance with an embodiment.

FIG. 31 illustrates an automated mapping of data types, in accordance with an embodiment.

As illustrated in FIG. 31, in accordance with an embodiment, a system façade 701 and auto-map API 702 allows for the receipt of a dataflow application, e.g., pipeline or Lambda application from the software development component, e.g., Lambda Studio. A parser 704 processes the application's JSON file, and extracts entity names and shapes, including attribute names and data type.

In accordance with an embodiment, a search index 708, is used to support a primary search 710, to find a potential candidate set of datasets or entities, for mapping. A search query builder module 706 constructs a query using both entity name and attribute names of the given entity, to determine a selection of datasets or entities 712.

In accordance with an embodiment, a machine learning (ML) model is used to compare pairs of sources and targets, and to score similarity of datasets or entities, based on extracted features. The feature extraction 714 includes metadata, data type and statistical profiles of randomly sampled data for each attributes.

In accordance with an embodiment, a logistic regression model 716 provides, as an output, an overall confidence of how a candidate entity is similar to an input entity. In order to find a more exact mapping, a column mapping model 718 is used to further evaluate similarity of source attribute with target attribute.

In accordance with an embodiment, the recommendations are then sorted as auto-mappings 720, for return to the software development component, e.g., Lambda Studio. The auto-map service dynamically suggests recommendations based on at which stage the user is, during the dataflow application, e.g., pipeline or Lambda application design. The service can continuously provide recommendations and guide the user, based on the user's previous activities.

Figure 32:
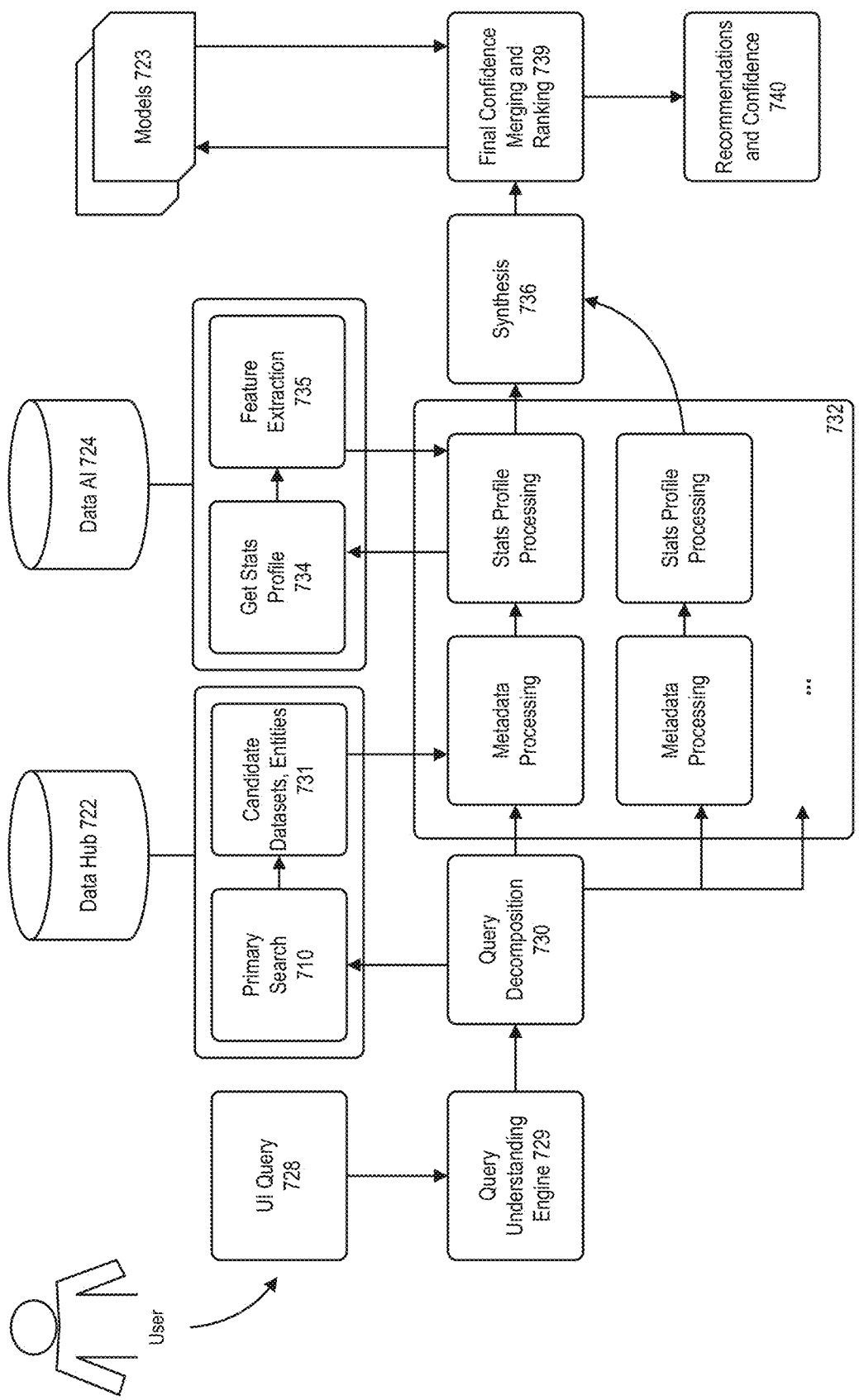
FIG. 32 illustrates an auto-map service for generation of mappings, in accordance with an embodiment.

FIG. 32 illustrates an auto-map service for generation of mappings, in accordance with an embodiment.

As illustrated in FIG. 32, in accordance with an embodiment, an auto-map service can be provided for generation of mappings, including wherein a UI query 728 is received and passed to a query understanding engine 729, and then to a query decomposition 730 component.

In accordance with an embodiment, a primary search 710 is performed using a data HUB 722 to determine candidate datasets or entities 731, for use in subsequent metadata and stats profile processing 732.

In accordance with an embodiment, the result are passed to a get stats profile 734 component and the data AI system 724 provide feature extraction 735. Results are used for synthesis 736, final confidence merging and ranking 739 according to the models 723, and providing of recommendations and associated confidences 740.

Auto-Map Examples

Figure 33:
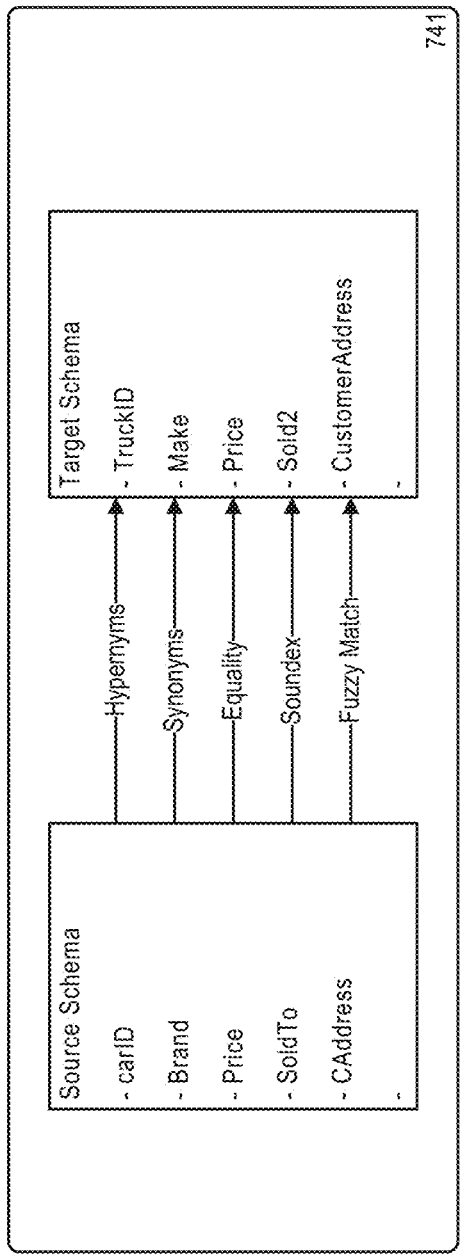
FIG. 33 illustrates an example of mapping between a source schema and target schema, in accordance with an embodiment.

FIG. 33 illustrates an example of mapping between a source schema and target schema, in accordance with an embodiment.

As illustrated in FIG. 33, the example 741 shows, in accordance with an embodiment, a simple auto-mapping example based on, for example, (a) hypernyms, (b) synonyms, (c) equality, (d) Soundex, and (e) fuzzy matching.

Figure 34:
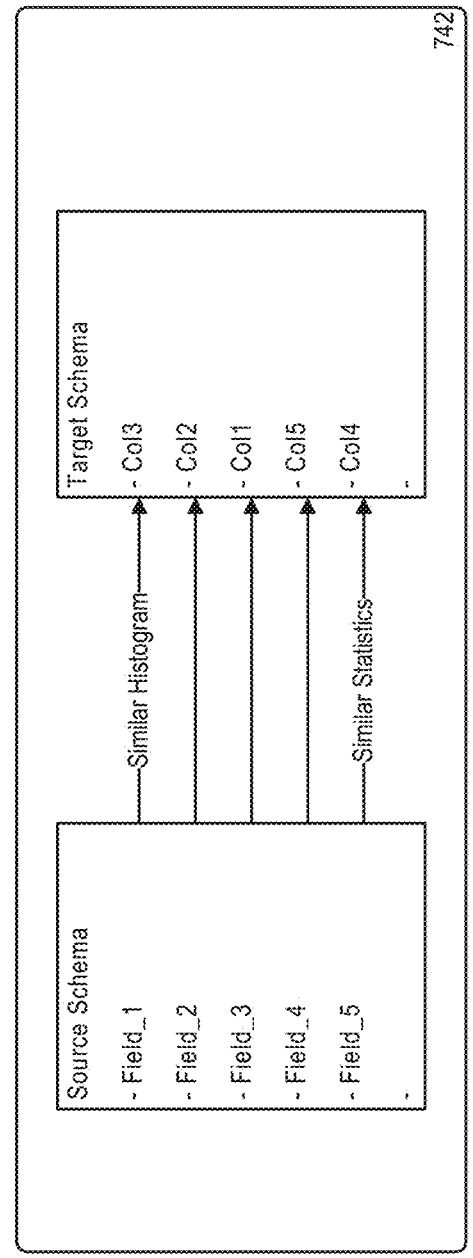
FIG. 34 illustrates another example of mapping between a source schema and target schema, in accordance with an embodiment.

FIG. 34 illustrates another example of mapping between a source schema and target schema, in accordance with an embodiment.

As illustrated in FIG. 34, an approach solely based on metadata will fail if this information is irrelevant. In accordance with an embodiment, FIG. 34 illustrates an example 742 wherein the source and target attribute names are completely uninformative. When there is a lack of metadata features, the system can employ models that include statistical profiling of features to achieve finding similar entities.

Auto-Map Process

Figure 35:
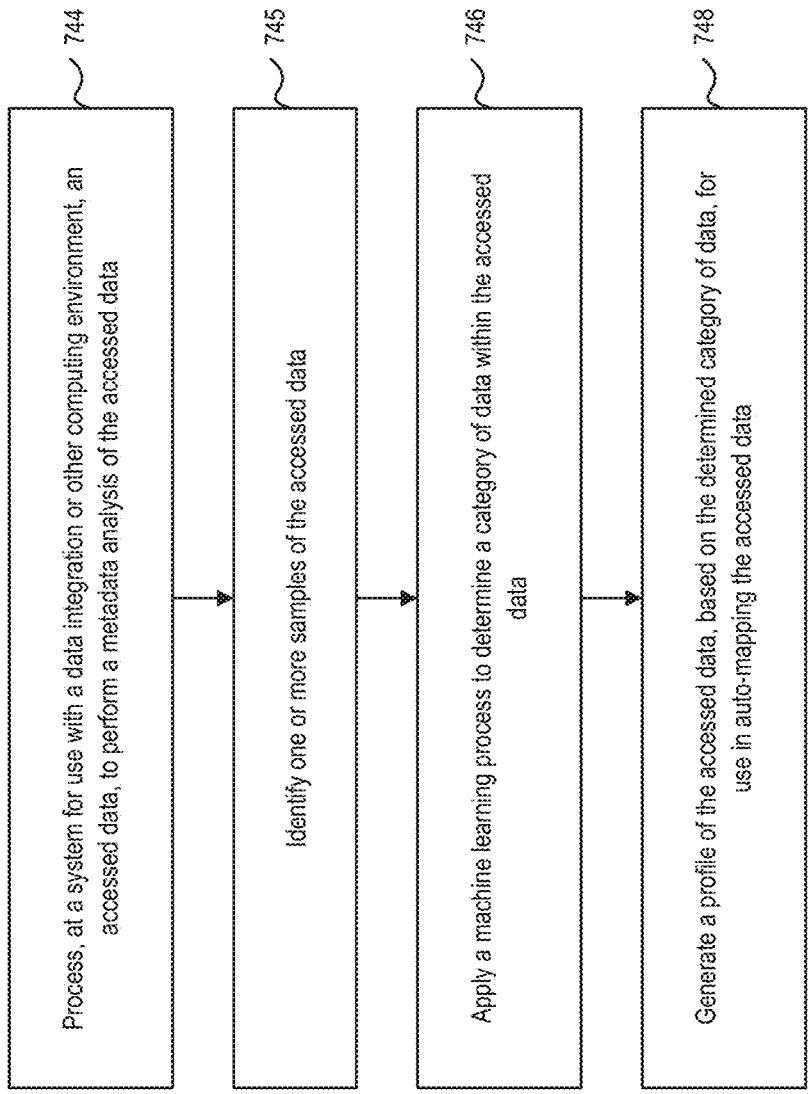
FIG. 35 illustrates a process for providing automated mapping of data types, in accordance with an embodiment.

FIG. 35 illustrates a process for providing automated mapping of data types, in accordance with an embodiment.

As illustrated in FIG. 35, at step 744, in accordance with an embodiment, an accessed data is processed, to perform a metadata analysis of the accessed data.

At step 745, one or more samples of the accessed data are identified.

At step 746, a machine learning process is applied to determine a category of data within the accessed data.

At step 748, a profile of the accessed data is generated, based on the determined category of data, for use in auto-mapping the accessed data.

Dynamic Recommendations and Simulation

In accordance with an embodiment, the system can include a software development component (referred to herein in some embodiments as Lambda Studio), and graphical user interface (referred to herein in some embodiments as pipeline editor, or Lambda Studio IDE), that provides a visual environment for use with the system, including providing real-time recommendations for performing semantic actions on data accessed from an input HUB, based on an understanding of the meaning or semantics associated with the data.

For example, in accordance with an embodiment, the graphical user interface can provide real-time recommendations for performing operations (also referred to as semantic actions) on data accessed from an input HUB, including a partial data, shape or other characteristics of that data. The semantic actions can be performed on the data based on the meaning, or semantics associated with data. The meaning of the data can be used to select semantic actions that can be performed on the data.

In accordance with an embodiment, a semantic action may represent an operator on one or more datasets, and can reference a base semantic action or function declaratively defined in the system. One or more processed datasets can be generated by performing a semantic action. A semantic action can be defined by parameters that are associated with specific functional or business types. They represent a specific upstream dataset to be processed. A graphical user interface can be metadata-driven, such that the graphical user interface is generated dynamically to provide recommendations based on metadata identified in the data.

Figure 36:
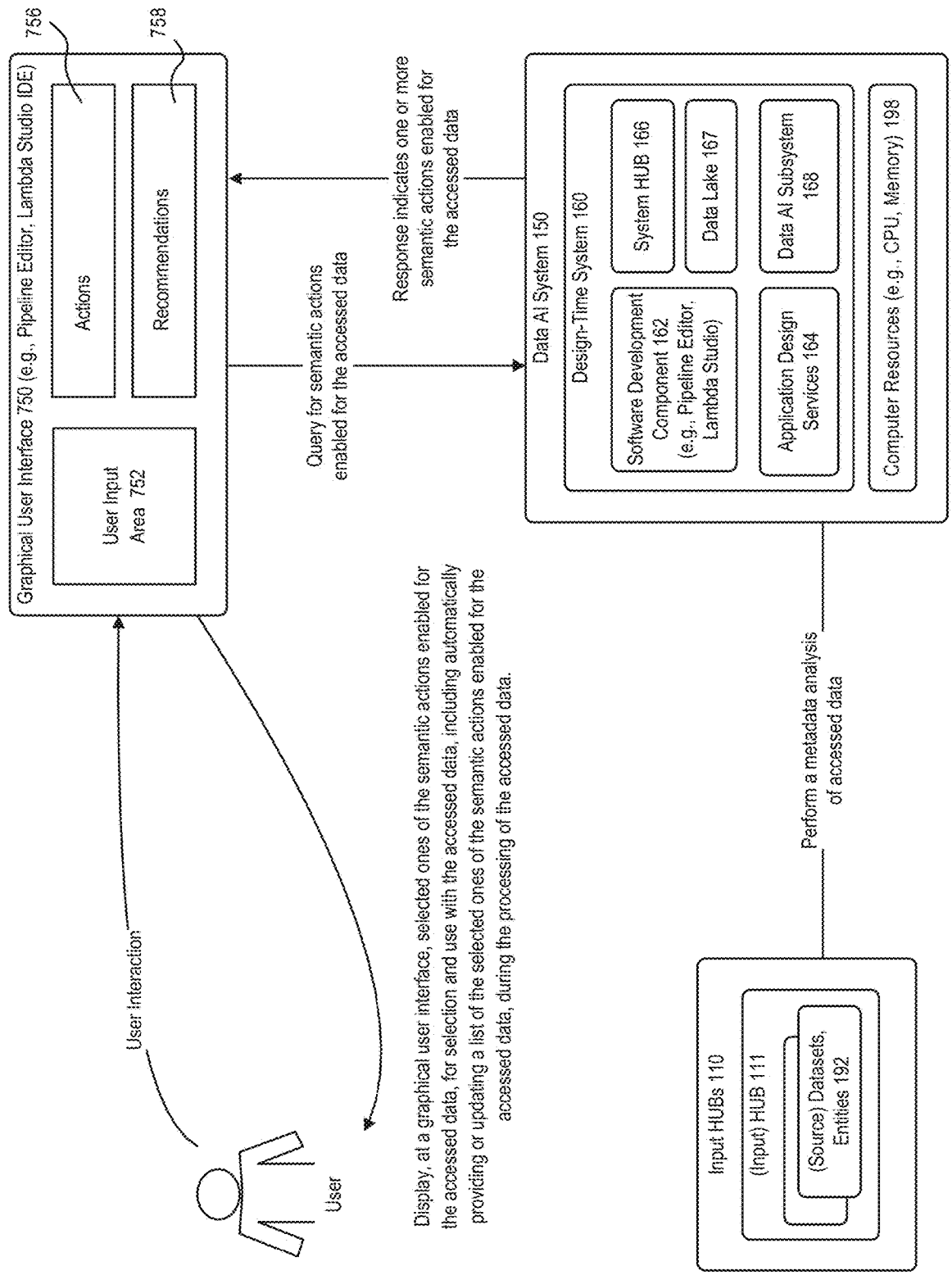
FIG. 36 illustrates a system that displays one or more semantic actions enabled for accessed data, in accordance with an embodiment.

FIG. 36 illustrates a system that displays one or more semantic actions enabled for accessed data, in accordance with an embodiment.

As illustrated in FIG. 36, in accordance with an embodiment, using a graphical user interface 750 having a user input area 752 a query for semantic actions enabled for the accessed data is sent to a knowledge source of the system, wherein the query indicates the classification of the accessed data.

In accordance with an embodiment, a response to the query is received from the knowledge source, wherein the response indicates one or more semantic actions enabled for the accessed data and identified based on the classification of the data.

In accordance with an embodiment, selected ones of the semantic actions enabled for the accessed data are displayed, for selection and use with the accessed data, including automatically providing or updating a list of the selected ones of the semantic actions 756, or recommendations 758, enabled for the accessed data, during the processing of the accessed data.

In accordance with an embodiment, the recommendations can be provided dynamically rather than being pre-computed based on static data. For example, the system can provide recommendations in real-time based on data accessed in real-time, taking into account information such as, for example, a user profile or the user's experience level. The recommendations provided by the system for real-time data may be salient, relevant, and precise for producing dataflow applications, e.g., pipelines, Lambda applications. The recommendations can be provided based on user behavior with respect to data associated with particular metadata. The system can recommend semantic actions on information.

For example, in accordance with an embodiment, the system can ingest data, transform, integrate and publish the data to an arbitrary system. The system can recommend that an entity be used to analyze some of its numerical measures in an interesting analytic manner; pivoting that data on various dimensions, indicating what are the interesting dimensions even, summarizing the data for those dimension hierarchies and enriching the data with more insight.

In accordance with an embodiment, the recommendations can be provided based on analysis of data using techniques, such as, for example, a metadata analysis of the data.

In accordance with an embodiment, the metadata analysis can include determining a classification of the data, such as, for example, shapes, features, and structure of the data. The metadata analysis can determine the types of the data (e.g., business types and functional types). The metadata analysis can also indicate a columnar shape of the data. In accordance with an embodiment, the data can be compared to the metadata structure (e.g., shapes and features) to determine a type of data and attributes associated with the data. The metadata structure can be defined in a system HUB (e.g., a knowledge source) of the system.

In accordance with an embodiment, using the metadata analysis, the system can query a system HUB to identify semantic actions based on the metadata. Recommendations can be semantic actions determined based on analysis of metadata of data accessed from an input HUB. Specifically, semantic actions can be mapped to metadata. For example, semantic actions can be mapped to metadata for which those actions are permitted and/or applicable. The semantic actions can be user defined, and/or can be defined based on a structure of data.

In accordance with an embodiment, the semantic actions can be defined based on conditions associated with metadata. The system HUB can be modified such that semantic actions are modified, deleted, or augmented.

Examples of semantic actions may include, in accordance with an embodiment, building a cube, filtering data, grouping data, aggregating data, or other actions that can be performed on data. By defining semantic actions based on metadata, no mapping or scheme may be needed to determine semantic actions permitted for data. Semantic actions can be defined as new and different metadata structures are discovered. As such, the system can dynamically determine recommendations based on identification of semantic actions using metadata analyzed for data received as input.

In accordance with an embodiment, semantic actions can be defined by a third party, such that the third party can supply data, such as, for example, data defining one or more semantic actions associated with metadata. The system can dynamically query the system HUB to determine the semantic actions available for metadata. As such, the system HUB can be modified, such that the system determines the semantic actions permitted at the time based on such modifications. The system can perform operations (e.g., filter, detect, and register) to process data obtained from a third party, where the data defines semantic actions; and can make semantic actions available based on the semantic actions identified by the processing.

Figure 37:
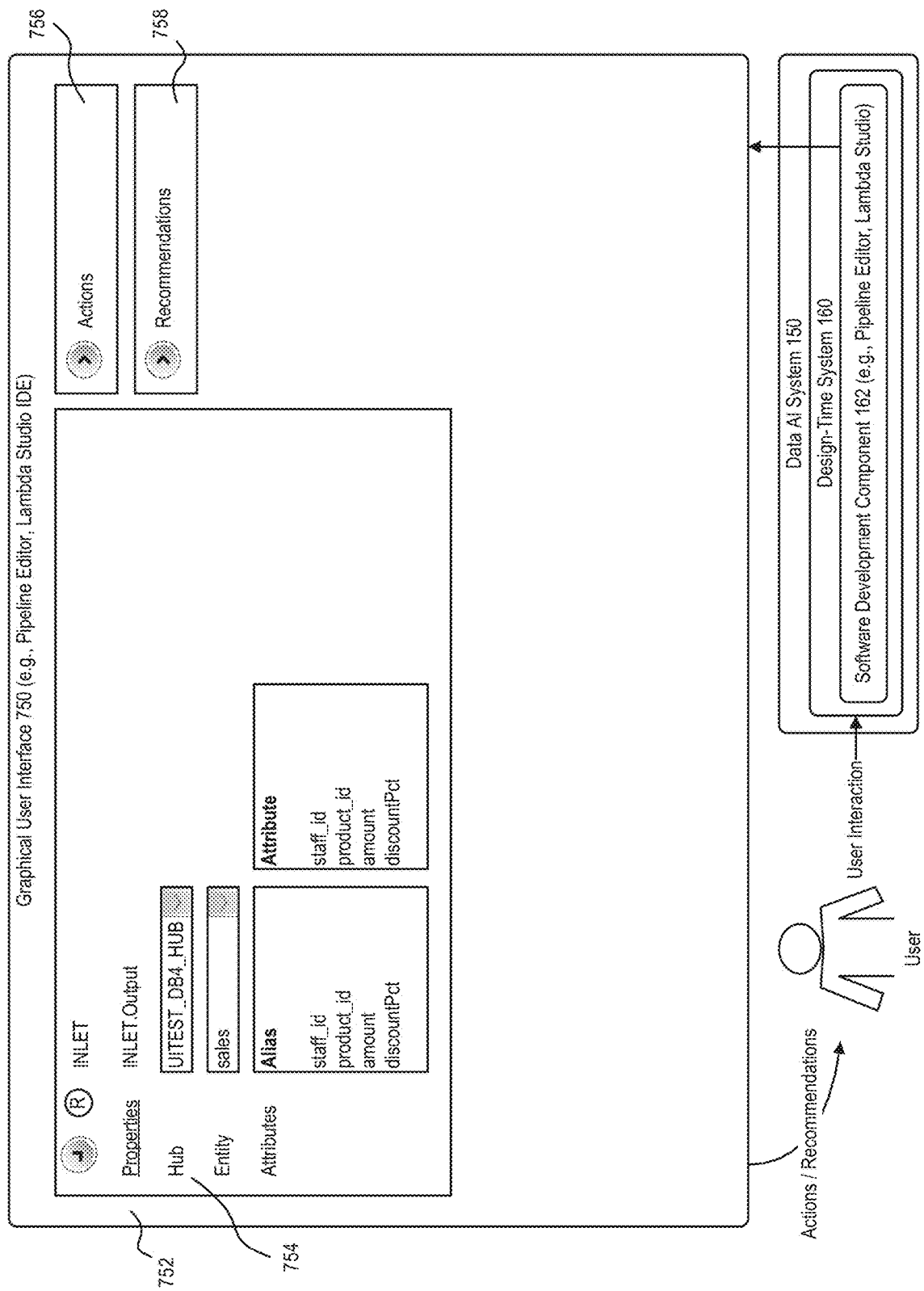
FIG. 37 illustrates a graphical user interface that displays one or more semantic actions enabled for accessed data, in accordance with an embodiment.
Figure 38:
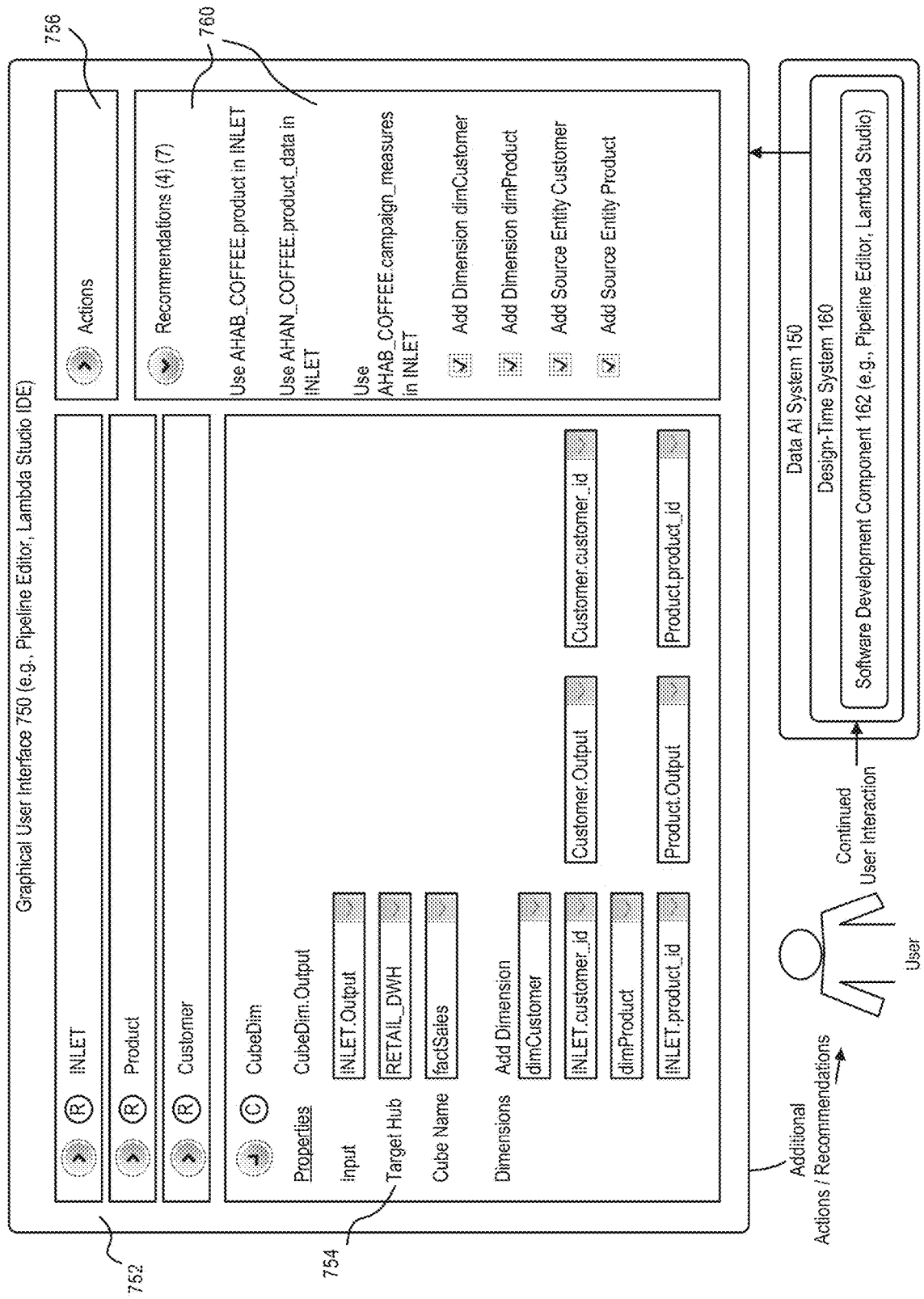
FIG. 38 further illustrates a graphical user interface that displays one or more semantic actions enabled for accessed data, in accordance with an embodiment.

FIG. 37 and FIG. 38 illustrate a graphical user interface that displays one or more semantic actions enabled for accessed data, in accordance with an embodiment.

As illustrated in FIG. 37, in accordance with an embodiment, a software development component (e.g., Lambda Studio), can provide a graphical user interface (e.g., a pipeline editor, or Lambda studio IDE) 750, that can display recommended semantic actions, for use in processing an input data, or simulating the processing of the input data, for projection onto an output HUB.

For example, in accordance with an embodiment, the interface in FIG. 37 allows a user to display options 752 associated with a dataflow application, e.g., pipeline, Lambda application, including, for example, an input HUB definition 754.

In accordance with an embodiment, during the creation of a dataflow application, e.g., pipeline, Lambda application, or the simulation of a dataflow application, e.g., pipeline, Lambda application, with an input data, one or more sematic actions 756, or other recommendations 758, can be displayed on the graphical user interface, for review by the user.

In accordance with an embodiment, in a simulation mode, the software development component (e.g., Lambda Studio) provides a sandbox-environment that allows the user to immediately see the results of performing various semantic actions on the output, including automatically updating a list of semantic actions appropriate to the accessed data, during the processing of the accessed data.

For example, as illustrated in FIG. 38, in accordance with an embodiment, from a starting point of the user searching for some information, the system can recommend operations 760 on information, for example that an entity be used to analyze some of its numerical measures in an interesting analytic manner; pivoting that data on various dimensions, indicating what are the interesting dimensions even, summarizing the data for those dimension hierarchies and also enriching the data with more insight.

In accordance with an embodiment, in the example illustrated, both sources and dimensions have been recommended for an analyzable entity in the system, making the task of building a multi-dimensional cube one of almost point and click.

Typically, such activities require a lot of experience and domain specific knowledge. Using machine learning to analyze both the data characteristics and the user's behavioral patterns for common integration patterns, together with the combination of semantic search and recommendations from machine learning, allows for an approach that offers state of the art tooling for application development for building business focused applications.

Figure 39:
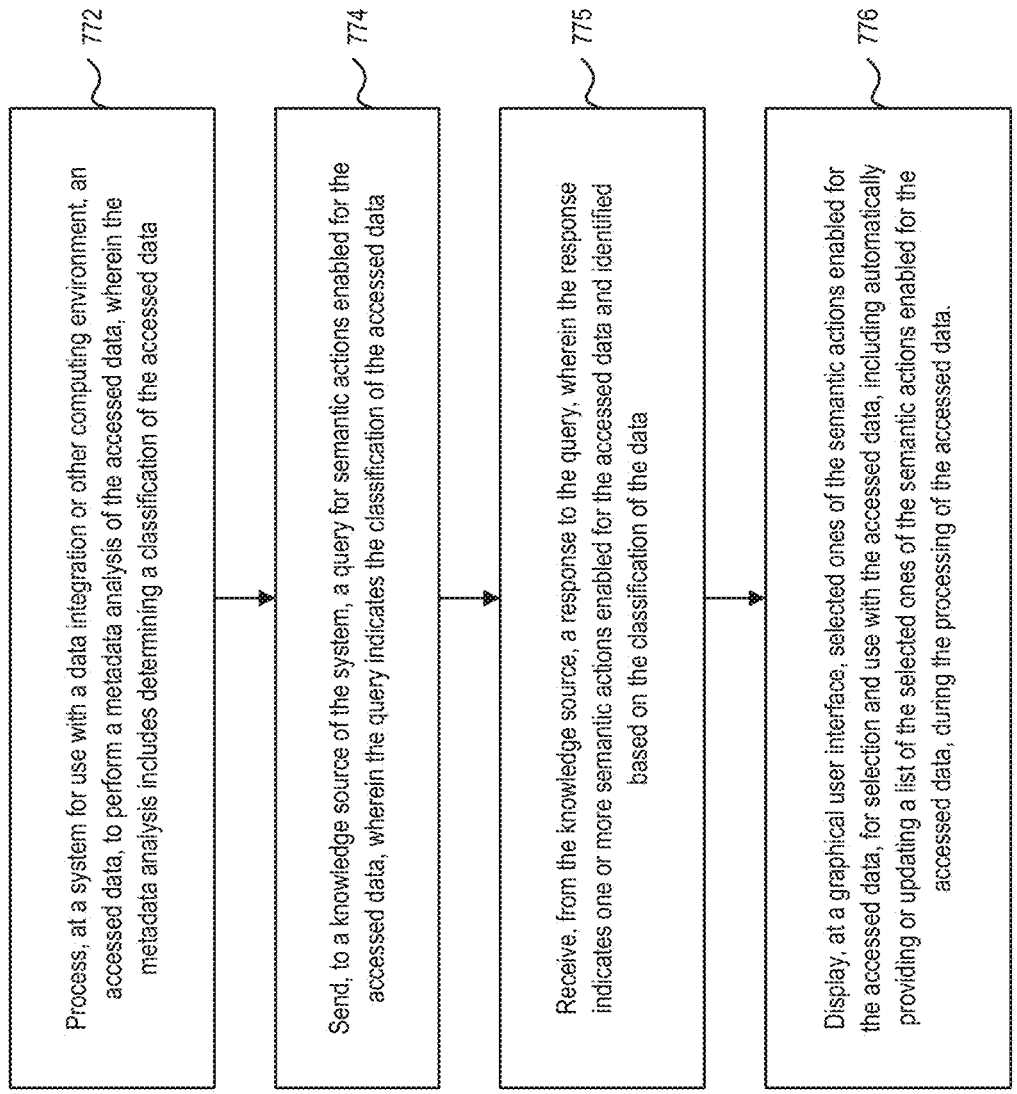
FIG. 39 illustrates a process for displaying one or more semantic actions enabled for accessed data, in accordance with an embodiment.

FIG. 39 illustrates a process for displaying one or more semantic actions enabled for accessed data, in accordance with an embodiment.

As illustrated in FIG. 39, at step 772, in accordance with an embodiment, an accessed data is processed, to perform a metadata analysis of the accessed data, wherein the metadata analysis includes determining a classification of the accessed data.

At step 774, a query for semantic actions enabled for the accessed data is sent to a knowledge source of the system, wherein the query indicates the classification of the accessed data.

At step 775, a response to the query is received from the knowledge source, wherein the response indicates one or more semantic actions enabled for the accessed data and identified based on the classification of the data.

At step 776, at a graphical user interface, selected ones of the semantic actions enabled for the accessed data are displayed, for selection and use with the accessed data, including automatically providing or updating a list of the selected ones of the semantic actions enabled for the accessed data, during the processing of the accessed data.

Functional Decomposition of Data Flows

In accordance with an embodiment, the system can provide a service to recommend actions and transformations, on an input data, based on patterns identified from the functional decomposition of a data flow for a software application, including determining possible transformations of the data flow in subsequent applications. Data flows can be decomposed into a model describing transformations of data, predicates, and business rules applied to the data, and attributes used in the data flows.

Figure 40:
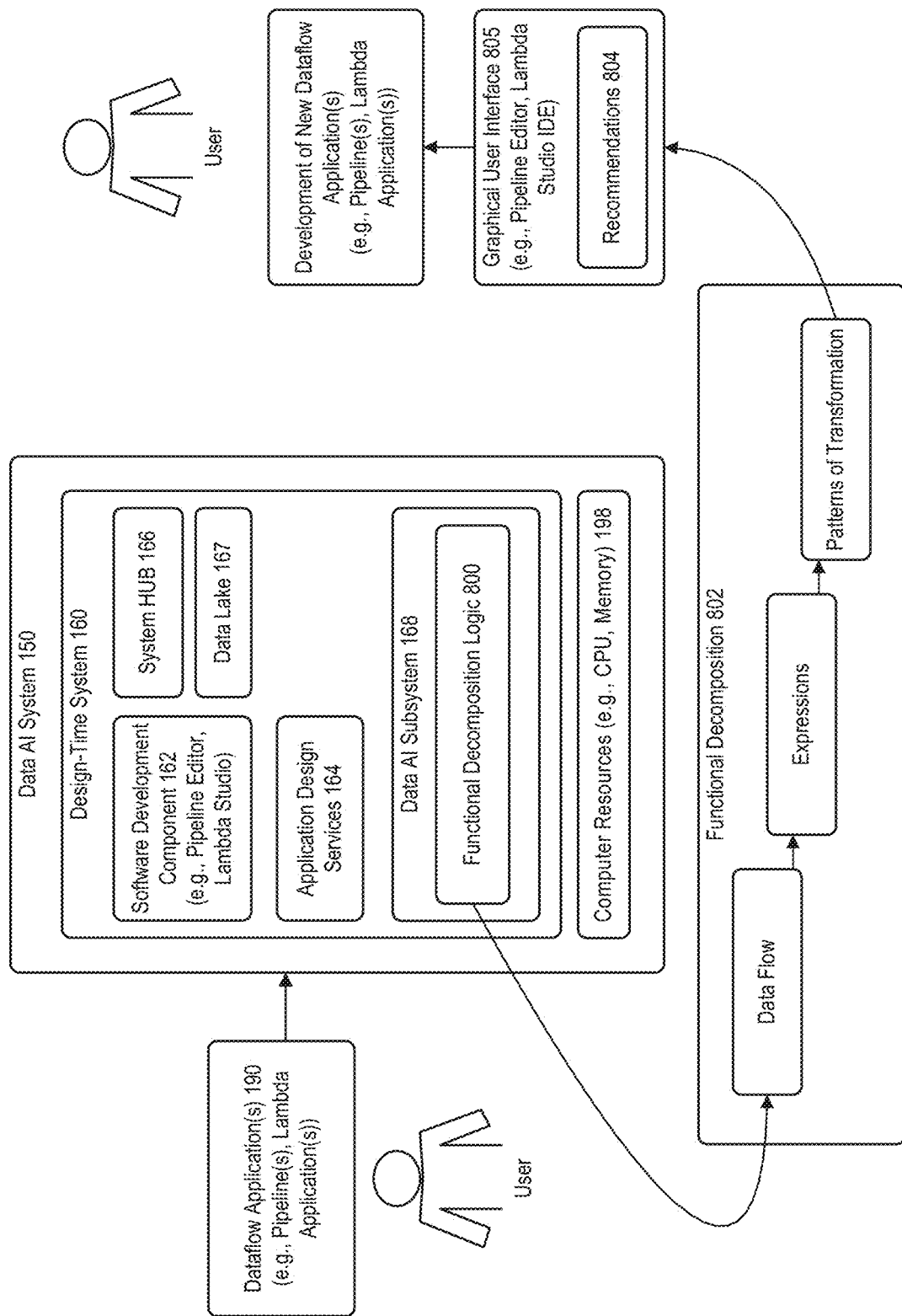
FIG. 40 illustrates a means of identifying a pattern of transformation in a data flow, for one or more functional expressions generated for each of one or more applications, in accordance with an embodiment.

FIG. 40 illustrates support for evaluation of a pipeline, Lambda application, into its constituent parts, to facilitate pattern detection and inductive learning, in accordance with an embodiment.

As illustrated in FIG. 40, in accordance with an embodiment, a functional decomposition logic 800 or software component, which can be provided as software or program code that is executable by a computer system or other processing device, and can be used to provide a functional decomposition 802 and recommendations 804, for display 805 (for example, within a pipeline editor, or Lambda Studio IDE). For example, the system can provide a service to recommended actions and transformations on data based on patterns/templates identified from functional decomposition of data flows for dataflow applications, e.g., pipelines, Lambda applications, i.e., observe, through functional decomposition of data flows, patterns for determining possible transformations of data flow in subsequent applications.

In accordance with an embodiment, the service can be implemented by a framework that can decompose, or break down, data flows into a model describing transformations of data, predicates, and business rules applied to the data, and attributes used in the data flows.

Traditionally, a data flow for applications may represent a series of transformations on data and the type of transformations applied to data is highly contextual. In most data integration frameworks, process lineage is usually limited or nonexistent in how data flows are persisted, analyzed and generated. In accordance with an embodiment, the system enables deriving contextually relevant patterns from flows or graphs based on semantically rich entity types and to further learn data flow grammar and models and using it to generate complex data flow graphs given similar contexts.

In accordance with an embodiment, the system can generate one or more data structures defining patterns and templates based on design specification of data flows. Data flows can be decomposed into data structures defining functional expressions to determine patterns and templates. The data flows can be used to predict and generate functional expressions for determining patterns for recommendations of data transformations, wherein the recommendations are based on the models derived from inductive learning of decomposed data flows and inherent patterns, and can be finely grained (for example, recommending a scalar transformation on a particular attribute or the use of one or more attributes in a predicate for filter or join).

In accordance with an embodiment, dataflow applications, e.g., pipelines, Lambda applications can enable users to generate complex data transformations based on semantic actions on data. The system can store data transformations as one or more data structures defining the flow of data for a pipeline, Lambda application.

In accordance with an embodiment, decomposing data flow for a dataflow application, e.g., pipeline, Lambda application, can be used to determine pattern analysis of the data and to generate functional expressions. The decomposition can be performed for semantic actions as well as transformations and predicates, or business rules. Each of previous applications semantic actions can be identified through decomposition. Using a process of induction, business logic can be extracted from a data flow including its context elements (business types and functional types).

In accordance with an embodiment, a model can be generated for the process; and, based on induction, prescriptive data flow design recommendations can be generated which are contextually rich. The recommendations can be based on patterns inference from the model, wherein each of the recommendations may correspond to a semantic action that can be performed on data for an application.

In accordance with an embodiment, the system can perform a process for inferring patterns for data transformation based on functional decomposition. The system can access a data flow for one or more dataflow applications, e.g., pipelines, Lambda applications. The data flow can be processed to determine one or more functional expressions. The functional expressions can be generated based on actions, predicates, or business rules identified in the data flow. The actions, predicates, or business rules can be used to identify (e.g., infer) the pattern of transformation on the data flow. Inferring a pattern of transformation may be a passive process.

In accordance with an embodiment, the pattern of transformation can be determined in a crowd sourcing manner based on passive analysis of data flows for different applications. The pattern can be determined using machine learning (e.g., deep reinforcement learning).

In accordance with an embodiment, a pattern of transformation can be identified for the functions expressions generated for a dataflow application, e.g., pipeline, Lambda application. One or more data flows can be decomposed to infer patterns for data transformation.

In accordance with an embodiment, using the pattern, the system can recommend one or more data transformations for a data flow of the new dataflow application, e.g., pipeline, Lambda application. In an example of a data flow of processing on data for a monetary exchange, the system can identify a pattern of transformations on the data. The system can also recommend one or more transformations for a new data flow of an application, wherein the data flow involves data for a similar monetary exchange. The transformation(s)

can be performed in a similar manner according to the pattern such that the new data flow is modified according to the transformation(s) to produce a similar monetary exchange.

Figure 41:
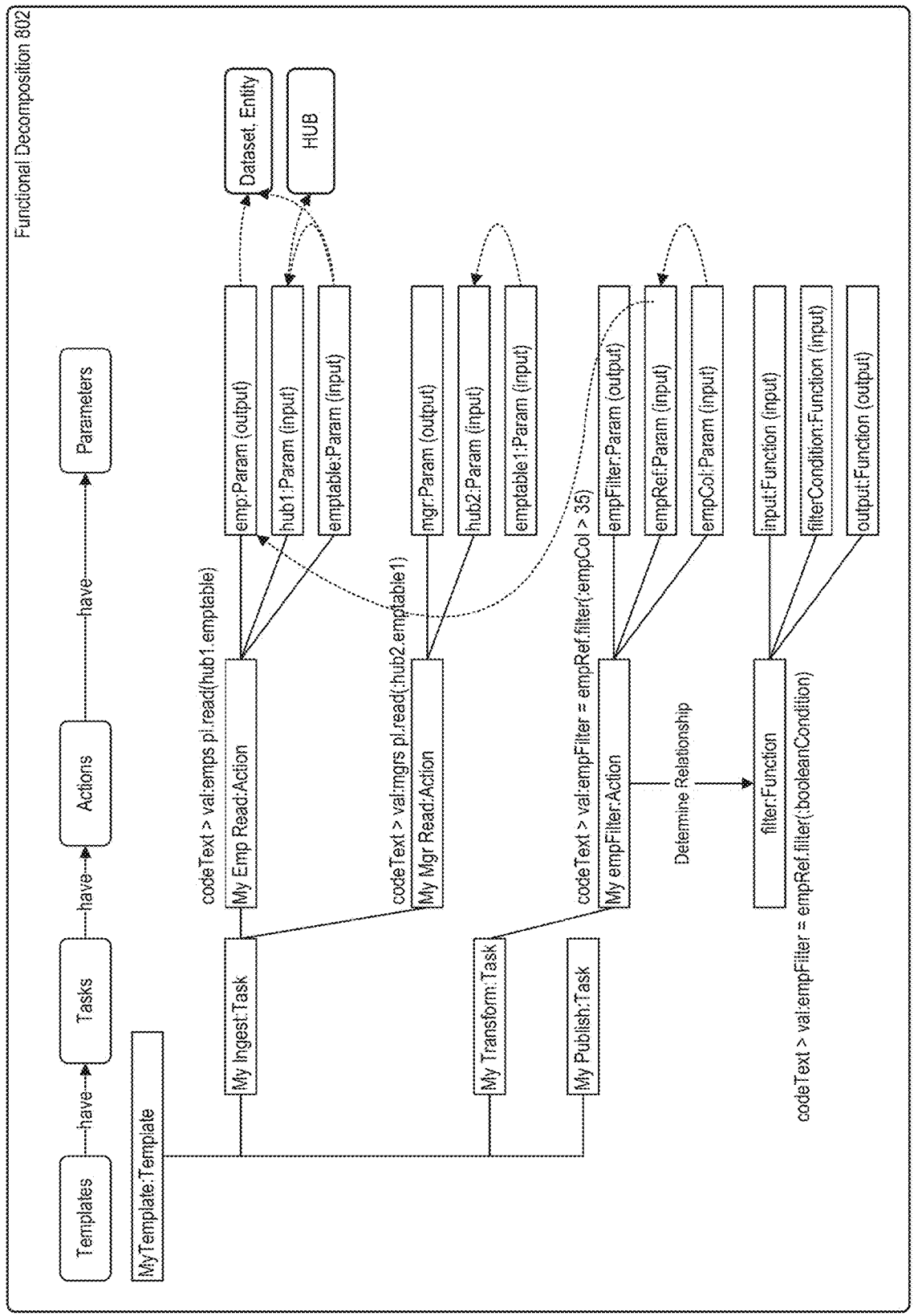
FIG. 41 illustrates an example of identifying a pattern of transformation in a data flow, for one or more functional expressions, in accordance with an embodiment.

FIG. 41 illustrates a means of identifying a pattern of transformation in a data flow, for one or more functional expressions generated for each of one or more applications, in accordance with an embodiment.

As described previously, in accordance with an embodiment, pipelines, e.g., Lambda applications, allow users to define complex data transformations based on semantic actions that correspond to operators in relational calculus. The data transformations are usually persisted as directed acyclic graphs or queries, or, in the case of DFML, as nested functions. Decomposing and serializing a dataflow application, e.g., pipeline, Lambda application, as a nested function enables pattern analysis of the data flow and induce a data flow model that can then be used to generate functional expressions abstracting complex transformations on datasets in similar contexts.

In accordance with an embodiment, the nested function decomposition is performed not only at the level of semantic actions (row or dataset operators), but also at the scalar transformations and predicate structures, which allows deep lineage capability of a complex data flow. The recommendations based on the induced models can be finely grained (for example, recommending a scalar transformation on a particular attribute or the use of one or more attributes in a predicate for filter or join).

In accordance with an embodiment, the elements of the functional decomposition generally include that:

An application represents a top level data flow transformation.

An action represents an operator on one or more datasets (dataframes to be specific).

Actions reference the base semantic action or function declaratively defined in the system. Actions can have one or more action parameters each of which can have specific role (in, out, in/out) and type, return one or more processed datasets, and can be embedded or nested several levels deep.

Action parameters are owned by actions and have specific functional or business types, and represent a specific upstream dataset to be processed. Binding parameters represent datasets or entities in a HUB that are used in the transformation. Value parameters represent intermediate or transient data structures that are processed in the context of the current transformation Scope resolvers allow the derivation of process lineage for a dataset or an element in the dataset used in the entire data flow.

Figure 42:
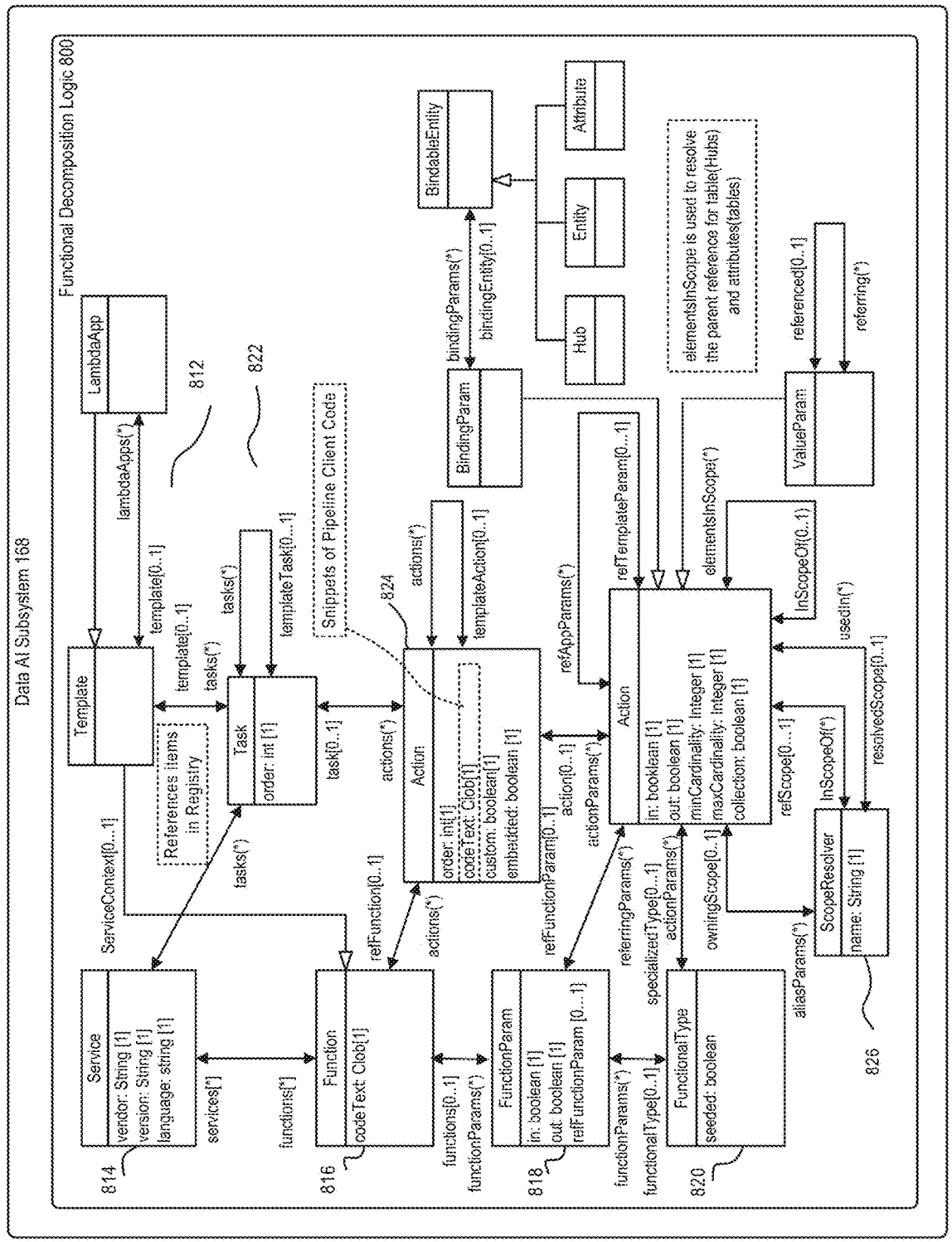
FIG. 42 illustrates an object diagram for use in identifying a pattern of transformation in a data flow, for one or more functional expressions generated for each of one or more applications, in accordance with an embodiment.

FIG. 42 illustrates an object diagram for use in identifying a pattern of transformation in a data flow, for one or more functional expressions generated for each of one or more applications, in accordance with an embodiment.

As illustrated in FIG. 42, in accordance with an embodiment, a functional decomposition logic can be used to decompose, or break down, the data flow for a dataflow application, e.g., pipeline, Lambda application, into a model describing transformations of data, predicates, and business rules applied to the data, and attributes used in the data flows into a selection of registries, including for example a pattern, or a template 812 (if a template is associated with the pipeline, Lambda application), a service 814, a function 816, function parameters 818, and function type 820.

In accordance with an embodiment, each of these functional component can be further decomposed into, for example, tasks, 822, or actions 824, reflecting the dataflow application, e.g., pipeline, Lambda application.

In accordance with an embodiment, a scope resolver 826 can be used to resolve the reference to a particular attribute or embedded object, through its scope. For example, as illustrated in FIG. 42, the scope resolver resolves the reference to an attribute or embedded object through its immediate scope. For example, a join function using the output of a filter and another table would have references to both as its scope resolver, and can be used in combination with an InScopeOf operation to resolve leaf node to its root node path.

Figure 43:
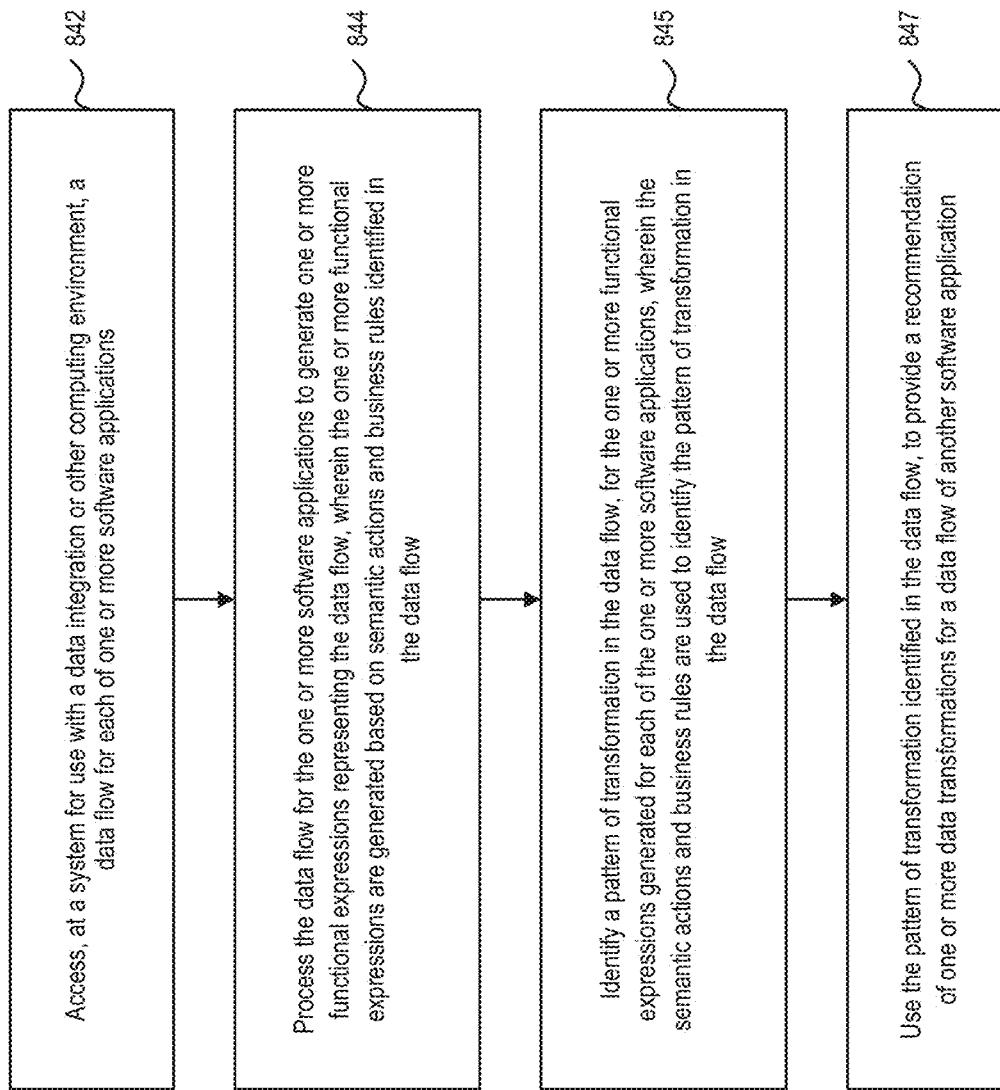
FIG. 43 illustrates a process of identifying a pattern of transformation in a data flow, for one or more functional expressions generated for each of one or more applications, in accordance with an embodiment.

FIG. 43 illustrates a process of identifying a pattern of transformation in a data flow, for one or more functional expressions generated for each of one or more applications, in accordance with an embodiment.

As illustrated in FIG. 43, in accordance with an embodiment, at step 842, a data flow is accessed for each of one or more software applications.

At step 844, the data flow for the one or more software applications is processed to generate one or more functional expressions representing the data flow, wherein the one or more functional expressions are generated based on semantic actions and business rules identified in the data flow.

At step 845, a pattern of transformation in the data flow is identified, for the one or more functional expressions generated for each of the one or more software applications, wherein the semantic actions and business rules are used to identify the pattern of transformation in the data flow.

At step 847, using the pattern of transformation identified in the data flow, a recommendation of one or more data transformations is provided for a data flow of another software application.

Ontology Learning

In accordance with an embodiment, the system can perform an ontology analysis of a schema definition, to determine the types of data and datasets or entities, associated with that schema; and generate, or update, a model from a reference schema that includes an ontology defined based on relationships between entities and their attributes. A reference HUB including one or more schemas can be used to analyze data flows, and further classify or make recommendations for, e.g., transformations enrichments, filtering, or cross-entity data fusion of an input data.

In accordance with an embodiment, the system can perform an ontology analysis of a schema definition to determine an ontology of types of data and entities in a reference schema. In other words, the system can generate a model from a schema that includes an ontology defined based on relationships between entities and their attributes. The reference schema can be a system-provided or default reference schema, or alternatively a user-supplied or third-party reference schema.

Although some data integration frameworks may reverse engineer metadata from known source system types, they do not provide an analysis of the metadata to build a functional type system that can be used for pattern definitions and entity classifications. Harvesting metadata is also limited in scope and does not extend to profiling data for the extracted datasets or entities. The functionality to allow the user to specify a reference schema for ontology learning from which to build functional type system for use in complex process (business logic) and integration patterns in addition to entity classification (in similar topological space) is currently unavailable.

In accordance with an embodiment, one or more schemas can be stored in a reference HUB, which itself can be provided within or as part of the system HUB. As with the reference schema, a reference HUB can also be a user-supplied or third-party reference HUB, or in a multitenant environment, can be associated with a particular tenant, and accessed for example through a dataflow API.

In accordance with an embodiment, the reference HUB can be used to analyze data flows and to further classify or make recommendations for, e.g., transformations, enrichments, filtering, or cross-entity data fusion.

For example, in accordance with an embodiment, the system can receive input defining a reference HUB as a schema for ontology analysis. The reference HUB can be imported to obtain entity definitions (attributes definitions, data types, and relationships between datasets or entities, constraints, or business rules). Sample data (e.g., attribute vectors such as, for example, columnar data) in the reference HUB can be extracted for all datasets or entities, and profiled data, to derive several metrics on the data.

In accordance with an embodiment, a type system can be instantiated based on the nomenclature of the reference schema. The system can perform an ontology analysis, to derive an ontology (e.g., a set of rules) that describe types of data. The ontology analysis can determine data rules that are defined in terms of profiled data (e.g., attribute, or composite value) metrics and describe the nature of a business type element (e.g., UOM, ROI, or Currency Type) along with their data profile; relationship rules that define associations across datasets or entities, and attribute vectors (constraints or references imported from the reference schema); and complex rules that can be derived through a combination of data and relationship rules. A type system can then be defined based on the rules derived through metadata harvesting and data sampling.

In accordance with an embodiment, patterns and templates can be utilized from a system HUB, based on the type system instantiated using the ontology analysis. The system can then perform data flow processing using the type system.

For example, in accordance with an embodiment, classification and type annotation of datasets or entities can be identified by the type system of the registered HUB. The type system can be used to define rules for functional and business types derived from the reference schema. Using the type system, actions, such as, for example, blending, enriching, and transformation recommendations, can be performed on the entities identified in data flows based on the type system.

Figure 44:
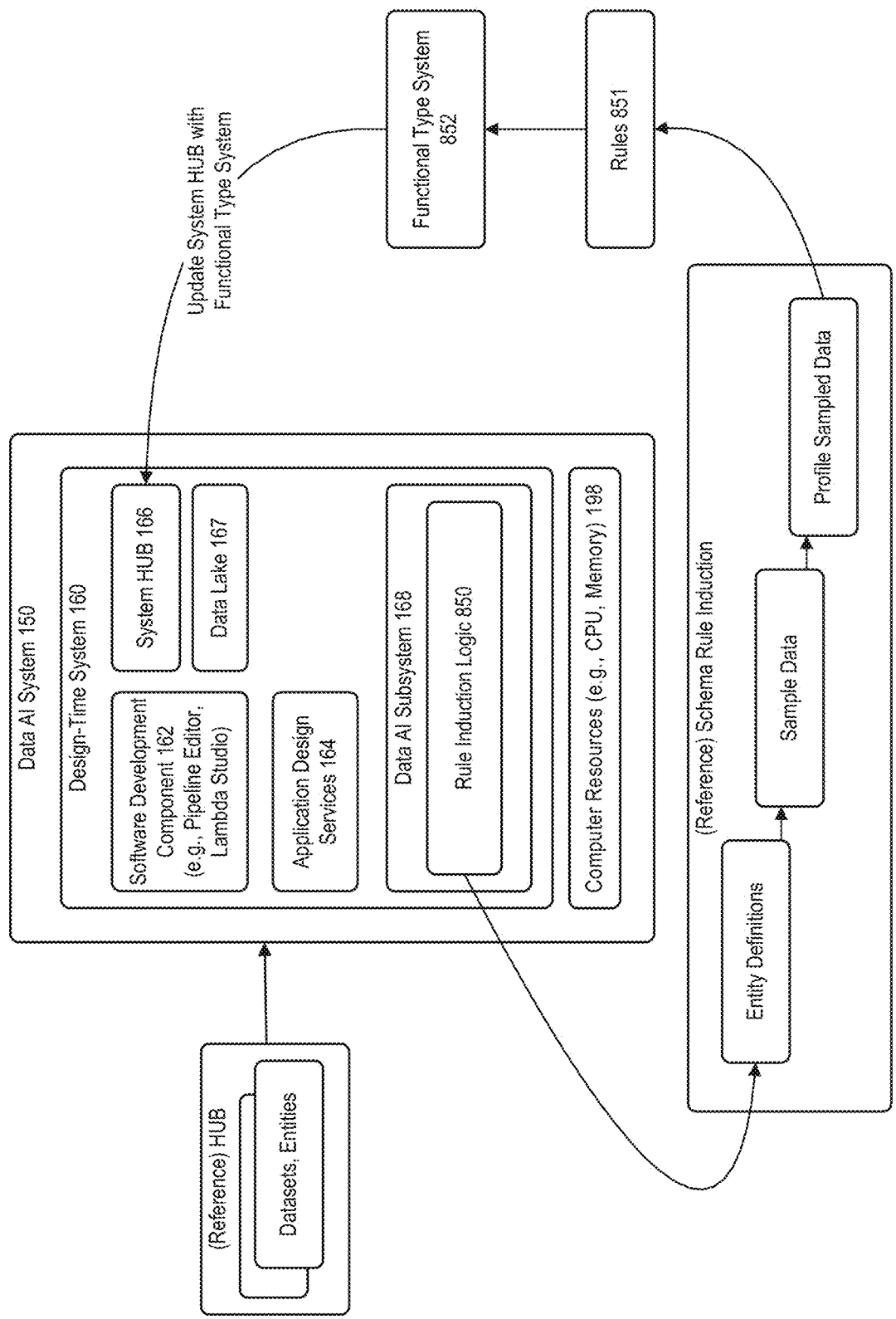
FIG. 44 illustrates a system for generating functional type rules, in accordance with an embodiment.

FIG. 44 illustrates a system for generating functional type rules, in accordance with an embodiment.

As illustrated in FIG. 44, in accordance with an embodiment, a rule induction logic 850 or software component, which can be provided as software or program code that is executable by a computer system or other processing device, enables rules 851 to be associated with a functional type system 852

FIG. 44 illustrates a system for generating functional type rules, in accordance with an embodiment.

Figure 45:
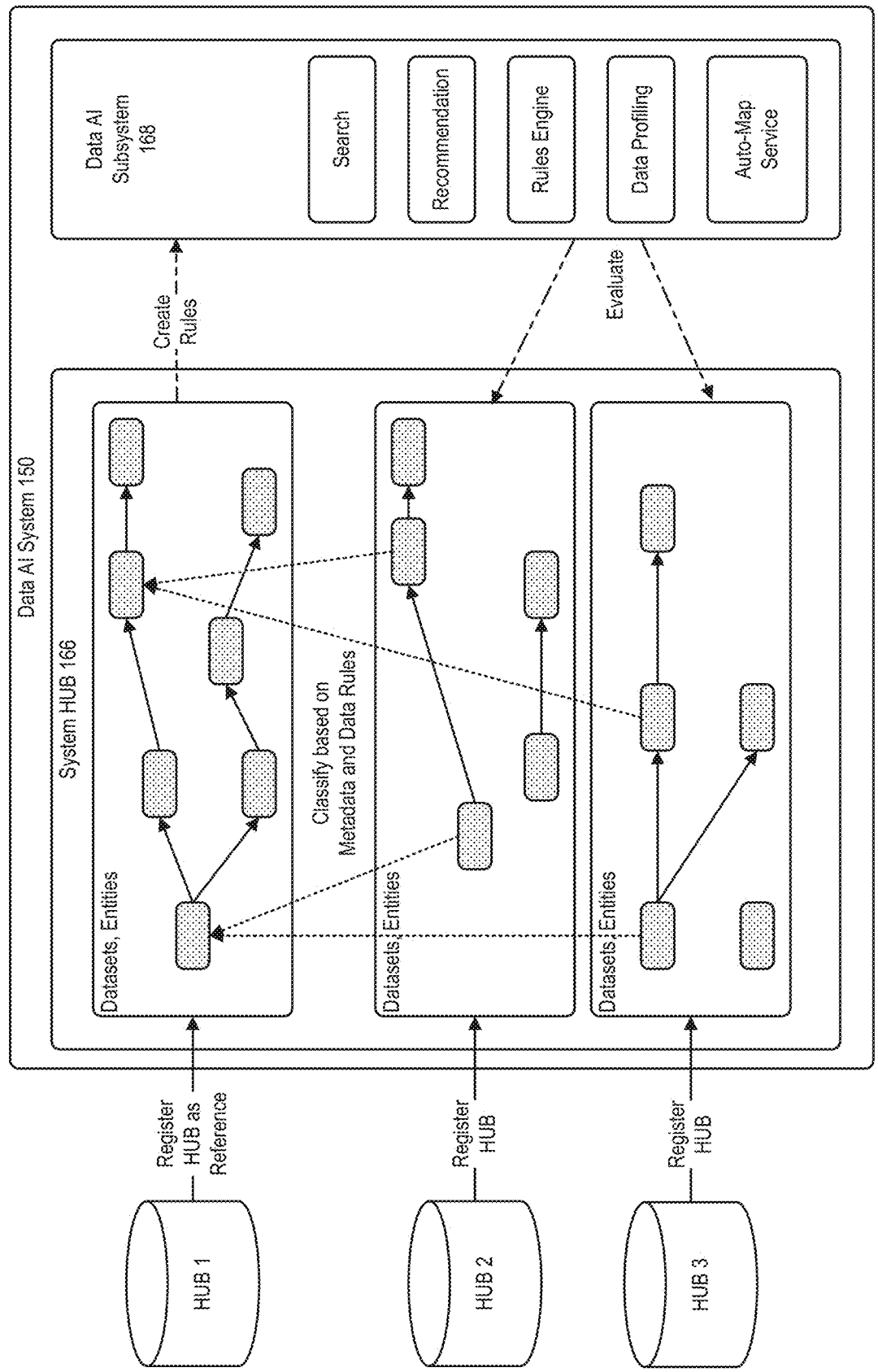
FIG. 45 further illustrates a system for generating functional type rules, in accordance with an embodiment.

As illustrated in FIG. 45, in accordance with an embodiment, a HUB 1 can act as a reference ontology, for use in type-tagging, comparing, classifying, or otherwise evaluating a metadata schema or ontology provided by other (e.g., newly-registered) HUBs, e.g., HUB 2 and HUB 3, and creating appropriate rules, for use by the Data AI system.

Figure 46:
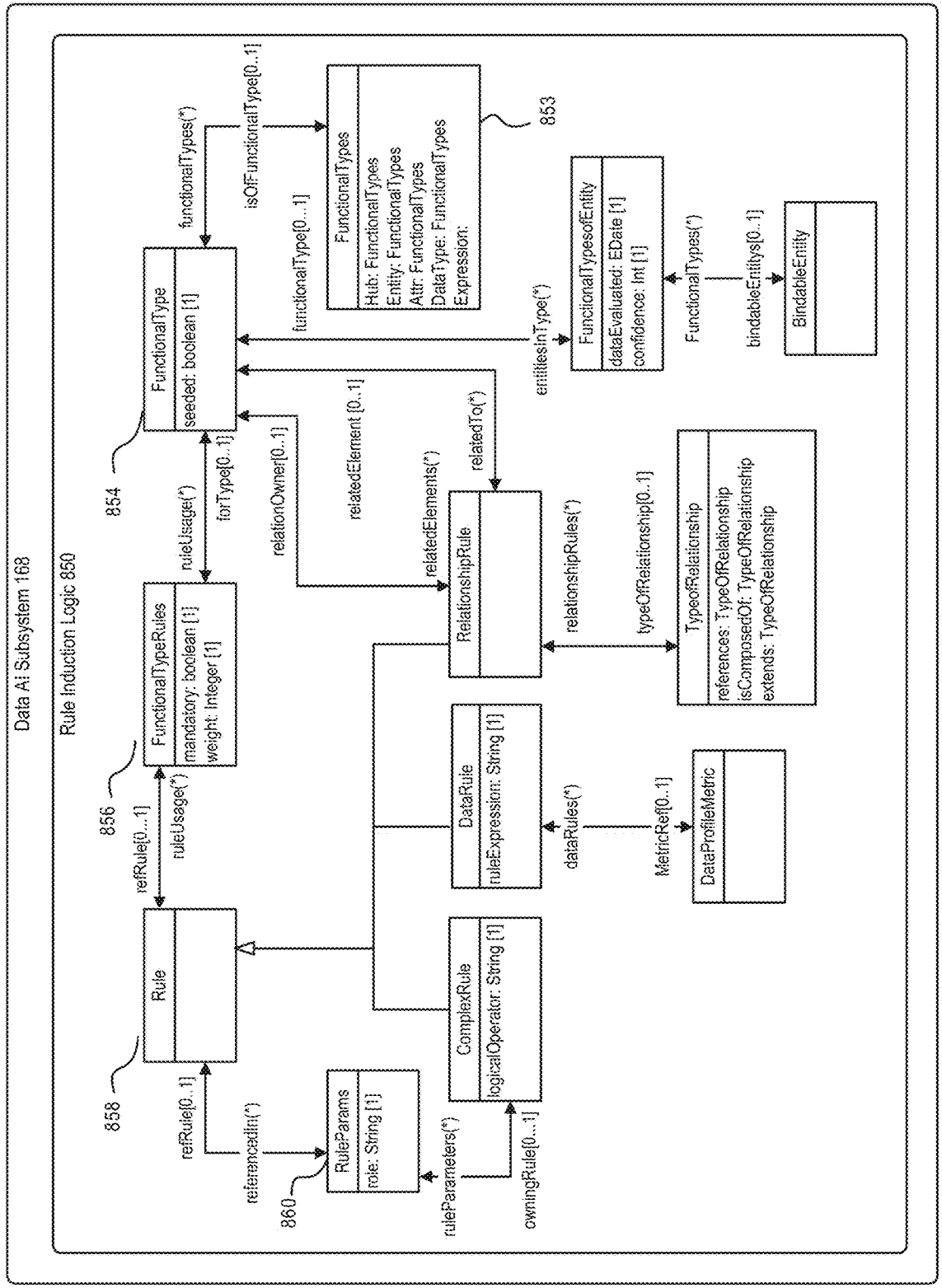
FIG. 46 illustrates an object diagram for use in generating functional type rules, in accordance with an embodiment.

FIG. 46 illustrates an object diagram for use in generating functional type rules, in accordance with an embodiment.

In accordance with an embodiment, as illustrated in FIG. 46, for example, the rule induction logic enables rules to be associated with a functional type system having a set of functional types 853 (for example, HUBs, datasets or entities, and attributes), and stored in registries for use in creating dataflow applications, e.g., pipelines, Lambda applications, including that each functional type 854 can be associated with functional type rules 856, and rules 858. Each rule can be associated with rule parameters 860.

In accordance with an embodiment, the first time a reference schema is processed, an ontology including a set of rules can be prepared that are appropriate to that schema.

In accordance with an embodiment, the next time a new HUB, or a new schema is evaluated, its datasets or entities can be compared with an existing ontology and prepared rules, and used in the analysis of the new HUB/schema and its entities, and the further learning of the system.

Although some metadata harvesting in data integration frameworks are limited to reverse engineering entity definitions (attributes and their data types and in some cases relationships); in accordance with an embodiment, the approach provided by the system described herein differs in allowing a schema definition to be used as reference ontology from which business and functional types can be derived, along with data profiling metrics for the datasets or entities, in the reference schema. This reference HUB can then be used to analyze business entities in other HUBs (data sources), to further classify or make recommendations (e.g., blending, or enriching).

In accordance with an embodiment, the system employs the following set of steps to ontology learning using a reference schema:

A user specifies the option to use a newly registered HUB as a reference schema.

Entity definitions (e.g., attributes definitions, data types, relationships between entities, constraints or business rules are imported).

A sample data is extracted for all datasets or entities, and data profiled to derive several metrics on the data.

A type system is instantiated (functional and business types), based on the nomenclature of the reference schema.

A set of rules that describe the business types are derived.

Data rules are defined in terms of profiled data metrics and describe the nature of a business type element (for example, UOM or ROI or Currency Type can be defined as a business type element along with their data profile).

Relationship rules are generated that define associations across elements (constraints or references imported from the reference schema).

Complex rules are generated that can be derived through a combination of data and relationship rules The type system (functional and business) is defined based on the rules derived through metadata harvesting and data sampling.

Patterns or templates can then use the types instantiated based on the reference schema to define complex business logic.

A HUB registered with the system can then be analyzed in the context of the reference schema.

Classification and type annotation of datasets or entities, in the newly registered HUB can be performed, based on the rules for functional and business types derived from the reference schema.

Blending, enriching, transformation recommendations can be performed on the datasets or entities, based on the type annotation.

Figure 47:
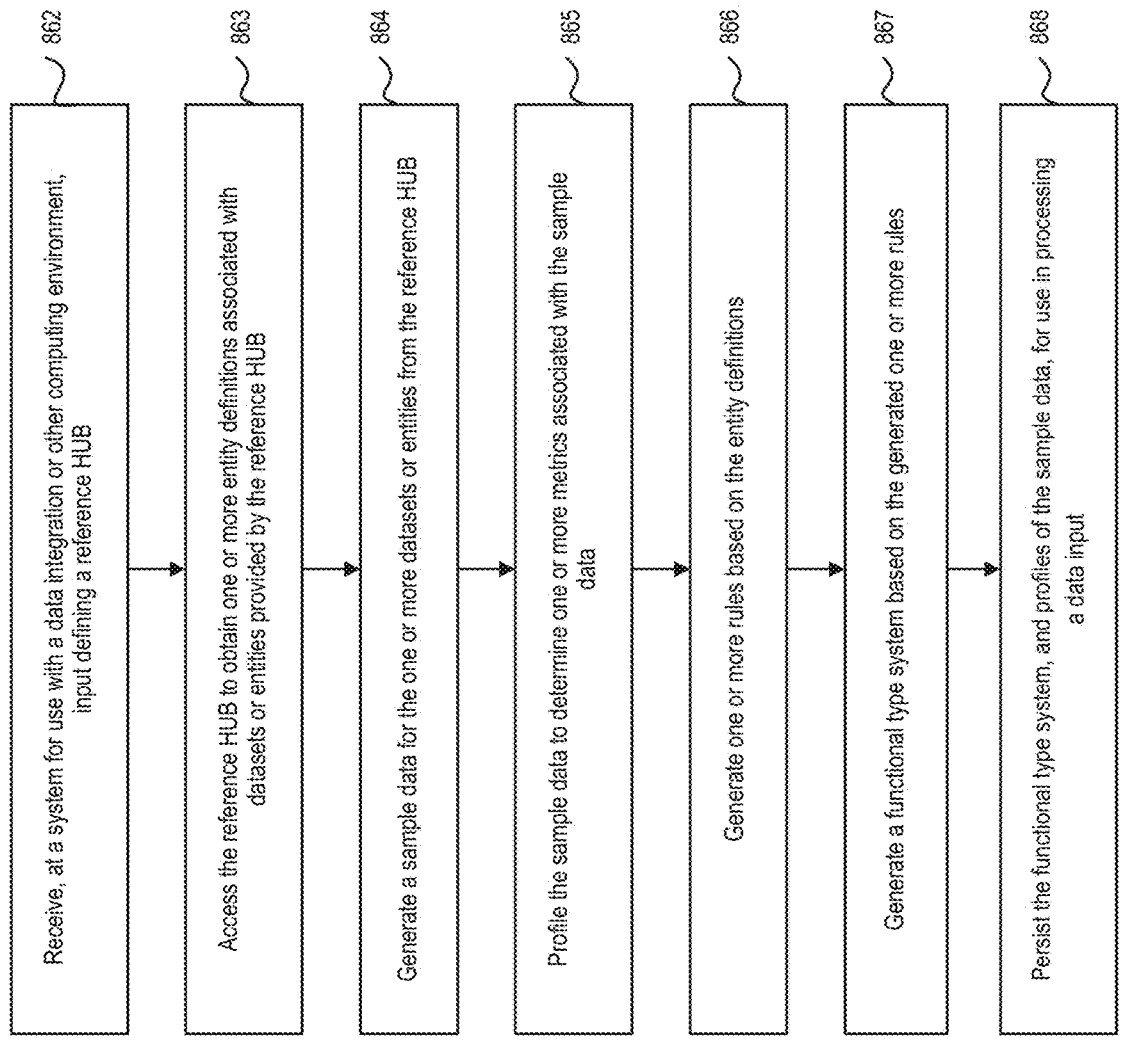
FIG. 47 illustrates a process for generating a functional type system based on generated one or more rules, in accordance with an embodiment.

FIG. 47 illustrates a process for generating a functional type system based on generated one or more rules, in accordance with an embodiment.

As illustrated in FIG. 47, in accordance with an embodiment, at step 862, input is receive defining a reference HUB.

At step 863, the reference HUB is accessed to obtain one or more entity definitions associated with datasets or entities, provided by the reference HUB.

At step 864, a sample data is generated for the one or more datasets or entities, from the reference HUB.

At step 865, the sample data is profiled to determine one or more metrics associated with the sample data.

At step 866, one or more rules are generated based on the entity definitions.

At step 867, a functional type system is generated based on the generated one or more rules.

At step 868, the functional type system, and profiles of the sample data, are persisted for use in processing a data input.

Foreign Function Interface

In accordance with an embodiment, the system provides a programmatic interface (referred to herein in some embodiments as a foreign function interface), by which a user or third-party can define a service, functional and business types, semantic actions, and patterns or predefined complex data flows based on functional and business types, in a declarative manner, to extend the functionality of the system.

As described previously, current data integration systems may provide limited interfaces with no support for types and no well-defined interfaces for object composition and pattern definition. Because of such shortcomings, complex functionality like cross service recommendations or unified application design platform to invoke semantic actions across services extending the framework is currently not available.

In accordance with an embodiment, the foreign function interface enables a user to provide definitions or other information (e.g., from a customer other third-party) in a declarative manner, to extend the functionality of the system.

In accordance with an embodiment, the system is metadata-driven, such that definitions received through the foreign function interface can be processed to determine a metadata, determine a classification of the metadata, such as, for example, data types (e.g., functional and business types), and compare the data types (both functional and business) to existing metadata to determine whether there is a type match.

In accordance with an embodiment, the metadata received through the foreign function interface can be stored in a system HUB to be accessed by the system for processing a data flow. For example, the metadata can be accessed to determine semantic actions based on a type of data sets received as an input. The system can determine semantic actions permitted for the types of data provided through the interface.

In accordance with an embodiment, by providing a common declarative interface, the system can enable users to map service native types and actions to platform native types and actions. This allows a unified application design experience through type and pattern discovery. It also facilitates a purely declarative data flow definition and design involving components of various services extending the platform and generation of native code for the respective semantic actions.

In accordance with an embodiment, metadata received through the foreign function interface can be processed in an automated fashion so that the objects or artifacts described therein (e.g., data types or semantic actions) can be used in operation of data flows processed by the system. The metadata information received from the one or more third-party systems may also be used to define a service, indicate one or more functional and business types, indicate one or more semantic actions, or indicate one or more patterns/templates.

For example, in accordance with an embodiment, a classification of the accessed data can be determined, such as functional and business types of the data. The classification can be identified based on the information about the data received with the information. By receiving data from one or more third party systems, the functionality of the system can be extended to perform data integration on a data flow based on the information (e.g., a service, a semantic action, or a pattern) received from the third party.

In accordance with an embodiment, metadata in a system HUB can be updated to include the information identified about the data. For example, services and patterns/templates can be updated to be performed based on information (e.g., a semantic action) identified in the metadata received through the foreign function interface. Thus, the system can be augmented with functionality through the foreign function interface without interrupting processing of a data flow.

In accordance with an embodiment, subsequent data flows can be processed using the metadata in the system HUB after it is updated. Metadata analysis can be performed on a data flow of a dataflow application, e.g., pipeline, Lambda application. The system HUB can then be used to determine a recommendation of a transformation, taking into account the definitions provided via foreign function interface. The transformation can be determined based on a pattern/template, which is used to define semantic actions to perform for services, wherein the semantic actions can similarly take into account the definitions provided via foreign function interface.

Figure 48:
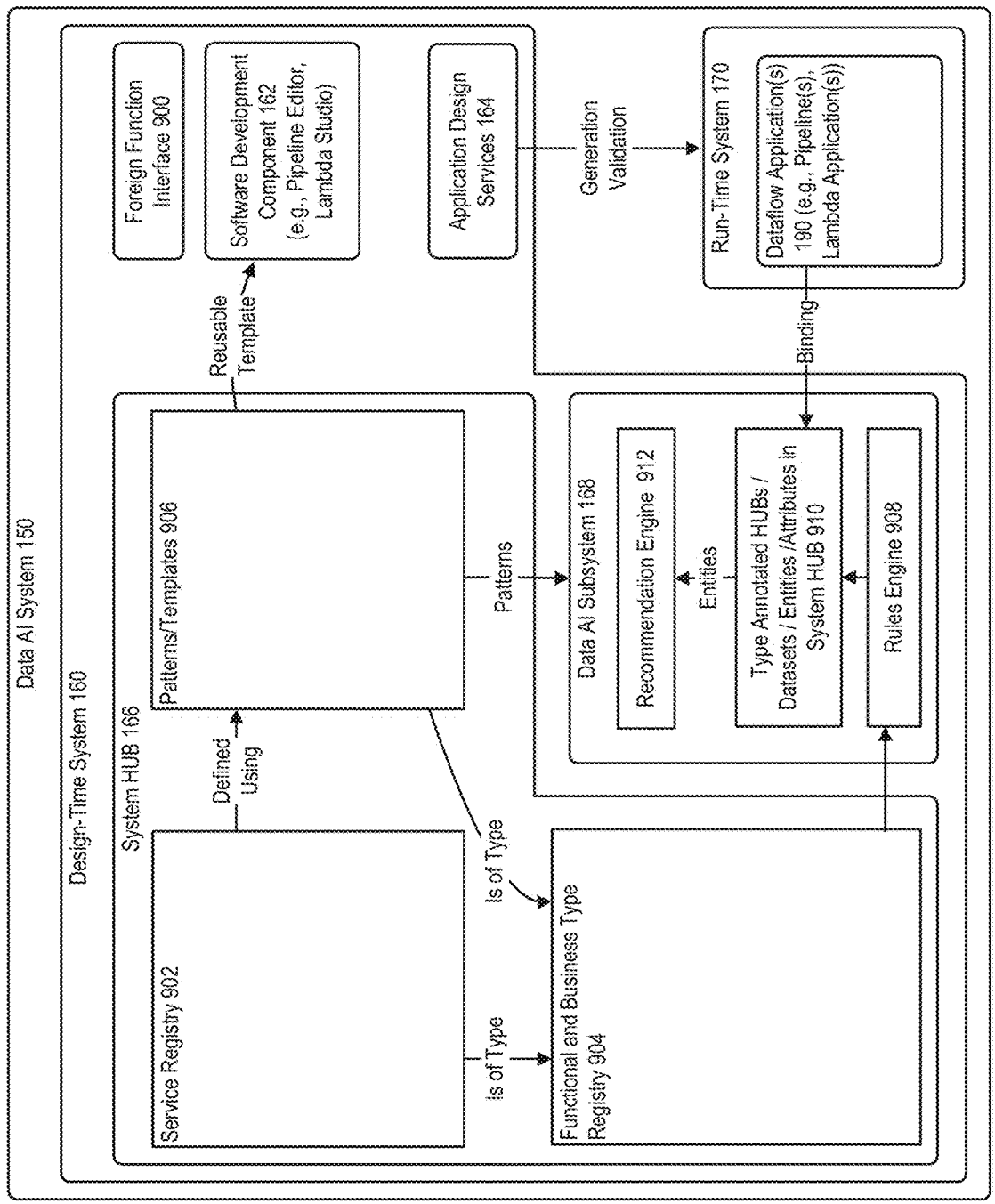
FIG. 48 illustrates a system for identifying a pattern for use in providing a recommendation for a data flow, based on information provided via a foreign function interface, in accordance with an embodiment.

FIG. 48 illustrates a system for identifying a pattern for use in providing a recommendation for a data flow, based on information provided via a foreign function interface, in accordance with an embodiment.

As illustrated in FIG. 48, in accordance with an embodiment, definitions received via foreign function interface 900 can be used to update one or more of a service registry 902, functional and business type registry 904, or patterns/templates 906, within the system HUB.

In accordance with an embodiment, the updated information can be used by the data AI subsystem, including a rules engine 908, to determine, for example, type annotated HUBs, datasets or entities, or attributes 910 in the system HUB, and provide those datasets or entities, to a recommendation engine 912, for use in providing recommendations for a dataflow application, e.g., pipeline, Lambda application, via software development component (e.g., Lambda Studio).

Figure 49:
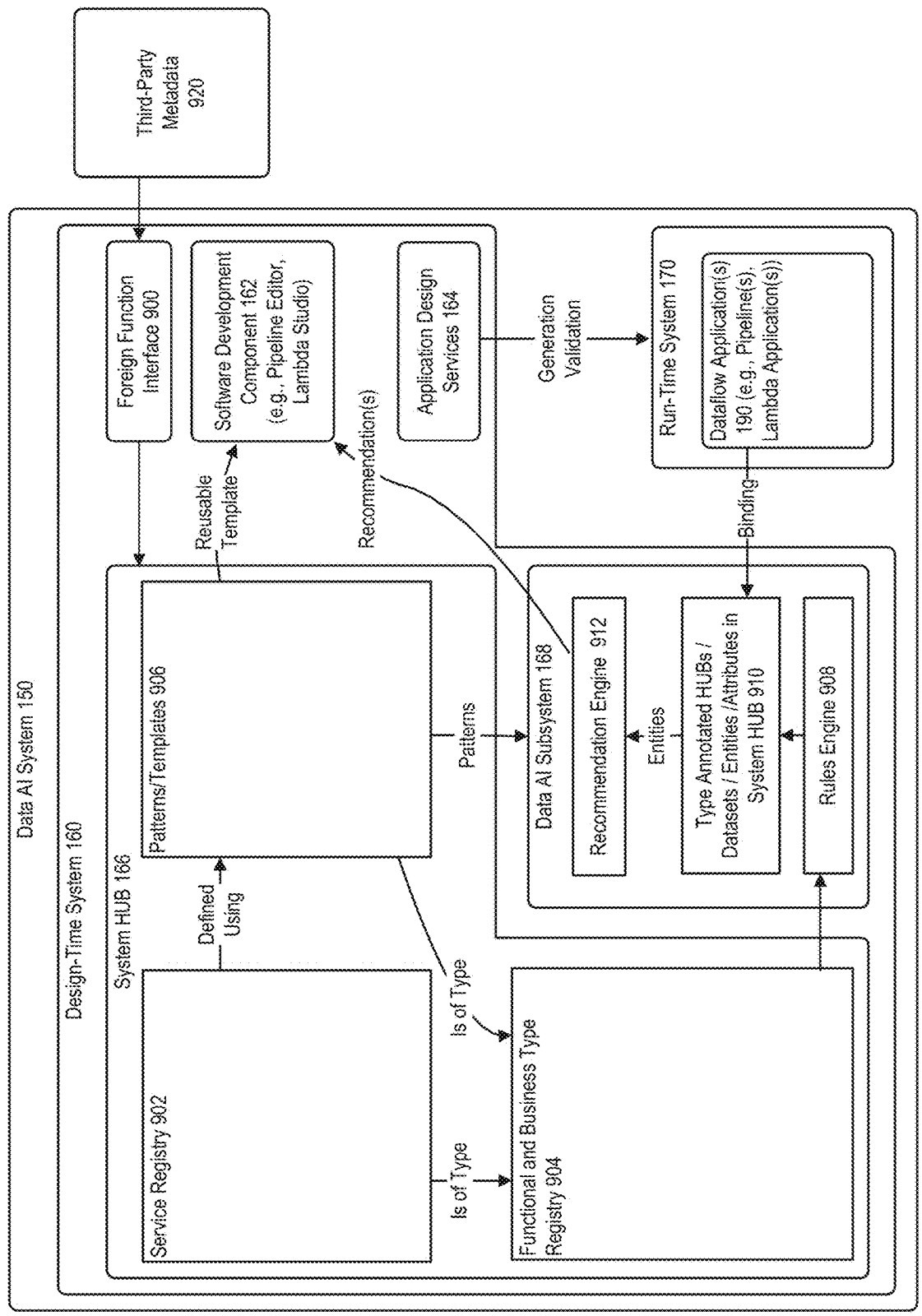
FIG. 49 further illustrates identifying a pattern for use in providing a recommendation for a data flow, based on information provided via a foreign function interface, in accordance with an embodiment.

FIG. 49 further illustrates identifying a pattern for use in providing a recommendation for a data flow, based on information provided via a foreign function interface, in accordance with an embodiment.

As illustrated in FIG. 49, in accordance with an embodiment, a third-party metadata 920 can be received at the foreign function interface.

Figure 50:
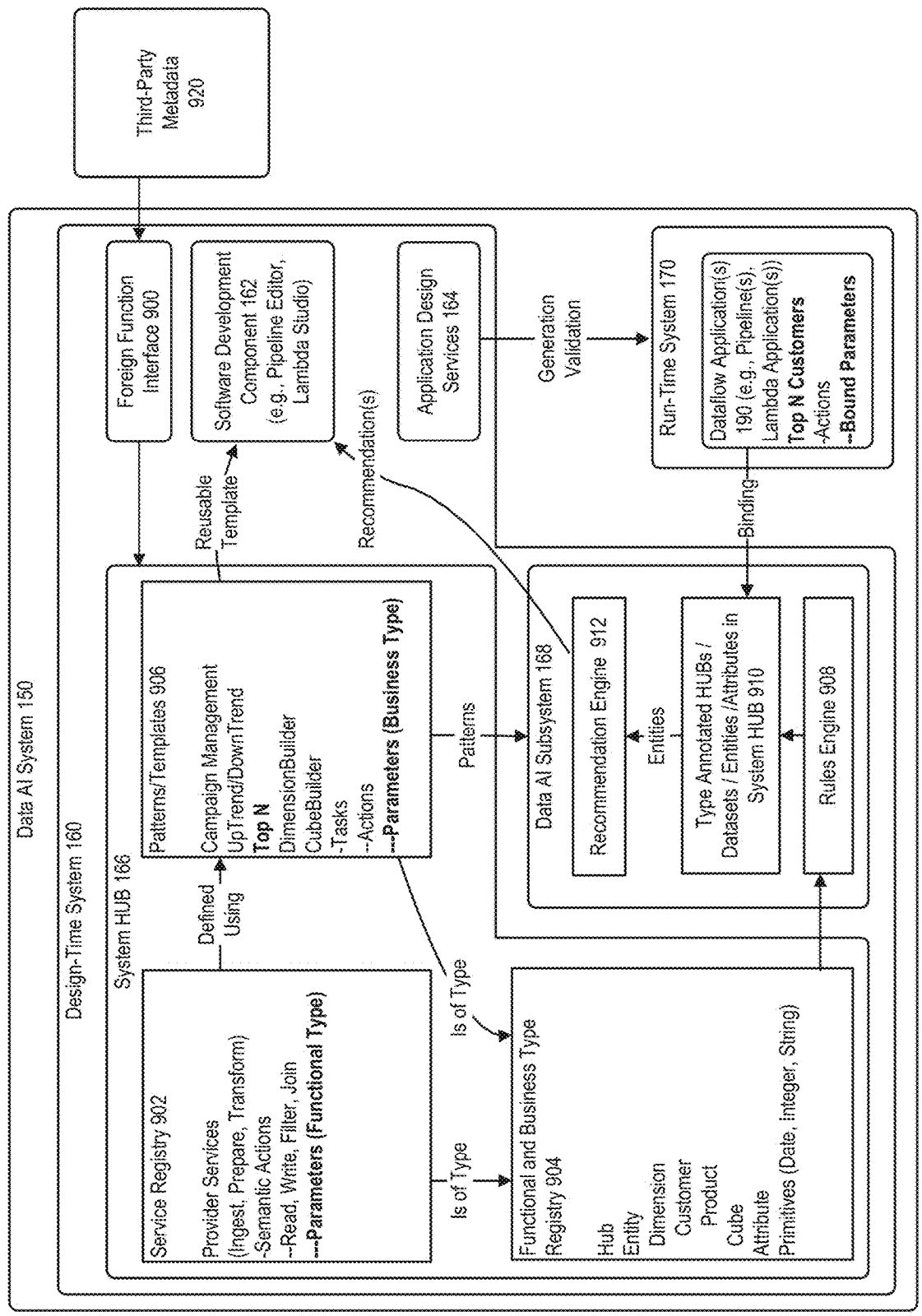
FIG. 50 further illustrates identifying a pattern for use in providing a recommendation for a data flow, based on information provided via a foreign function interface, in accordance with an embodiment.

FIG. 50 further illustrates identifying a pattern for use in providing a recommendation for a data flow, based on information provided via a foreign function interface, in accordance with an embodiment.

As illustrated in FIG. 50, in accordance with an embodiment, the third-party metadata received at the foreign function interface can be used to extend the functionality of the system.

In accordance with an embodiment, the system enables allows framework extensibility through well-defined interfaces that allow registration of services, types native to the services, semantic actions implemented by the services along with their typed parameters, patterns or templates that abstract predefined algorithms available as part of the service among other things.

In accordance with an embodiment, by providing a common declarative programming paradigm, the pluggable service architecture allows the mapping of service native types and actions to platform native types and actions. This allows a unified application design experience through type and pattern discovery. It also facilitates a purely declarative data flow definition and design involving components of various services extending the platform and generation of native code for the respective semantic actions.

In accordance with an embodiment, the pluggable service architecture also defines a common interface for compilation, generation, deployment and runtime execution framework (Unified Application Design Service) for the plugins. The recommendation engine can machine learn and reason over semantic actions and patterns of all plugged in services and can make cross service semantic action recommendations for a distributed complex data flow design and development.

Figure 51:
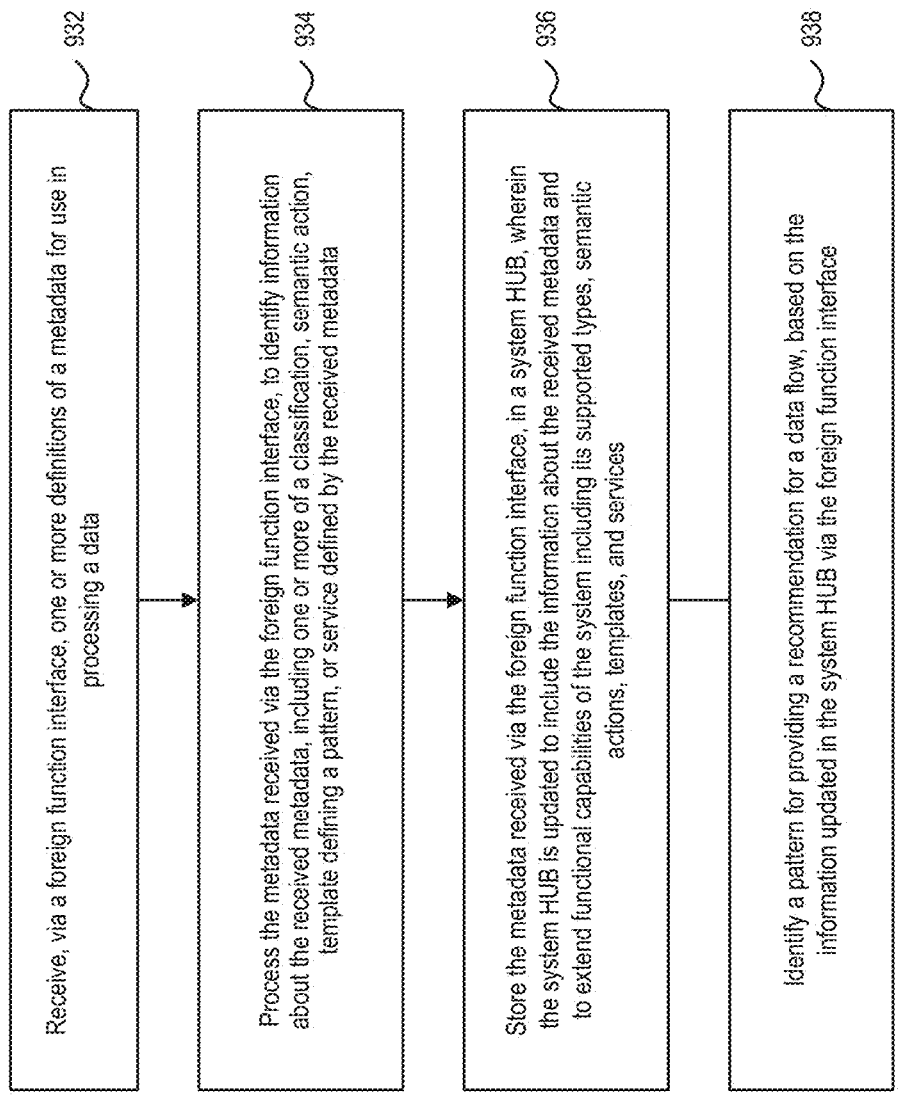
FIG. 51 illustrates a process for identifying a pattern for use in providing a recommendation for a data flow, based on information provided via a foreign function interface, in accordance with an embodiment.

FIG. 51 illustrates a process for identifying a pattern for use in providing a recommendation for a data flow, based on information provided via a foreign function interface, in accordance with an embodiment.

As illustrated in FIG. 51, in accordance with an embodiment, at step 932, one or more definitions of a metadata for use in processing a data are receive, via a foreign function interface.

At step 934, the metadata received via foreign function interface is processed, to identify information about the received metadata, including one or more of a classification, semantic action, template defining a pattern, or service defined by the received metadata.

At step 936, the metadata received via foreign function interface is stored in a system HUB, wherein the system HUB is updated to include the information about the received metadata and to extend functional capabilities of the system including its supported types, semantic actions, templates, and services.

At step 938, a pattern for providing a recommendation for a data flow is identified, based on the information updated in the system HUB via foreign function interface.

Policy Based Lifecycle Management

In accordance with an embodiment, the system can provide data governance functionality such as, for example, provenance (where a particular data came from), lineage (how the data was acquired/processed), security (who was responsible for the data), classification (what is the data about), impact (how impactful is the data to a business), retention (how long should the data live), and validity (whether the data should be excluded/included for analysis/processing), for each slice of data pertinent to a particular snapshot in time; which can then be used in making lifecycle decisions and data flow recommendations.

Current approaches to managing data lifecycle does not involve tracking data evolution (changes in data profile or drift) or governance related functionality based on changes in data characteristics across temporal partitions. System observed or derived characteristics of data (classification, frequency of change, type of change, or use in processes) are not used to make lifecycle decisions or recommendations (retention, security, validity, acquisition intervals) on the data.

In accordance with an embodiment, the system can provide a graphical user interface that can indicate a lifecycle of data flow based on lineage tracking. The lifecycle can show where the data has been processed and if any errors have occurred during its processing; and can be shown as a timeline view of data (e.g., number of datasets, volume of datasets, and use of datasets). The interface can provide a point in time snapshot of data and can provide visual indicators for data as it is processed. As such, the interface can enable a complete audit of data, or a system snapshot of data based on the lifecycle (e.g., performance metrics, or resource usage).

In accordance with an embodiment, the system can determine a lifecycle of data based on sample data (periodically sampled from ingested data) and data acquired for processing by user defined applications. Some aspects of the data lifecycle management is similar across the category of ingested data namely streaming data and batch data (reference and incremental). For incremental data, the system can use scheduled, log collection, and event-driven methods to acquire temporal slices of data and manage allocation of slices across application instances covering the following functionality.

In accordance with an embodiment, the system can reconstruct data in case of loss using lineage across tiers from metadata managed in a system HUB.

For example, in accordance with an embodiment, incremental data attribute columns or user configured settings can be identified to acquire incremental data and maintaining high and low watermarks across ingesting data. Query or API and corresponding parameters (timestamp or Id columns) can be associated with data that is ingested.

In accordance with an embodiment, the system can maintain lineage information across tiers, such as, for example, query or log metadata in the edge layer, topic/partition offsets for each ingest in the scalable I/O layer, slices (file partitions) in the data lake, reference to process lineage (specific execution instance of the application producing the data and parameters associated with it) for subsequent downstream processed dataset using this data, topic/partition offset for the dataset "marked" to be published to a target endpoint and its corresponding data slice in the data lake, and publish job execution instance and the offsets in the partitions that is processed and published to the target endpoint.

In accordance with an embodiment, in the case of failure of a layer (e.g., edge, scalable I/O, data lake, or publish), data can be reconstructed from the upstream layer or acquired from the source.

In accordance with an embodiment, the system can perform other lifecycle management functions.

For example, in accordance with an embodiment, security is enforced and audited at each of these layers for data slices. Data slices can be excluded or included (if already excluded) from being processed or accessed. This allows excluding spurious or corrupt data slices from being processed. A retention policy can be enforced on slices of data through sliding windows. An impact is analyzed for slices of data (for example, the ability to tag slices for a given window, as being impactful in the context of a data mart built for quarterly reporting).

In accordance with an embodiment, data is classified by tagging the functional or business types defined in the system (for example, tagging a dataset with a functional type (as a cube or dimensional or hierarchical data) along with the business type(s) (e.g., orders, customers, product, or time).

In accordance with an embodiment, the system can perform a method that includes accessing data from one or more HUBs. The data can be sampled, and the system determine temporal slices of the data and managing the slices, including accessing a system HUB of the system, to obtain metadata about the sampled data. The sampled data can be managed for lineage tracking across one or more tiers in the system.

In accordance with an embodiment, incremental data and parameters about the sample data can be managed for the data that is ingested. The data can be classified by tagging a type of data associated with the sample data.

Figure 52:
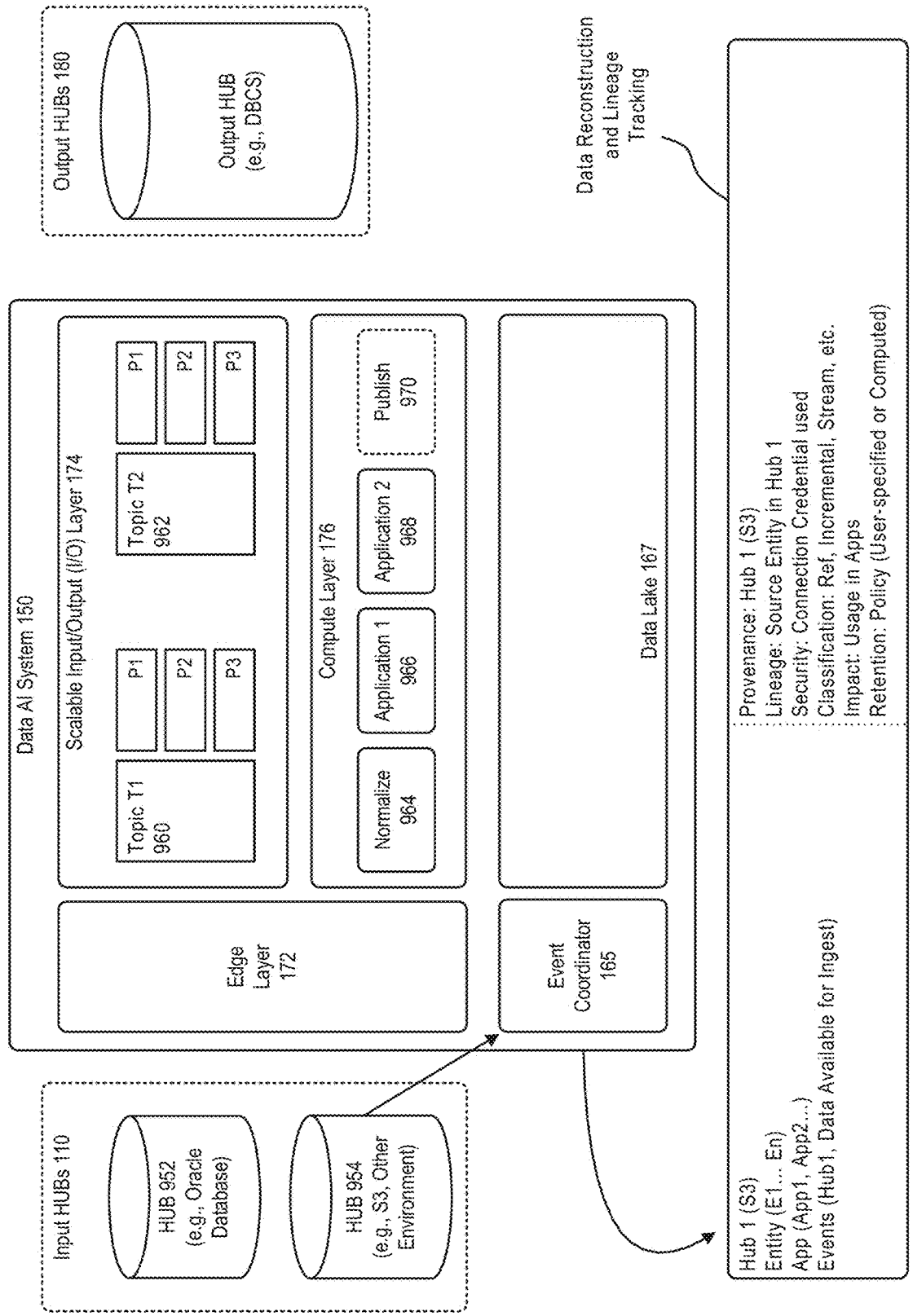
FIG. 52 illustrates managing a sampled data or accessed data, for lineage tracking across one or more tiers, in accordance with an embodiment.

FIG. 52 illustrates managing a sampled data or accessed data, for lineage tracking across one or more tiers, in accordance with an embodiment.

For example, as illustrated in FIG. 52, in accordance with an embodiment, the system can be used to receive a data from a HUB 952, in this example, an Oracle database, and a HUB 954, in this example an S3 or other environment. Data received from input HUBs, at the edge layer, is provided to the scalable I/O layer, as one or more topics, for use by dataflow applications, e.g., pipelines, Lambda applications (wherein each of the topics can be provided as distributed partitions).

In accordance with an embodiment, the ingested data, typically represented by an offset into a partition, can be normalized 964, by the compute layer, and written to the data lake as one or more temporal slices which span the tiers of the system.

In accordance with an embodiment, the data can then be used by downstream dataflow applications, e.g., pipelines, Lambda applications 966, 968, and ultimately published 970, to one or more additional topics 960, 962, and thereafter to a target endpoint (e.g., a table), at one or more output HUBs, such as in this example, a DBCS environment.

As illustrated in FIG. 52, in accordance with an embodiment, at a first time, the data reconstruction and lineage tracking information can include information such as, for example, the provenance (Hub 1, S3), lineage (Source Entity in Hub 1), security (Connection Credential used), or other information regarding the ingest of data.

Figure 53:
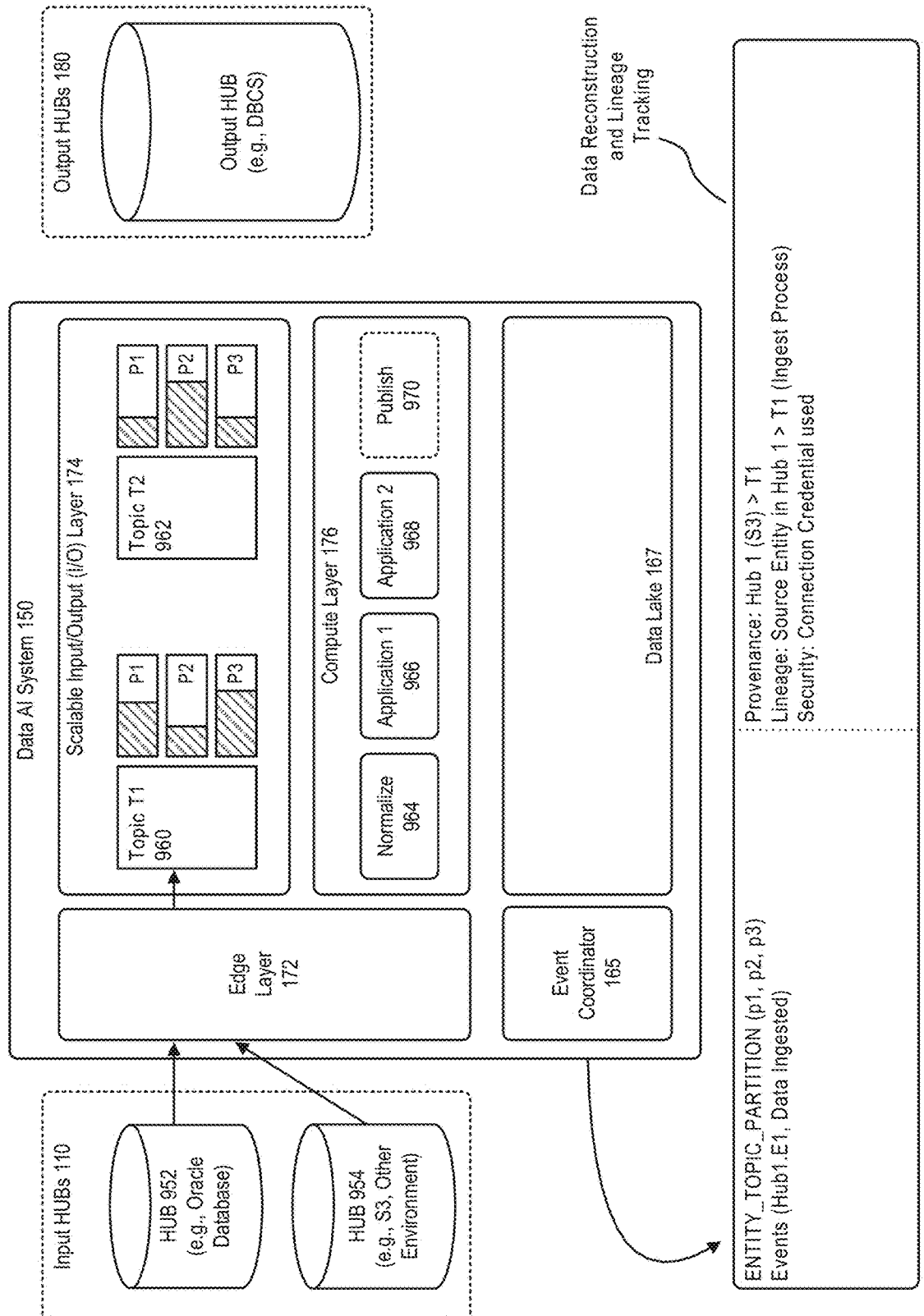
FIG. 53 further illustrates managing a sampled data or accessed data, for lineage tracking across one or more tiers, in accordance with an embodiment.

FIG. 53 further illustrates managing a sampled data or accessed data, for lineage tracking across one or more tiers, in accordance with an embodiment. As illustrated in FIG. 53, at a subsequent time the data reconstruction and lineage tracking information can be updated to include information such as, for example, an updated provenance (→T1), lineage (→T1 (Ingest Process)), or other information.

Figure 54:
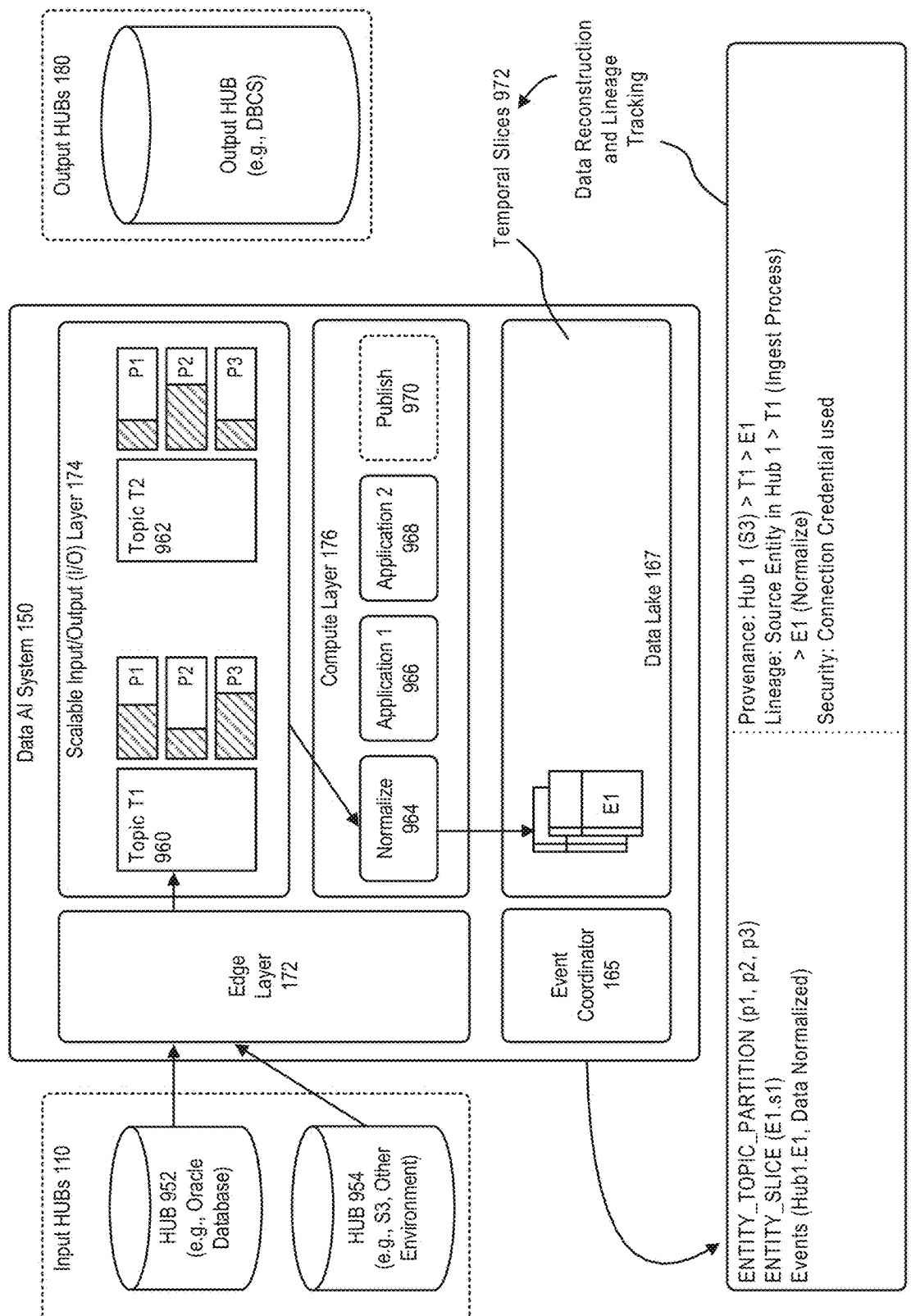
FIG. 54 further illustrates managing a sampled data or accessed data, for lineage tracking across one or more tiers, in accordance with an embodiment.

FIG. 54 further illustrates managing a sampled data or accessed data, for lineage tracking across one or more tiers, in accordance with an embodiment. As illustrated in FIG. 54, at a subsequent time the data reconstruction and lineage tracking information can be further updated to include information such as, for example, an updated provenance (→E1), lineage (→E1 (Normalize)), or other information.

In accordance with an embodiment, temporal slices 972, for use by one or more dataflow applications, e.g., pipelines, Lambda applications, can be created, spanning the tiers of the system. In the event of a failure, for example a failure in writing to the data lake, the system can determine one or more unprocessed slices of data, and complete the processing of that slice of data, either in its totality, or incrementally.

Figure 55:
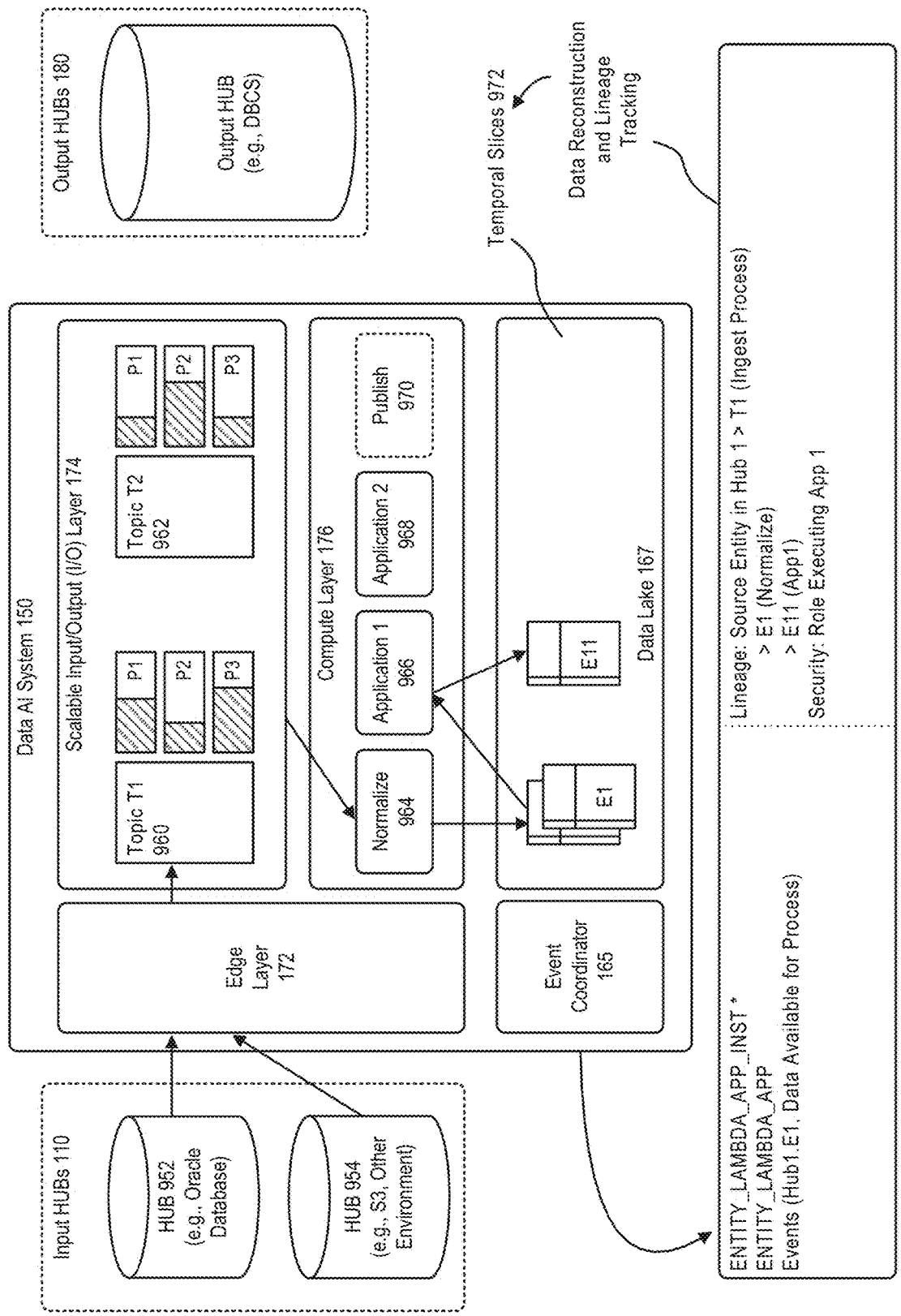
FIG. 55 further illustrates managing a sampled data or accessed data, for lineage tracking across one or more tiers, in accordance with an embodiment.

FIG. 55 further illustrates managing a sampled data or accessed data, for lineage tracking across one or more tiers, in accordance with an embodiment. As illustrated in FIG. 55, at a subsequent time the data reconstruction and lineage tracking information can be further updated, and additional temporal slices created, to include information such as, for example, an updated lineage (→E11 (App1)), security (Role Executing App 1), or other information.

Figure 56:
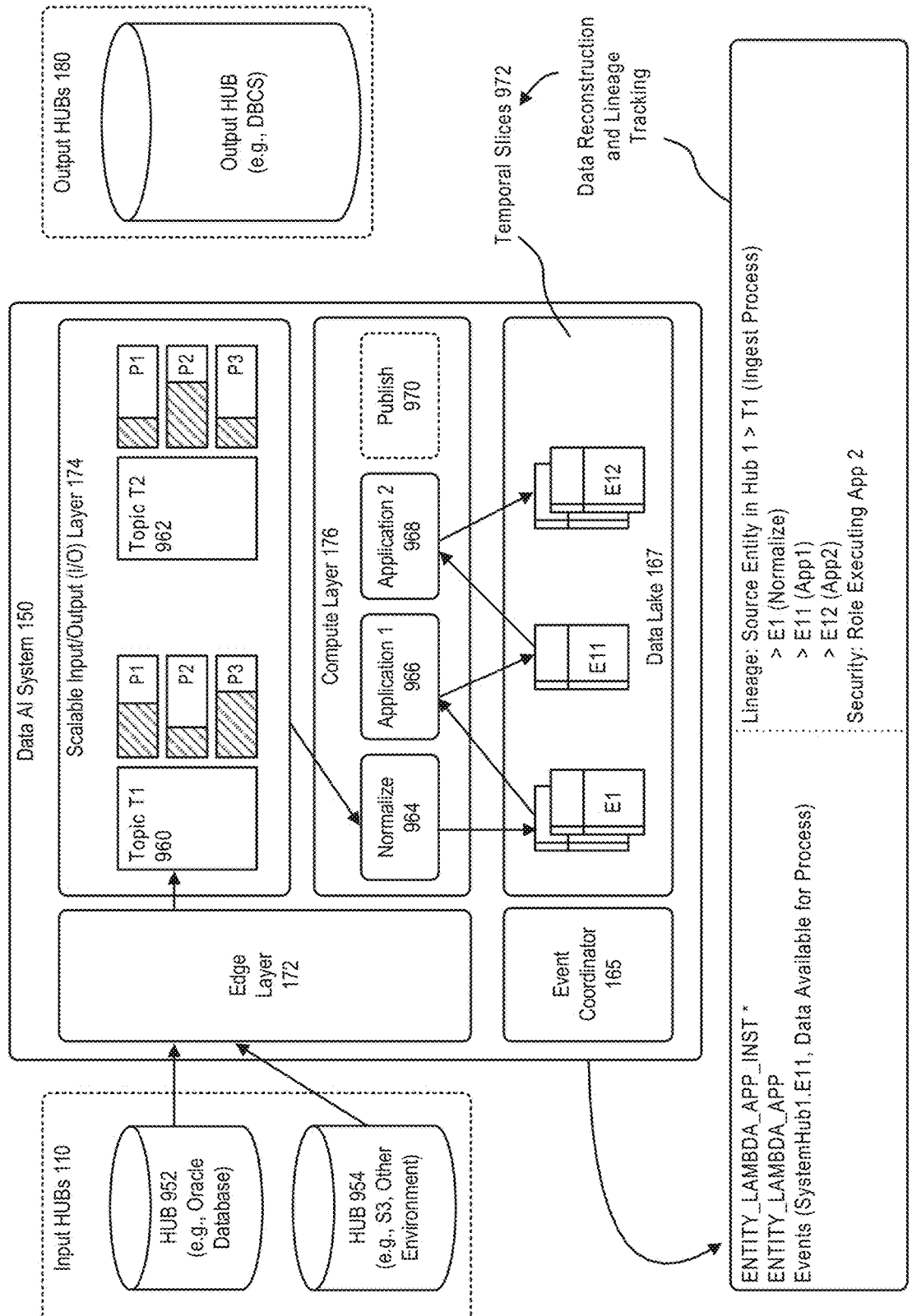
FIG. 56 further illustrates managing a sampled data or accessed data, for lineage tracking across one or more tiers, in accordance with an embodiment.

FIG. 56 further illustrates managing a sampled data or accessed data, for lineage tracking across one or more tiers, in accordance with an embodiment. As illustrated in FIG. 56, at a subsequent time the data reconstruction and lineage tracking information can be further updated, and additional temporal slices created, to include information such as, for example, an updated lineage (→E12 (App2)), security (Role Executing App 2), or other information.

Figure 57:
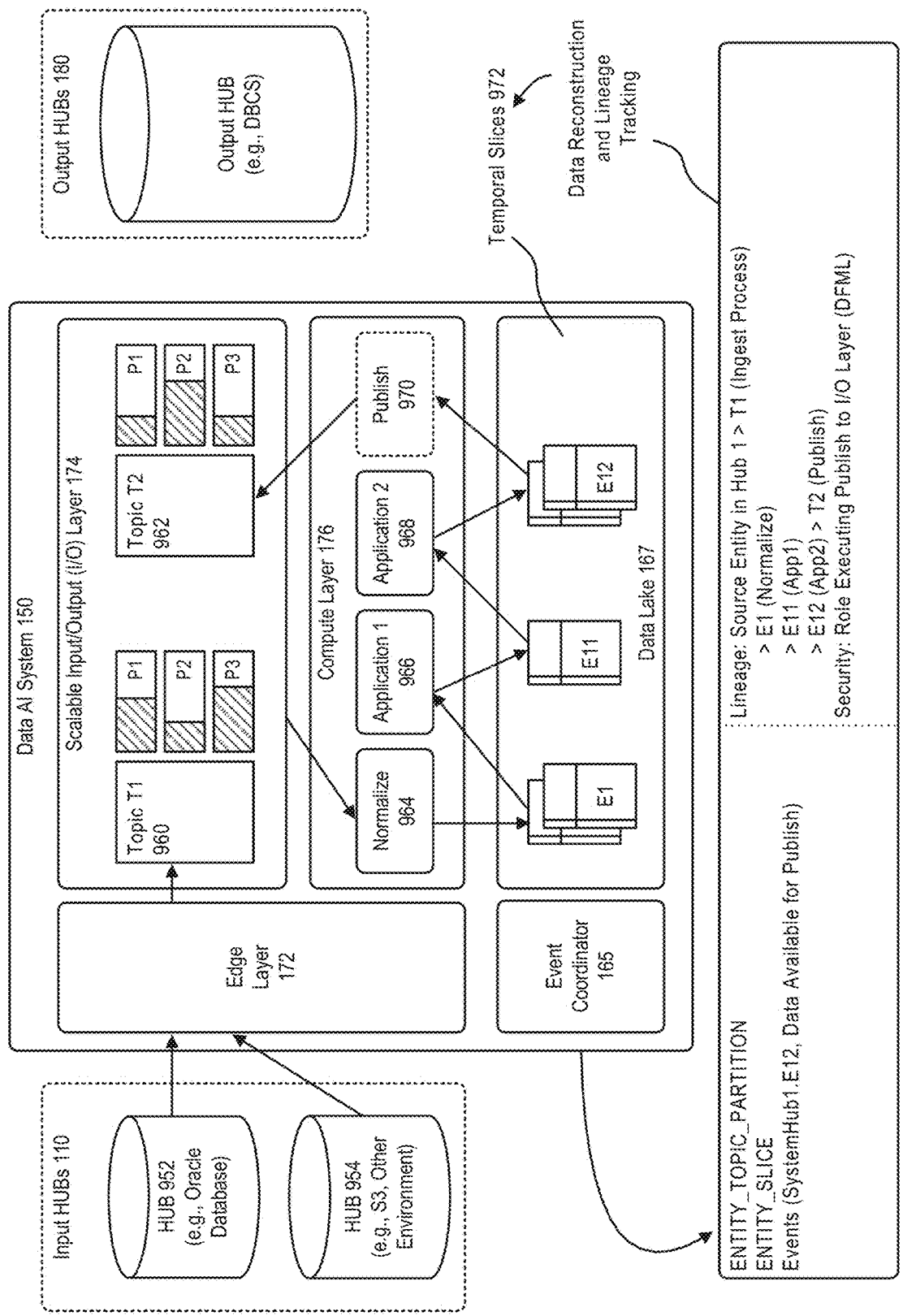
FIG. 57 further illustrates managing a sampled data or accessed data, for lineage tracking across one or more tiers, in accordance with an embodiment.

FIG. 57 further illustrates managing a sampled data or accessed data, for lineage tracking across one or more tiers, in accordance with an embodiment. As illustrated in FIG. 57, at a subsequent time the data reconstruction and lineage tracking information can be further updated, and additional temporal slices created, to include information such as, for example, an updated lineage (→T2 (Publish)), security (Role Executing Publish to I/O Layer), or other information.

Figure 58:
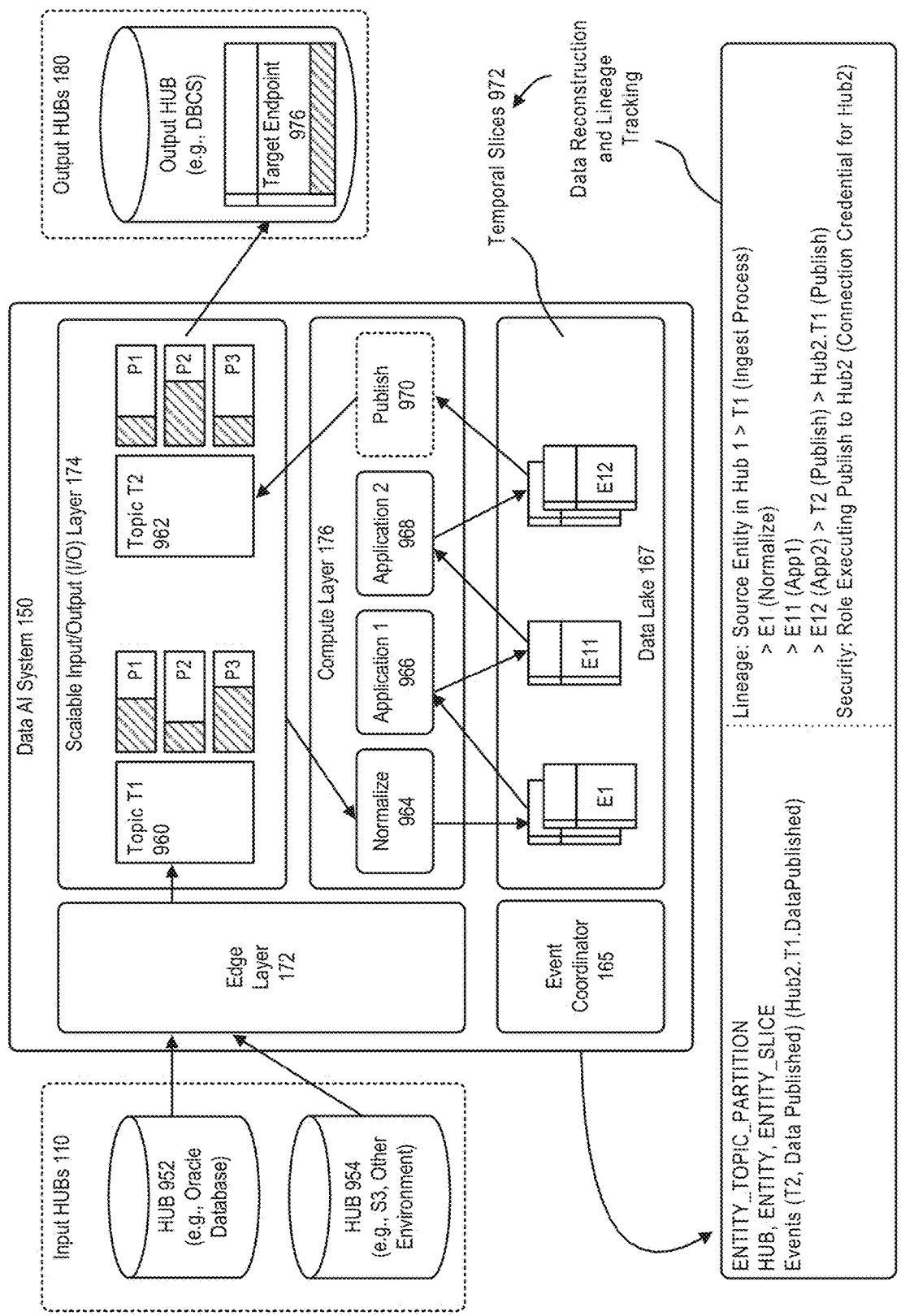
FIG. 58 further illustrates managing a sampled data or accessed data, for lineage tracking across one or more tiers, in accordance with an embodiment.

FIG. 58 further illustrates managing a sampled data or accessed data, for lineage tracking across one or more tiers, in accordance with an embodiment. As illustrated in FIG. 58, at a subsequent time the data reconstruction and lineage tracking information can be further updated, to reflect the output of the data to a target endpoint 976.

Data Lifecycle Management

In accordance with an embodiment, data lifecycle management based on the lineage tracking described above addresses several functional areas some of which can be configured by the user (access control, retention, validity), some derived (provenance, lineage) and others using machine learning algorithms (classification, impact). For example, the data management applies to both sample data (periodically sampled from ingested data) and data acquired for processing by user defined applications. Some aspects of the data lifecycle management is similar across the category of ingested data namely streaming data and batch data (reference and incremental). For incremental data, DFML uses scheduled, log collection, and event-driven methods to acquire temporal slices of data and manage allocation of slices across application instances covering the following functionality:

Reconstruction of data in case of loss using lineage across tiers from metadata managed in the system HUB.

Identifying of incremental data attribute columns or user configured settings to acquire incremental data and maintaining high and low watermarks across ingest.

Associating of query or API and corresponding parameters (timestamp or Id columns) for each ingest Maintaining a lineage information across tiers. Query or Log metadata in the edge layer. Topic/Partition offsets for each ingest in the scalable I/O layer. Slices (file partitions) in the data lake. Reference to process lineage (specific execution instance of the application producing the data and parameters associated with it) for all subsequent downstream processed dataset using this data. Topic/Partition offset for the dataset "marked" to be published to a target endpoint and its corresponding data slice in the data lake. Publish job execution instance and the offsets in the partitions that is processed and published to the target endpoint.

In the case of failure of a layer, data can be reconstructed from the upstream layer or acquired from the source. Security is enforced and audited at each of these layers for data slices. Data slices can be excluded or included (if already excluded) from being processed or accessed. This allows excluding spurious or corrupt data slices from being processed. Retention policy can be enforced on slices of data through sliding windows. Impact is analyzed for slices of data (for example, the ability to tag slices for a given window, as being impactful in the context of a data mart built for quarterly reporting).

Classification of the data by tagging the functional or business types defined in the system (for example, tagging a dataset with a functional type (as a cube or dimensional or hierarchical data) along with the business type(s) (e.g., orders, customers, product, or time).

Figure 59:
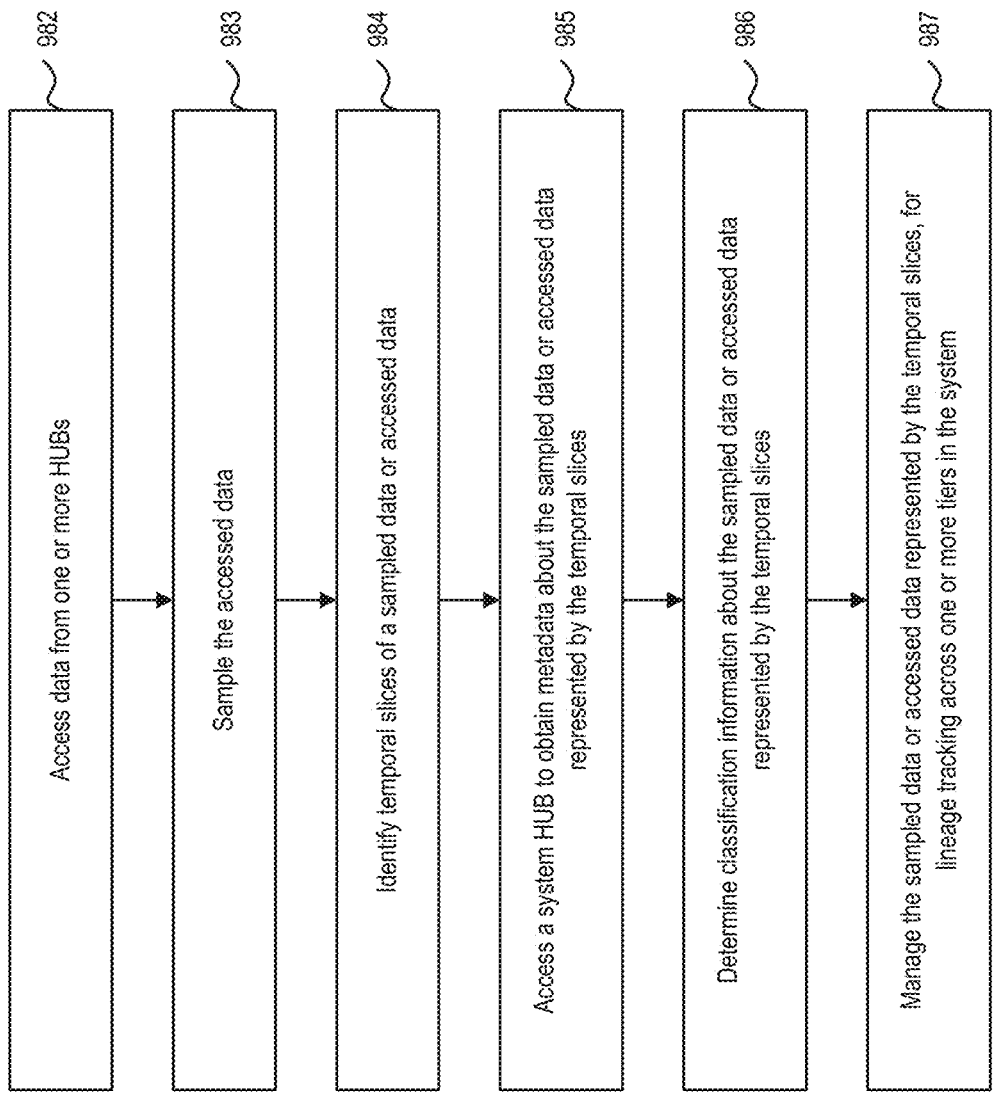
FIG. 59 illustrates a process for managing a sampled data or accessed data, for lineage tracking across one or more tiers, in accordance with an embodiment.

FIG. 59 illustrates a process for managing a sampled data or accessed data, for lineage tracking across one or more tiers, in accordance with an embodiment.

As illustrated in FIG. 59, in accordance with an embodiment, at step 982, data is accessed from one or more HUBs.

At step 983, the accessed data is sampled.

At step 984, temporal slices are identified for sampled data or accessed data.

At step 985, a system HUB is accessed to obtain metadata about the sampled data or accessed data represented by the temporal slices.

At step 986, classification information is determined about the sampled data or accessed data represented by the temporal slices.

At step 987, the sampled data or accessed data represented by the temporal slices is managed, for lineage tracking across one or more tiers in the system.

Embodiments of the present invention can be implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory computer readable storage medium (media) having instructions stored thereon/in which can be used to program a computer to perform any of the processes of the present invention. Examples of storage mediums can include, but are not limited to, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or other types of storage media or devices suitable for non-transitory storage of instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

For example while several of the embodiments described above illustrate the use of products such as, for example, Wolfram, Yago, Chronos, and Spark, to perform various computations, and data sources such as, for example, BDP, SFDC and S3, to act as sources or targets of data, the embodiments described herein can also be used with other types of products and data sources that provide similar types of functionalities.

Additionally, while several of the embodiments described above illustrate components, layers, objects, logic, or other or features of the various embodiments, such features can be provided as software or program code that is executable by a computer system or other processing device.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for use with a data integration or other computing environment, comprising:
providing, at a computer including a processor, a design-time environment that provides design of software applications and includes a software development component,
wherein the design-time environment communicates with a run-time environment that executes the software applications, via an event coordinator that operates between the design-time and run-time environments and coordinates events associated with the design of the software applications,
wherein the run-time environment receives data from one or more input hubs,
wherein the software development component provides a graphical user interface for creation of data flows associated with the software applications, including a specification of the input hubs that operate as data sources and output hubs that operate as data targets, and
wherein each input hub and output hub comprises one or more datasets having attributes, semantics, and relationships with other datasets;
providing a knowledge source that stores metadata associated with processing the data flows associated with the input hubs and the output hubs;
processing an accessed data at a particular input hub, to perform a metadata analysis of the accessed data;
identifying by the design-time environment one or more samples of the accessed data;
applying a machine learning process to determine a category of data within the accessed data; and
generating, by reference to the knowledge source, a profile of the accessed data, based on the determined category of data, for use in auto-mapping the accessed data and displaying within the user interface one or more mappings for a data flow associated with the particular input hub and a particular output hub.

2. The method of claim 1, wherein the profile is generated for use in transformation of the accessed data into a data warehouse.

3. The method of claim 1, further comprising displaying the profile in a graphical user interface, for use in creating a dataflow application.

4. The method of claim 3, wherein recommendations are filtered and sorted and passed to the graphical user interface.

5. The method of claim 1, wherein a list of selected ones of semantic actions enabled for the accessed data are determined, during the processing of the accessed data.

6. The method of claim 1, wherein one or more logistic regression or other models are calculated to represent an overall confidence of how a candidate dataset or entity is similar to an input dataset or entity.

7. The method of claim 1, wherein the method is performed in a cloud or cloud-based computing environment.

8. The method of claim 1, wherein the run-time environment receives the data from the one or more input hubs via an edge layer that collects and forwards the data to a scalable I/O layer and a compute layer that processes the data for output; and wherein the event coordinator operates to receive published notifications of data from the particular input hub, normalize received data, and provide normalized data to subscribers.

9. A system for auto-mapping of complex data structures, datasets or entities, for use with a data integration or other computing environment, comprising:

one or more processors operable to:

providing a design-time environment that provides design of software applications and includes a software development component, wherein the design-time environment communicates with a run-time environment that executes the software applications, via an event coordinator that operates between the design-time and run-time environments and coordinates events associated with the design of the software applications, wherein the run-time environment receives data from one or more input hubs;

provide, by the software development component, a graphical user interface for creation of data flows associated with software applications, including a specification of input hubs that operate as data sources and output hubs that operate as data targets, wherein each input hub and output hub comprises one or more datasets having attributes, semantics, and relationships with other datasets;

provide a knowledge source that stores metadata associated with processing the data flows associated with the input hubs and the output hubs;

process an accessed data at a particular input hub, to perform a metadata analysis of the accessed data;

identify by the design-time environment one or more samples of the accessed data;

apply a machine learning process to determine a category of data within the accessed data; and generate, by reference to the knowledge source, a profile of the accessed data, based on the determined category of data, for use in auto-mapping the accessed data and displaying within the user interface one or more mappings for a data flow associated with the particular input hub and a particular output hub.

10. The system of claim 9, wherein the profile is generated for use in transformation of the accessed data into a data warehouse.

11. The system of claim 9, further comprising a graphical user interface, for use in creating a dataflow application.

12. The system of claim 9, wherein a list of selected ones of semantic actions enabled for the accessed data are determined, during the processing of the accessed data.

13. The system of claim 9, wherein one or more logistic regression or other models are calculated to represent an overall confidence of how a candidate dataset or entity is similar to an input dataset or entity.

14. The system of claim 9, wherein the system is provided in a cloud or cloud-based computing environment.

15. The system of claim 9, wherein the run-time environment receives the data from the one or more input hubs via an edge layer that collects and forwards the data to a scalable I/O layer and a compute layer that processes the data for output; and wherein the event coordinator operates to receive published notifications of data from the particular input hub, normalize received data, and provide normalized data to subscribers.

16. A non-transitory computer readable storage medium, including instructions stored thereon which when read and executed by one or more computers cause the one or more computers to perform a method comprising:

providing, at a computer including a processor, a design-time environment that provides design of software applications and includes a software development component, wherein the design-time environment communicates with a run-time environment that executes the software applications, via an event coordinator that operates between the design-time and run-time environments and coordinates events associated with the design of the software applications, wherein the run-time environment receives data from one or more input hubs, wherein the software development component provides a graphical user interface for creation of data flows associated with the software applications, including a specification of the input hubs that operate as data sources and output hubs that operate as data targets, and wherein each input hub and output hub comprises one or more datasets having attributes, semantics, and relationships with other datasets;

providing a knowledge source that stores metadata associated with processing the data flows associated with the input hubs and the output hubs;

processing an accessed data at a particular input hub, to perform a metadata analysis of the accessed data;

identifying by the design-time environment one or more samples of the accessed data;

applying a machine learning process to determine a category of data within the accessed data; and generating, by reference to the knowledge source, a profile of the accessed data, based on the determined category of data, for use in auto-mapping the accessed data and displaying within the user interface one or more mappings for a data flow associated with the particular input hub and a particular output hub.

17. The non-transitory computer readable storage medium of claim 16, wherein the profile is generated for use in transformation of the accessed data into a data warehouse.

18. The non-transitory computer readable storage medium of claim 16, further comprising displaying the profile in a graphical user interface, for use in creating a dataflow application.

19. The non-transitory computer readable storage medium of claim 16, wherein a list of selected ones of semantic actions enabled for the accessed data are determined, during the processing of the accessed data.

20. The non-transitory computer readable storage medium of claim 16, wherein one or more logistic regression or other models are calculated to represent an overall confidence of how a candidate dataset or entity is similar to an input dataset or entity.

\* \* \* \* \*

UNITED STATES PATENT AND TRADEMARK OFFICE
CERTIFICATE OF CORRECTION

PATENT NO. : 11,137,987 B2
APPLICATION NO. : 15/683551
DATED : October 5, 2021
INVENTOR(S) : Namarvar et al.

It is certified that error appears in the above-identified patent and that said Letters Patent is hereby corrected as shown below:

On the Title Page

Column 1, under (72) inventors, Line 1, delete "Mountan" and insert -- Mountain --, therefor.

On page 3, Column 1, under Other Publications, Line 8, delete "Tradmark," and insert -- Trademark, --, therefor.

On page 3, Column 1, under Other Publications, Line 10, delete "Tradmark," and insert -- Trademark, --, therefor.

In the Drawings

On sheet 39 of 52, in FIGURE 46, Line 25, delete "bindableEntitys" and insert -- bindableEntity --, therefor.

In the Specification

In Column 23, Line 35, delete "RelatedIQ" and insert -- RelateIQ --, therefor.

In Column 28, Line 10, delete "resources" and insert -- resources. --, therefor.

In Column 31, Line 53, delete "$e_n | \forall e_1 \epsilon S\}$" and insert -- $e_n | \forall e_i \epsilon S\}$ --, therefor.

In Column 31, Lines 63-64, delete "$\underset{j}{argmax}$" and insert -- $\underset{j}{arg\,max}$ --, therefor.

In Column 32, Lines 21-22, delete "$\underset{\beta}{argmax} l(\beta)$" and insert -- $\underset{\beta}{arg\,max}\, \ell(\beta)$ --, therefor.

Signed and Sealed this
Nineteenth Day of September, 2023

*Katherine Kelly Vidal*

Katherine Kelly Vidal
*Director of the United States Patent and Trademark Office*

In Column 39, Line 48, delete "transformation" and insert -- transformation. --, therefor.

In Column 41, Line 54, delete "852" and insert -- 852. --, therefor.

In Column 42, Line 49, delete "rules" and insert -- rules. --, therefor.